(12) United States Patent
Green et al.

(10) Patent No.: US 8,190,503 B2
(45) Date of Patent: May 29, 2012

(54) SYSTEMS AND METHODS FOR SWAP CONTRACTS MANAGEMENT WITH A DISCOUNT CURVE FEEDBACK LOOP

(75) Inventors: Thomas Green, New York, NY (US); Garry O'Connor, Rye, NY (US); Michael Dundon, Bethel Park, PA (US); John Shay, Chatham, NJ (US); Gerald P. Lawlor, New York, NY (US)

(73) Assignee: International Derivatives Clearing Group, LLC, New York, NY (US)

( * ) Notice: Subject to any disclaimer, the term of this patent is extended or adjusted under 35 U.S.C. 154(b) by 0 days.

(21) Appl. No.: 12/964,458

(22) Filed: Dec. 9, 2010

(65) Prior Publication Data

US 2011/0153521 A1   Jun. 23, 2011

Related U.S. Application Data

(60) Provisional application No. 61/288,247, filed on Dec. 18, 2009.

(51) Int. Cl.
*G06Q 40/00* (2006.01)

(52) U.S. Cl. .......................... 705/36 R; 705/37
(58) Field of Classification Search ........... 705/36 R–40
See application file for complete search history.

(56) References Cited

U.S. PATENT DOCUMENTS

| | | | |
|---|---|---|---|
| 5,787,402 A | 7/1998 | Potter et al. ............ | 705/37 |
| 5,924,082 A | 7/1999 | Silverman et al. ............ | 705/37 |
| 7,236,953 B1 | 6/2007 | Cooper et al. ............ | 705/36 |
| 7,467,112 B2 | 12/2008 | Frankel ............ | 705/37 |
| 7,565,316 B1 | 7/2009 | Amin et al. ............ | 705/37 |
| 7,899,707 B1 * | 3/2011 | Mesaros ............ | 705/14.66 |
| 2002/0010670 A1 | 1/2002 | Mosler et al. ............ | 705/37 |
| 2004/0172355 A1 | 9/2004 | Pandher et al. ............ | 705/37 |
| 2004/0220870 A1 | 11/2004 | Lundberg et al. ............ | 705/37 |
| 2004/0243502 A1 | 12/2004 | Slowik et al. ............ | 705/37 |

(Continued)

FOREIGN PATENT DOCUMENTS

GB   2398895   9/2004

OTHER PUBLICATIONS

Leif B. G. Andersen, Yield Curve Construction with Tension Splines, http://ssrn.com/abstract=871088,, pp. 102, Dec. 2, 2005.

(Continued)

*Primary Examiner* — Thu Thao Havan
(74) *Attorney, Agent, or Firm* — Winston & Strawn LLP

(57) ABSTRACT

A method, system, apparatus and media are directed to managing trading of financial instruments with a clearinghouse as a counter-party to trades. A plurality of inputs that includes trade data for trades executed using the computer system is received. A discount curve for projected prices of a swap contract over time based on the received plurality of inputs is determined in real-time. A swap contract price is valued based on the determined discount curve. A margin requirement is determined for a user who wishes to trade or hold a position in the swap contract in the user's account based on the swap contract price. Data about a trade of the swap contract that is executed within the computer system is incorporated into the trade data used for determining the discount curve to provide a feedback loop into the real-time determination of the discount curve.

31 Claims, 65 Drawing Sheets

U.S. PATENT DOCUMENTS

| | | | |
|---|---|---|---|
| 2006/0059065 A1 | 3/2006 | Glinberg et al. | 705/35 |
| 2006/0224494 A1 | 10/2006 | Pinkava | 705/37 |
| 2007/0118459 A1 | 5/2007 | Bauerschmidt et al. | 705/37 |
| 2007/0156573 A1 | 7/2007 | Whitehurst et al. | 705/37 |
| 2007/0198396 A1 | 8/2007 | Dinc et al. | 705/37 |
| 2007/0239589 A1 | 10/2007 | Wilson et al. | 705/37 |
| 2008/0065528 A1 | 3/2008 | McGarry et al. | 705/37 |
| 2008/0167981 A1 | 7/2008 | Whitehurst et al. | 705/37 |
| 2008/0183615 A1 | 7/2008 | Rio et al. | 705/37 |
| 2008/0215430 A1 | 9/2008 | Ellis et al. | 705/14 |
| 2008/0249956 A1 | 10/2008 | Connors | 705/36 R |
| 2008/0249958 A1* | 10/2008 | Anguish et al. | 705/36 R |
| 2008/0319920 A1 | 12/2008 | Levin et al. | 705/36 R |
| 2009/0119200 A1 | 5/2009 | Riviere | 705/37 |
| 2009/0171826 A1 | 7/2009 | Hadi et al. | 705/35 |
| 2009/0216673 A1 | 8/2009 | Watts et al. | 705/35 |
| 2009/0234776 A1 | 9/2009 | Bauerschmidt et al. | 705/36 R |

OTHER PUBLICATIONS http://en.wikipedia.org/wiki/Yield Curve, pp. 1-9, Dec. 17, 2009.

http://en.wikipedia.org/wiki/Dodd%E2%80%93_Frank_Wall_Street_Reform_and_Consumer_Protection-Act, pp. 1-42, Jul. 21, 2010.

International Search Report and Written Opinion, application No. PCT/US2010/059876, mailed Feb. 2, 2011.

International Search Report and Written Opinion, application No. PCT/US2010/059825, mailed Feb. 2, 2011.

International Search Report and Written Opinion, application No. PCT/US2010/059811, mailed Feb. 17, 2011.

Prosecution file for U.S. Appl. No. 12/964,148, filed Dec. 9, 2010.

Prosecution file for U.S. Appl. No. 12/964,192, filed Dec. 9, 2010.

Prosecution file for U.S. Appl. No. 12/964,332, filed Dec. 9, 2010.

* cited by examiner

| LIBOR | FRA (3 MONTH) | SWAP |
|---|---|---|
| Overnight | 0x3 | 2 Year |
| 1 Week | 1x4 | 3 Year |
| 2 Week | 2x5 | 4 Year |
| 1 Month | 3x6 | 5 Year |
| 2 Month | 4x7 | 6 Year |
| 3 Month | 5x8 | 7 Year |
|  | 6x9 | 8 Year |
|  | 7x10 | 9 Year |
|  | 8x11 | 10 Year |
|  | 9x12 | 12 Year |
|  | 10x13 | 15 Year |
|  | 11x14 | 20 Year |
|  | 12x15 | 25 Year |
|  | 13x16 | 30 Year |
|  | 14x17 |  |
|  | 15x18 |  |
|  | 16x19 |  |
|  | 17x20 |  |
|  | 18x21 |  |
|  | 19x22 |  |
|  | 20x23 † |  |

FIG. 5C

| Payment Date | Payment Amount | Discount Factor | Present Value |
|---|---|---|---|
| 16-Sept-08 | 600,396 | 0.99697 | 598,577 |
| 16-Mar-09 | 603,750 | 0.98230 | 593,064 |
| 16-Sept-09 | 603,750 | 0.97250 | 587,147 |
| 16-Mar-10 | 603,750 | 0.95816 | 578,489 |
| 16-Sep-10 | 603,750 | 0.93882 | 566,813 |
| 16-Mar-11 | 603,750 | 0.91648 | 553,325 |
| Net Present Value | | | +3,477,414 |

FIG. 6B

| Payment Date | Payment Amount | Discount Factor | Present Value |
|---|---|---|---|
| 16-Sept-08 | -287,444 | 0.99697 | -286,573 |
| 16-Dec-08 | -310,965 | 0.98817 | -307,286 |
| 16-Mar-09 | -210,620 | 0.98230 | -206,892 |
| 16-Jun-09 | -120,301 | 0.97894 | -117,768 |
| 16-Sep-09 | -231,354 | 0.97250 | -224,992 |
| 16-Dec-09 | -251,617 | 0.96547 | -242,929 |
| 16-Mar-10 | -264,628 | 0.95816 | -253,556 |
| 16-Jun-10 | -307,595 | 0.94988 | -292,179 |
| 16-Sep-10 | -406,966 | 0.93881 | -382,064 |
| 16-Dec-10 | -423,534 | 0.92759 | -392,866 |
| 16-Mar-11 | -423,954 | 0.91648 | -388,545 |
| Net Present Value | | | -3,095,649 |

FIG. 6C

Offset Ratio Matrix

| Contract Offset | 2Y | 3Y | 4Y | 5Y | 6Y | 7Y | 8Y | 9Y | 10Y | 15Y | 20Y | 25Y | 30Y |
|---|---|---|---|---|---|---|---|---|---|---|---|---|---|
| 2Y  | 1  | 2  | 3 | 4 | 5 | 5 | 6 | 7 | 7 | 10 | 13 | 16 | 18 |
| 3Y  | 2  | 1  | 2 | 2 | 3 | 3 | 4 | 4 | 4 | 6  | 7  | 9  | 10 |
| 4Y  | 3  | 2  | 1 | 2 | 2 | 2 | 3 | 3 | 3 | 4  | 5  | 6  | 7  |
| 5Y  | 4  | 2  | 2 | 1 | 2 | 2 | 2 | 2 | 3 | 3  | 4  | 5  | 6  |
| 6Y  | 5  | 3  | 2 | 2 | 1 | 2 | 2 | 2 | 2 | 3  | 4  | 4  | 5  |
| 7Y  | 5  | 3  | 2 | 2 | 2 | 1 | 2 | 2 | 2 | 3  | 3  | 4  | 4  |
| 8Y  | 6  | 4  | 3 | 2 | 2 | 2 | 1 | 2 | 2 | 3  | 3  | 3  | 4  |
| 9Y  | 7  | 4  | 3 | 3 | 2 | 2 | 2 | 1 | 2 | 3  | 3  | 3  | 3  |
| 10Y | 7  | 4  | 3 | 3 | 2 | 2 | 2 | 2 | 1 | 2  | 2  | 3  | 3  |
| 15Y | 10 | 6  | 4 | 3 | 3 | 3 | 2 | 2 | 2 | 1  | 2  | 2  | 2  |
| 20Y | 13 | 7  | 5 | 4 | 4 | 3 | 3 | 2 | 2 | 2  | 1  | 2  | 2  |
| 25Y | 16 | 9  | 6 | 5 | 4 | 4 | 3 | 3 | 3 | 2  | 2  | 1  | 2  |
| 30Y | 18 | 10 | 7 | 6 | 5 | 4 | 4 | 3 | 3 | 2  | 2  | 2  | 1  |

FIG. 7C

IM Rates

| Bucket  | 2Y  | 3Y  | 4Y   | 5Y   | 6Y   | 7Y   | 8Y   | 9Y   | 10Y  | 15Y  | 20Y  | 25Y   | 30Y   |
|---|---|---|---|---|---|---|---|---|---|---|---|---|---|
| IM Rate | 600 | 800 | 1200 | 1500 | 1900 | 2300 | 2700 | 3000 | 3300 | 6400 | 9400 | 12400 | 14900 |

FIG. 7D

Margin Offset Example

Initial Portfolio

| Bucket | Buy Contracts | Sell Contracts |
|---|---|---|
| 15Y | 0 | 174 |
| 6Y | 2174 | 1171 |
| 3Y | 61 | 3382 |
| 2Y | 96 | 459 |

FIG. 7E

Intra-Bucket Offset

| Bucket | IM Rate | Relief Rate | Intra Offset Contracts (Long+Short) | Offset Charge | Net Positions (Post Intra-Offsets) |
|---|---|---|---|---|---|
| 15Y | $6,400 | 80% | 0 | 50 | -174 |
| 6Y | $1,900 | 90% | 1171+1171 | $444,980 | 1003 |
| 3Y | $800 | 90% | 61+61 | $9,760 | -3321 |
| 2Y | $600 | 90% | 96+96 | $11,520 | -373 |

Total Intra Offset Charge: $466,260

FIG. 7F

Intra-Bucket Offsetting

| Bucket | Initial Positions (post intra- Offsetting) | Step 1<br>15Y vs. 6Y | Step 2<br>6Y vs. 3Y | Final Netted Positions | IM Rate (per contract) | Remaining Portfolio IM Charge |
|---|---|---|---|---|---|---|
| 15Y | -174 | 0 | | 0 | → $6,400 | $0 |
| 6Y | 1003 | 481 | 0 | 0 | → $1900 | $0 |
| 3Y | -3321 | -3321 | -1878 | -1878 | → $800 | $1,502,400 |
| 2Y | -373 | -373 | -373 | -373 | → $600 | $223,800 |
| Relief Rate | | 80% | 75% | | | |
| Offset Ratio | | 3 | 3 | | | |
| Consumed Long Tenor contract | | -174 | 481 | | | |
| Consumed Short Tenor contr. (OR X) | | -522 | 1443 | | | |
| LIM | | $6,400 | $1,900 | | | |
| SIM | | $1,900 | $800 | | | |
| Long Tenor IM Charge | | $1,113,600 | $913,900 | | | |
| Short Tenor IM Charge | | $991,800 | $1,154,400 | | | |
| Inter-Offset Charge (per step) | | $421,080 | $517,075 | | | |

Legend:
Long Tenor Rem. After Offset
Short Tenor Rem. After Offset

Total of Inter Bucket Offset Charges: $938,155    Total Remaining Margin: $1,726,200

FIG. 7G

COVARIANCE MATRIX

| | 1y | 2y | 3y | 4y | 5y | 6y | 7y | 8y | 9y | 10y | 12y | 15y | 20y | 25y | 30y |
|---|---|---|---|---|---|---|---|---|---|---|---|---|---|---|---|
| 1y | 1.000 | 0.941 | 0.925 | 0.913 | 0.900 | 0.887 | 0.874 | 0.862 | 0.849 | 0.835 | 0.817 | 0.797 | 0.774 | 0.754 | 0.750 |
| 2y | 0.941 | 1.000 | 0.992 | 0.981 | 0.963 | 0.951 | 0.934 | 0.917 | 0.900 | 0.880 | 0.862 | 0.835 | 0.807 | 0.782 | 0.778 |
| 3y | 0.925 | 0.992 | 1.000 | 0.995 | 0.984 | 0.975 | 0.961 | 0.947 | 0.932 | 0.913 | 0.896 | 0.871 | 0.844 | 0.819 | 0.816 |
| 4y | 0.913 | 0.981 | 0.995 | 1.000 | 0.995 | 0.989 | 0.978 | 0.966 | 0.954 | 0.937 | 0.922 | 0.898 | 0.873 | 0.850 | 0.845 |
| 5y | 0.900 | 0.963 | 0.984 | 0.995 | 1.000 | 0.997 | 0.991 | 0.982 | 0.974 | 0.962 | 0.949 | 0.929 | 0.905 | 0.884 | 0.879 |
| 6y | 0.887 | 0.951 | 0.975 | 0.989 | 0.997 | 1.000 | 0.996 | 0.990 | 0.983 | 0.972 | 0.962 | 0.944 | 0.923 | 0.904 | 0.898 |
| 7y | 0.874 | 0.934 | 0.961 | 0.978 | 0.991 | 0.996 | 1.000 | 0.996 | 0.993 | 0.986 | 0.978 | 0.965 | 0.947 | 0.927 | 0.924 |
| 8y | 0.862 | 0.917 | 0.947 | 0.966 | 0.982 | 0.990 | 0.996 | 1.000 | 0.997 | 0.992 | 0.987 | 0.977 | 0.962 | 0.944 | 0.942 |
| 9y | 0.849 | 0.900 | 0.932 | 0.954 | 0.974 | 0.983 | 0.993 | 0.997 | 1.000 | 0.997 | 0.993 | 0.985 | 0.972 | 0.955 | 0.954 |
| 10y | 0.835 | 0.880 | 0.913 | 0.937 | 0.962 | 0.972 | 0.986 | 0.992 | 0.997 | 1.000 | 0.997 | 0.993 | 0.982 | 0.966 | 0.966 |
| 12y | 0.817 | 0.862 | 0.896 | 0.922 | 0.949 | 0.962 | 0.978 | 0.987 | 0.993 | 0.997 | 1.000 | 0.996 | 0.989 | 0.974 | 0.974 |
| 15y | 0.797 | 0.835 | 0.871 | 0.898 | 0.929 | 0.944 | 0.965 | 0.977 | 0.985 | 0.993 | 0.996 | 1.000 | 0.996 | 0.984 | 0.987 |
| 20y | 0.774 | 0.807 | 0.844 | 0.873 | 0.905 | 0.923 | 0.947 | 0.962 | 0.972 | 0.982 | 0.989 | 0.996 | 1.000 | 0.989 | 0.995 |
| 25y | 0.754 | 0.782 | 0.819 | 0.850 | 0.884 | 0.904 | 0.927 | 0.944 | 0.955 | 0.966 | 0.974 | 0.984 | 0.989 | 1.000 | 0.990 |
| 30y | 0.750 | 0.778 | 0.816 | 0.845 | 0.879 | 0.898 | 0.924 | 0.942 | 0.954 | 0.966 | 0.974 | 0.987 | 0.995 | 0.990 | 1.000 |

FIG. 8D

| Component | Eigenvalue | Cumulative $R^2$ |
|---|---|---|
| $P_1$ | 13.946 | 0.937 |
| $P_2$ | 0.733 | 0.986 |
| $P_3$ | 0.135 | 0.995 |

FIG. 8E

| Maturity | $P_1$ | $P_2$ | $P_3$ |
|---|---|---|---|
| 1yr  | 0.2363 | 0.4042  | −0.8200 |
| 2yr  | 0.2484 | 0.4055  | −0.0087 |
| 3yr  | 0.2548 | 0.3288  | 0.1427 |
| 4yr  | 0.2590 | 0.2577  | 0.2089 |
| 5yr  | 0.2627 | 0.1675  | 0.2182 |
| 6yr  | 0.2641 | 0.1108  | 0.2249 |
| 7yr  | 0.2656 | 0.0339  | 0.1865 |
| 8yr  | 0.2659 | −0.0259 | 0.1328 |
| 9yr  | 0.2654 | −0.0764 | 0.1049 |
| 10yr | 0.2644 | −0.1324 | 0.0499 |
| 12yr | 0.2629 | −0.1817 | 0.0316 |
| 15yr | 0.2604 | −0.2458 | −0.0453 |
| 20yr | 0.2567 | −0.3062 | −0.1272 |
| 25yr | 0.2524 | −0.3435 | −0.1939 |
| 30yr | 0.2520 | −0.3562 | −0.2065 |

FIG. 8F

CpartA and B Trade Spot 3year Swap 100mm @ 1.958% on Feb 10th 2009

| *Spot Par Payer* | | *Spot Par Receiver* | |
|---|---|---|---|
| Buyer | CpartA | Seller | CpartB |
| EFS Date | 10-Feb-09 | EFS Date | 10-Feb-09 |
| Term | 3 Year | Term | 3 Year |
| Fixed Rate | 1.958% | Fixed Rate | 1.958% |
| Notional | 100mm | Notional | 100mm |
| Effective Date | 12-Feb-09 | Effective Date | 12-Feb-09 |
| Maturity Date | 12-Feb-12 | Maturity Date | 12-Feb-12 |
| Par Rate | 1.958% | Par Rate | 1.958% |
| Date | 10-Feb-09 | Date | 10-Feb-09 |
| Initial Margin | −2,600,000 | Initial Margin | −2,600,000 |
| Variation Margin | 0.00 | Variation Margin | 0.00 |
| PV | 0.00 | PV | 0.00 |
| Clean Price | 0.00 | Clean Price | 0.00 |
| Accrued Interest | 0.00 | Accrued Interest | 0.00 |
| Coupon Due | 0.00 | Coupon Due | 0.00 |
| Duration | 2.66 | Duration | 2.66 |
| Convexity | 9.88 | Convexity | 9.88 |
| DV01 | −27,081.20 | DV01 | 27,081.20 |

| Date | Fix CF | Flo CF | Date | Fix CF | Flo CF |
|---|---|---|---|---|---|
| 12-May-09 | 0.00 | 302,075.89 | 12-May-09 | 0.00 | −302,075.89 |
| 12-Aug-09 | −979,000.00 | 311,266.67 | 12-Aug-09 | 979,000.00 | −311,266.67 |
| 12-Nov-09 | 0.00 | 327,111.11 | 12-Nov-09 | 0.00 | −327,111.11 |
| 12-Feb-10 | −979,000.00 | 369,788.89 | 12-Feb-10 | 979,000.00 | −369,788.89 |
| 12-May-10 | 0.00 | 374,788.89 | 12-May-10 | 0.00 | −374,788.89 |
| 12-Aug-10 | −979,000.00 | 449,266.67 | 12-Aug-10 | 979,000.00 | −449,266.67 |
| 12-Nov-10 | 0.00 | 507,277.78 | 12-Nov-10 | 0.00 | −507,277.78 |
| 14-Feb-11 | −989,877.78 | 573,231.70 | 14-Feb-11 | 989,877.78 | −573,231.70 |
| 12-May-11 | 0.00 | 615,673.97 | 12-May-11 | 0.00 | −615,673.97 |
| 12-Aug-11 | −968,122.22 | 651,172.49 | 12-Aug-11 | 968,122.22 | −651,172.49 |
| 14-Nov-11 | 0.00 | 704,736.94 | 14-Nov-11 | 0.00 | −704,736.94 |
| 13-Feb-12 | −984,438.89 | 709,192.11 | 13-Feb-12 | 984,438.89 | −709,192.11 |

FIG. 12A

| Spot 3year Swap on Feb 11th 2009 ||||
| --- | --- | --- | --- |
| *Spot Par Payer* | | *Spot Par Receiver* | |
| Buyer | CpartA | Seller | CpartB |
| EFS Date | 10-Feb-09 | EFS Date | 10-Feb-09 |
| Term | 3 Year | Term | 3 Year |
| Fixed Rate | 1.958% | Fixed Rate | 1.958% |
| Notional | 100mm | Notional | 100mm |
| Effective Date | 12-Feb-09 | Effective Date | 12-Feb-09 |
| Maturity Date | 12-Feb-12 | Maturity Date | 12-Feb-12 |
| Par Rate | 1.911% | Par Rate | 1.911% |
| Date | 11-Feb-09 | Date | 11-Feb-09 |
| Initial Margin | -2,600,000 | Initial Margin | -2,600,000 |
| Variation Margin | -135,710.22 | Variation Margin | 135,710.22 |
| PV | -135,710.22 | PV | 135,710.22 |
| Clean Price | -135,710.22 | Clean Price | 135,710.22 |
| Accrued Interest | 0.00 | Accrued Interest | 0.00 |
| Coupon Due | 0.00 | Coupon Due | 0.00 |
| Duration | 2.66 | Duration | 2.66 |
| Convexity | 9.88 | Convexity | 9.88 |
| DV01 | -27,125.57 | DV01 | 27,125.57 |

| Date | Fix CF | Flo CF | Date | Fix CF | Flo CF |
| --- | --- | --- | --- | --- | --- |
| 12-May-09 | 0.00 | 302,075.89 | 12-May-09 | 0.00 | -302,075.89 |
| 12-Aug-09 | -979,000.00 | 308,132.37 | 12-Aug-09 | 979,000.00 | -308,132.37 |
| 12-Nov-09 | 0.00 | 321,565.67 | 12-Nov-09 | 0.00 | -321,565.67 |
| 12-Feb-10 | -979,000.00 | 360,838.40 | 12-Feb-10 | 979,000.00 | -360,838.40 |
| 12-May-10 | 0.00 | 350,149.42 | 12-May-10 | 0.00 | -350,149.42 |
| 12-Aug-10 | -979,000.00 | 433,311.37 | 12-Aug-10 | 979,000.00 | -433,311.37 |
| 12-Nov-10 | 0.00 | 489,942.22 | 12-Nov-10 | 0.00 | -489,942.22 |
| 14-Feb-11 | -989,877.78 | 552,705.73 | 14-Feb-11 | 989,877.78 | -552,705.73 |
| 12-May-11 | 0.00 | 603,621.20 | 12-May-11 | 0.00 | -603,621.20 |
| 12-Aug-11 | -968,122.22 | 638,021.60 | 12-Aug-11 | 968,122.22 | -638,021.60 |
| 14-Nov-11 | 0.00 | 693,294.34 | 14-Nov-11 | 0.00 | -693,294.34 |
| 13-Feb-12 | -984,438.89 | 701,717.89 | 13-Feb-12 | 984,438.89 | -701,717.89 |

FIG. 12B

| EFS of Aged 5year @ 4.00% on Feb 10th 2009 | |
|---|---|
| *Aged ITM Receiver* | |
| Seller | CpartA |
| EFS Date | 10-Feb-09 |
| Term | 5 Year |
| Fixed Rate | 4.000% |
| Notional | 100mm |
| Effective Date | 19-Mar-08 |
| Maturity Date | 19-Mar-13 |
| Par Rate | 2.290% |
| Date | 10-Feb-09 |
| Initial Margin | -2,900,000 |
| Variation Margin | 8,062,655.69 |
| PV | 8,062,587.38 |
| Clean Price | 6,728,163.77 |
| Accrued Interest | 1,334,423.61 |
| Coupon Due | 0.00 |
| Duration | 3.64 |
| Convexity | 16.61 |
| DV01 | 40,204.52 |

| Date | Fix CF | Flo CF |
|---|---|---|
| 19-Mar-09 | 2,000,00.00 | -394,375.00 |
| 19-Jun-09 | 0.00 | -313,058.49 |
| 21-Sep-09 | 2,022,222.22 | -317,685.66 |
| 21-Dec-09 | 0.00 | -340,931.33 |
| 19-Mar-10 | 1,977,77.78 | -359,458.41 |
| 21-Jun-10 | 0.00 | -429,336.60 |
| 20-Sep-10 | 2,011,111.11 | -468,290.52 |
| 20-Dec-10 | 0.00 | -528,586.93 |
| 21-Mar-11 | 2,011,111.11 | -654,475.97 |
| 20-Jun-11 | 0.00 | -644,279.00 |
| 19-Sep-11 | 1,977,777.78 | -656,607.02 |
| 19-Dec-11 | 0.00 | -692,730.29 |
| 19-Mar-12 | 2,000,000.00 | -724,843.54 |
| 19-Jun-12 | 0.00 | -764,015.24 |
| 19-Sep-12 | 2,000,000.00 | -788,969.96 |
| 19-Dec-12 | 0.00 | -803,928.97 |
| 19-Mar-13 | 2,000,000.00 | -813,518.08 |

FIG. 12C

| Day after EFS Feb 11th |
|---|
| *Aged ITM Receiver* |

| | |
|---|---|
| Seller | CpartA |
| EFS Date | 10-Feb-09 |
| Term | 5 Year |
| Fixed Rate | 4.000% |
| Notional | 100mm |
| Effective Date | 19-Mar-08 |
| Maturity Date | 19-Mar-13 |
| Par Rate | 2.257% |
| Date | 11-Feb-09 |
| Initial Margin | -2,900,000 |
| Variation Margin | 139,745.07 |
| | |
| PV | 8,202,332.45 |
| Clean Price | 6,861,179.68 |
| Accrued Interest | 1,341,152.78 |
| Coupon Due | 0.00 |
| | |
| Duration | 3.64 |
| Convexity | 16.60 |
| DV01 | 40,262.88 |

| Date | Fix CF | Flo CF |
|---|---|---|
| 19-Mar-09 | 2,000,00.00 | -394,375.00 |
| 19-Jun-09 | 0.00 | -311,984.37 |
| 21-Sep-09 | 2,022,222.22 | -311,591.93 |
| 21-Dec-09 | 0.00 | -331,532.66 |
| 19-Mar-10 | 1,977,77.78 | -351,500.39 |
| 21-Jun-10 | 0.00 | -404,909.43 |
| 20-Sep-10 | 2,011,111.11 | -452,830.35 |
| 20-Dec-10 | 0.00 | -511,225.14 |
| 21-Mar-11 | 2,011,111.11 | -636,390.93 |
| 20-Jun-11 | 0.00 | -631,406.74 |
| 19-Sep-11 | 1,977,777.78 | -643,537.22 |
| 19-Dec-11 | 0.00 | -683,442.78 |
| 19-Mar-12 | 2,000,000.00 | -720,042.08 |
| 19-Jun-12 | 0.00 | -763,096.89 |
| 19-Sep-12 | 2,000,000.00 | -789,592.57 |
| 19-Dec-12 | 0.00 | -805,093.27 |
| 19-Mar-13 | 2,000,000.00 | -813,924.39 |

FIG. 12D

| Mar 17th Floating Reset Date |  |
|---|---|
| *Aged ITM Receiver* |  |
| Seller | CpartA |
| EFS Date | 10-Feb-09 |
| Term | 5 Year |
| Fixed Rate | 4.000% |
| Notional | 100mm |
| Effective Date | 19-Mar-08 |
| Maturity Date | 19-Mar-13 |
| Par Rate | 2.363% |
| Date | 17-Mar-09 |
| Initial Margin | -2,800,000 |
| Variation Margin | -203,606.50 |
| PV | 7,863,967.33 |
| Clean Price | 6,271,800.66 |
| Accrued Interest | 1,592,166.67 |
| Coupon Due | 0.00 |
| Duration | 3.38 |
| Convexity | 15.69 |
| DV01 | 37,505.14 |

| Date | Fix CF | Flo CF |
|---|---|---|
| 19-Mar-09 | 2,000,00.00 | -394,375.00 |
| 19-Jun-09 | 0.00 | -332,063.78 |
| 21-Sep-09 | 2,022,222.22 | -358,766.67 |
| 21-Dec-09 | 0.00 | -361,977.78 |
| 19-Mar-10 | 1,977,77.78 | -395,538.03 |
| 21-Jun-10 | 0.00 | -444,150.00 |
| 20-Sep-10 | 2,011,111.11 | -470,259.89 |
| 20-Dec-10 | 0.00 | -512,127.78 |
| 21-Mar-11 | 2,011,111.11 | -571,226.95 |
| 20-Jun-11 | 0.00 | -647,568.80 |
| 19-Sep-11 | 1,977,777.78 | -647,592.22 |
| 19-Dec-11 | 0.00 | -688,686.69 |
| 19-Mar-12 | 2,000,000.00 | -730,452.28 |
| 19-Jun-12 | 0.00 | -802,286.57 |
| 19-Sep-12 | 2,000,000.00 | -830,492.21 |
| 19-Dec-12 | 0.00 | -858,093.16 |
| 19-Mar-13 | 2,000,000.00 | -858,339.85 |

FIG. 12E

| Mar 19th Coupon Payment Fix & Flo |        |
|-----------------------------------|--------|
| *Aged ITM Receiver*               |        |
| Seller                            | CpartA |
| EFS Date                          | 10-Feb-09 |
| Term                              | 5 Year |
| Fixed Rate                        | 4.000% |
| Notional                          | 100mm |
| Effective Date                    | 19-Mar-08 |
| Maturity Date                     | 19-Mar-13 |
| Par Rate                          | 2.079% |
| Date                              | 19-Mar-09 |
| Initial Margin                    | -2,800,000 |
| Variation Margin                  | -186,974.81 |
| PV                                | 7,388,512.14 |
| Clean Price                       | 7,388,512.14 |
| Accrued Interest                  | 0.00 |
| Coupon Due                        | 1,605,625.00 |
| Duration                          | 3.64 |
| Convexity                         | 16.59 |
| DV01                              | 39,787.92 |

| Date | Fix CF | Flo CF |
|------|--------|--------|
| 19-Mar-09 | ~~2,000,00.00~~ | -394,375.00 |
| 19-Jun-09 | 0.00 | -332,063.78 |
| 21-Sep-09 | 2,022,222.22 | -311,581.51 |
| 21-Dec-09 | 0.00 | -305,151.65 |
| 19-Mar-10 | 1,977,77.78 | -335,033.66 |
| 21-Jun-10 | 0.00 | -374,668.53 |
| 20-Sep-10 | 2,011,111.11 | -398,126.22 |
| 20-Dec-10 | 0.00 | -443,184.26 |
| 21-Mar-11 | 2,011,111.11 | -491,544.28 |
| 20-Jun-11 | 0.00 | -581,645.81 |
| 19-Sep-11 | 1,977,777.78 | -580,100.69 |
| 19-Dec-11 | 0.00 | -617,568.23 |
| 19-Mar-12 | 2,000,000.00 | -649,453.59 |
| 19-Jun-12 | 0.00 | -704,970.33 |
| 19-Sep-12 | 2,000,000.00 | -726,871.55 |
| 19-Dec-12 | 0.00 | -751,068.26 |
| 19-Mar-13 | 2,000,000.00 | -756,573.98 |

FIG. 12F

| Mar 20th Day after Payment |||
|---|---|---|
| *Aged ITM Receiver* |||
| Seller | | FCpartA |
| EFS Date | | 10-Feb-09 |
| Term | | 5 Year |
| Fixed Rate | | 4.000% |
| Notional | | 100mm |
| Effective Date | | 19-Mar-08 |
| Maturity Date | | 19-Mar-13 |
| Par Rate | | 2.291% |
| Date | | 20-Mar-09 |
| Initial Margin | | -2,800,000 |
| Variation Margin | | -104,761.65 |
| | | |
| PV | | 7,283,750.48 |
| Clean Price | | 7,276,248.76 |
| Accrued Interest | | 7,501.72 |
| Coupon Due | | 0.00 |
| | | |
| Duration | | 3.45 |
| Convexity | | 15.98 |
| DV01 | | 37,944.15 |

| Date | Fix CF | Flo CF |
|---|---|---|
| 19-Mar-09 | ~~2,000,00.00~~ | ~~-394,375.00~~ |
| 19-Jun-09 | 0.00 | -332,063.78 |
| 21-Sep-09 | 2,022,222.22 | -321,038.95 |
| 21-Dec-09 | 0.00 | -315,271.05 |
| 19-Mar-10 | 1,977,77.78 | -343,477.35 |
| 21-Jun-10 | 0.00 | -384,302.18 |
| 20-Sep-10 | 2,011,111.11 | -411,234.81 |
| 20-Dec-10 | 0.00 | -451,600.03 |
| 21-Mar-11 | 2,011,111.11 | -473,370.11 |
| 20-Jun-11 | 0.00 | -563,021.21 |
| 19-Sep-11 | 1,977,777.78 | -589,836.69 |
| 19-Dec-11 | 0.00 | -619,680.11 |
| 19-Mar-12 | 2,000,000.00 | -651,692.48 |
| 19-Jun-12 | 0.00 | -719,261.59 |
| 19-Sep-12 | 2,000,000.00 | -743,636.59 |
| 19-Dec-12 | 0.00 | -771,914.31 |
| 19-Mar-13 | 2,000,000.00 | -775,500.25 |

FIG. 12G

EPS of Aged 5year @ 2.00% OTM
*Aged OTM Receiver*

| | |
|---|---|
| Seller | CpartA |
| EFS Date | 10-Feb-09 |
| Term | 5 Year |
| Fixed Rate | 2.000% |
| Notional | 100mm |
| Effective Date | 19-Mar-08 |
| Maturity Date | 19-Mar-13 |
| Par Rate | 2.290% |
| Date | 10-Feb-09 |
| Initial Margin | −2,900,000 |
| Variation Margin | −590,686.91 |
| | |
| PV | −590,681.91 |
| Clean Price | 1,141,772.19 |
| Accrued Interest | 551,090.28 |
| Coupon Due | 0.00 |
| | |
| Duration | 3.78 |
| Convexity | 17.46 |
| DV01 | 38,430.64 |

| Date | Fix CF | Flo CF |
|---|---|---|
| 19-Mar-09 | 1,000,00.00 | −394,375.00 |
| 19-Jun-09 | 0.00 | −313,058.49 |
| 21-Sep-09 | 1,011,111.11 | −317,685.66 |
| 21-Dec-09 | 0.00 | −340,931.33 |
| 19-Mar-10 | 988,888.89 | −359,458.41 |
| 21-Jun-10 | 0.00 | −429,336.60 |
| 20-Sep-10 | 1,005,555.56 | −468,290.52 |
| 20-Dec-10 | 0.00 | −528,586.93 |
| 21-Mar-11 | 1,005,555.56 | −654,475.97 |
| 20-Jun-11 | 0.00 | −644,279.00 |
| 19-Sep-11 | 988,888.89 | −656,607.02 |
| 19-Dec-11 | 0.00 | −692,730.29 |
| 19-Mar-12 | 1,000,000.00 | −724,843.54 |
| 19-Jun-12 | 0.00 | −764,015.24 |
| 19-Sep-12 | 1,000,000.00 | −788,969.96 |
| 19-Dec-12 | 0.00 | −803,928.97 |
| 19-Mar-13 | 1,000,000.00 | −813,518.08 |

FIG. 12H

| Day After Feb 11th |  |
|---|---|
| *Aged OTM Receiver* | |
| Seller | CpartA |
| EFS Date | 10-Feb-09 |
| Term | 5 Year |
| Fixed Rate | 2.000% |
| Notional | 100mm |
| Effective Date | 19-Mar-08 |
| Maturity Date | 19-Mar-13 |
| Par Rate | 2.257% |
| Date | 11-Feb-09 |
| Initial Margin | -2,900,000 |
| Variation Margin | 132,650.07 |
| | |
| PV | -458,031.84 |
| Clean Price | -1,010,295.73 |
| Accrued Interest | 552,263.89 |
| Coupon Due | 0.00 |
| | |
| Duration | 3.78 |
| Convexity | 17.45 |
| DV01 | 38,488.97 |

| Date | Fix CF | Flo CF |
|---|---|---|
| 19-Mar-09 | 1,000,00.00 | -394,375.00 |
| 19-Jun-09 | 0.00 | -311,984.37 |
| 21-Sep-09 | 1,011,111.11 | -311,591.93 |
| 21-Dec-09 | 0.00 | -331,532.66 |
| 19-Mar-10 | 988,888.89 | -351,500.39 |
| 21-Jun-10 | 0.00 | -404,909.43 |
| 20-Sep-10 | 1,005,555.56 | -452,830.35 |
| 20-Dec-10 | 0.00 | -511,225.14 |
| 21-Mar-11 | 1,005,555.56 | -636,390.93 |
| 20-Jun-11 | 0.00 | -631,406.74 |
| 19-Sep-11 | 988,888.89 | -643,537.22 |
| 19-Dec-11 | 0.00 | -683,442.78 |
| 19-Mar-12 | 1,000,000.00 | -720,042.08 |
| 19-Jun-12 | 0.00 | -763,096.89 |
| 19-Sep-12 | 1,000,000.00 | -789,592.57 |
| 19-Dec-12 | 0.00 | -805,093.27 |
| 19-Mar-13 | 1,000,000.00 | -813,924.39 |

FIG. 12I

| Mar 17th Floating Reset Date |  |
|---|---|
| *Aged OTM Receiver* |  |
| Seller | CpartA |
| EFS Date | 10-Feb-09 |
| Term | 5 Year |
| Fixed Rate | 2.000% |
| Notional | 100mm |
| Effective Date | 19-Mar-08 |
| Maturity Date | 19-Mar-13 |
| Par Rate | 2.363% |
| Date | 17-Mar-09 |
| Initial Margin | -2,800,000 |
| Variation Margin | -197,752.94 |
| PV | -786,837.24 |
| Clean Price | -1,390,115.02 |
| Accrued Interest | 603,277.78 |
| Coupon Due | 0.00 |
| Duration | 3.52 |
| Convexity | 16.52 |
| DV01 | 35,821.20 |

| Date | Fix CF | Flo CF |
|---|---|---|
| 19-Mar-09 | 1,000,00.00 | -394,375.00 |
| 19-Jun-09 | 0.00 | -332,063.78 |
| 21-Sep-09 | 1,011,111.11 | -358,766.67 |
| 21-Dec-09 | 0.00 | -361,977.78 |
| 19-Mar-10 | 988,888.89 | -395,538.03 |
| 21-Jun-10 | 0.00 | -444,150.00 |
| 20-Sep-10 | 1,005,555.56 | -470,259.89 |
| 20-Dec-10 | 0.00 | -512,127.78 |
| 21-Mar-11 | 1,005,555.56 | -571,226.95 |
| 20-Jun-11 | 0.00 | -647,568.80 |
| 19-Sep-11 | 988,888.89 | -647,592.22 |
| 19-Dec-11 | 0.00 | -688,686.69 |
| 19-Mar-12 | 1,000,000.00 | -730,452.28 |
| 19-Jun-12 | 0.00 | -802,286.57 |
| 19-Sep-12 | 1,000,000.00 | -830,492.21 |
| 19-Dec-12 | 0.00 | -858,093.16 |
| 19-Mar-13 | 1,000,000.00 | -858,339.85 |

FIG. 12J

| 19th Mar Coupon Payment Fix & Flo |  |
|---|---|
| *Aged OTM Receiver* |  |
| Seller | CpartA |
| EFS Date | 10-Feb-09 |
| Term | 5 Year |
| Fixed Rate | 2.000% |
| Notional | 100mm |
| Effective Date | 19-Mar-08 |
| Maturity Date | 19-Mar-13 |
| Par Rate | 2.079% |
| Date | 19-Mar-09 |
| Initial Margin | -2,800,000 |
| Variation Margin | -181,509.64 |
| PV | -305,767.73 |
| Clean Price | -305,767.73 |
| Accrued Interest | 0.00 |
| Coupon Due | 605,625.00 |
| Duration | 3.78 |
| Convexity | 17.44 |
| DV01 | 38,006.64 |

| Date | Fix CF | Flo CF |
|---|---|---|
| 19-Mar-09 | ~~1,000,00.00~~ | ~~-394,375.00~~ |
| 19-Jun-09 | 0.00 | -332,063.78 |
| 21-Sep-09 | 1,011,111.11 | -311,581.51 |
| 21-Dec-09 | 0.00 | -305,151.65 |
| 19-Mar-10 | 988,888.89 | -335,033.66 |
| 21-Jun-10 | 0.00 | -374,668.53 |
| 20-Sep-10 | 1,005,555.56 | -398,126.22 |
| 20-Dec-10 | 0.00 | -443,184.26 |
| 21-Mar-11 | 1,005,555.56 | -491,544.28 |
| 20-Jun-11 | 0.00 | -581,645.81 |
| 19-Sep-11 | 988,888.89 | -580,100.69 |
| 19-Dec-11 | 0.00 | -617,568.23 |
| 19-Mar-12 | 1,000,000.00 | -649,453.59 |
| 19-Jun-12 | 0.00 | -704,970.33 |
| 19-Sep-12 | 1,000,000.00 | -726,871.55 |
| 19-Dec-12 | 0.00 | -751,068.26 |
| 19-Mar-13 | 1,000,000.00 | -756,573.98 |

FIG. 12K

| 20th Mar Coupon Payment Fix & Flo |  |
|---|---|
| *Aged OTM Receiver* | |
| Seller | CpartA |
| EFS Date | 10-Feb-09 |
| Term | 5 Year |
| Fixed Rate | 2.000% |
| Notional | 100mm |
| Effective Date | 19-Mar-08 |
| Maturity Date | 19-Mar-13 |
| Par Rate | 2.291% |
| Date | 20-Mar-09 |
| Initial Margin | -2,800,000 |
| Variation Margin | -101,651.41 |
| PV | -407,419.14 |
| Clean Price | -409,365.31 |
| Accrued Interest | 1,946.17 |
| Coupon Due | 0.00 |
| Duration | 3.57 |
| Convexity | 16.67 |
| DV01 | 36,253.56 |

| Date | Fix CF | Flo CF |
|---|---|---|
| 19-Mar-09 | ~~1,000,00.00~~ | -394,375.00 |
| 19-Jun-09 | 0.00 | -332,063.78 |
| 21-Sep-09 | 1,011,111.11 | -321,038.95 |
| 21-Dec-09 | 0.00 | -315,271.05 |
| 19-Mar-10 | 988,888.89 | -343,477.35 |
| 21-Jun-10 | 0.00 | -384,302.18 |
| 20-Sep-10 | 1,005,555.56 | -411,234.81 |
| 20-Dec-10 | 0.00 | -451,600.03 |
| 21-Mar-11 | 1,005,555.56 | -473,370.11 |
| 20-Jun-11 | 0.00 | -563,021.21 |
| 19-Sep-11 | 988,888.89 | -589,836.69 |
| 19-Dec-11 | 0.00 | -619,680.11 |
| 19-Mar-12 | 1,000,000.00 | -651,692.48 |
| 19-Jun-12 | 0.00 | -719,261.59 |
| 19-Sep-12 | 1,000,000.00 | -743,636.59 |
| 19-Dec-12 | 0.00 | -771,914.31 |
| 19-Mar-13 | 1,000,000.00 | -775,500.25 |

FIG. 12L

| |
|---|
| IDCH Curve |
| New Ticket |
| Trade Blotter |
| Live Market |
| Market Statistics |

User Id:
CBGPL

LOG OFF

Forward Starting Swap — Ticket

Search for Contracts

Select an Unadjusted Contract End Date: Select Contract by Time Bucket:

[End Year ▼] [End Month ▼]　　[Select a Tenor ▼]

<    November 2009    >

| Su | Mo | Tu | We | Th | Fr | Sa |
|---|---|---|---|---|---|---|
| 25 | 26 | 27 | 28 | 29 | 30 | 31 |
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 1 | 2 | 3 | 4 | 5 |

| | IDCH Curve |
|---|---|
| | New Ticket |
| | Trade Blotter |
| | Live Market |
| | Market Statistics |

User Id:
CBGPL

LOG OFF

Swap – Ticket
Spot Contract
Contract Name: IRD6Y

| Fixed | | | Floating | | |
|---|---|---|---|---|---|
| CCY | USD | | CCY | USD | |
| Original Start Date | 2009-11-18 | | Original Start Date | 2009-11-18 | |
| End Date | 2015-11-18 | | End Date | 2015-11-18 | |
| Roll Tenor | 6 Months | | Roll Tenor | 3 Months | |
| Business Day | MODFOLLOWING | | Business Day | MODFOLLOWING | |
| Day Count | 30/360 | | Day Count | ACT/360 | |
| | | | Benchmark | 3M-INDEX | |

Buy/Sell: ○Buy ○Sell
Effective Date: 2009-11-18
Number of Contracts: [ ]
Fixed Rate: [ ]
Select to submit an Aged Spot Contract ☐   Submitting an Aged Spot Contract means there will be payment(s) in two days.

*You are not currently enabled to trade with any Participants

Buyer of Fixed
Participant: [ ▼ ]
User: [ ▼ ]

Seller of Fixed
Participant: [ ▼ ]
User: [ ▼ ]

( ) ( )

| | |
|---|---|
| IDCH Curve | |
| New Ticket | |
| Trade Blotter | |
| Live Market | |
| Market Statistics | |

User Id:
CBGPL
LOG OFF

Swap – Ticket

Select Spot Contracts
Select Maturity Year: [Select Contract Maturity ▼]

Search Unadjusted End Dates
Select Contract by Time Bucket: [Select a Time Bucket ▼]
Select an Unadjusted Contract End Date: [End Year ▼] [End Month ▼]

| < | November 2009 | > |
|---|---|---|
| Su Mo Tu We Th Fr Sa |||
| 25 26 27 28 29 30 31 |||
| 1 2 3 4 5 6 7 |||
| 8 9 10 11 12 13 14 |||
| 15 [16] 17 18 19 20 21 |||
| 22 23 24 25 26 27 28 |||
| 29 30 1 2 3 4 5 |||

FIG. 13C

| Portfolio Filter: | PV01 Sensitivity |
|---|---|

Portfolio Listing – PV01 Sensitivity

| Portfolio Keys | Limit Utilization |
|---|---|
| Portfolio Type: PV01<br>Participant: AgFirst<br>Exposure Type: PV01 | 86,232.10 |
| Portfolio Type: PV01<br>Participant: AgriBank<br>Exposure Type: PV01 | 392,401.39 |
| Portfolio Type: PV01<br>Participant: Blackrock Inc.<br>Exposure Type: PV01 | 74,524.66 |
| Portfolio Type: PV01<br>Participant: Bank of America<br>Exposure Type: PV01 | 2,511,504.58 |
| Portfolio Type: PV01<br>Participant: CoBank<br>Exposure Type: PV01 | 1,324,868.76 |
| Portfolio Type: PV01<br>Participant: CitiBank<br>Exposure Type: PV01 | 1,994,980.84 |
| Portfolio Type: PV01<br>Participant: Freddie Mac<br>Exposure Type: PV01 | 3,936,666.10 |
| Portfolio Type: PV01<br>Participant: Freddie Mac FSS<br>Exposure Type: PV01 | 3,772,005.16 |
| Portfolio Type: PV01<br>Participant: Farm Credit Bank of Texas<br>Exposure Type: PV01 | 14,948.61 |
| Portfolio Type: PV01<br>Participant: FastFill<br>Exposure Type: PV01 | 0.00 |
| Portfolio Type: PV01<br>Participant: IDCG HEDGE<br>Exposure Type: PV01 | 125.25 |
| Portfolio Type: PV01<br>Participant: IDCH Internal<br>Exposure Type: PV01 | 0.00 |
| Portfolio Type: PV01<br>Participant: Jeffries Group, Inc.<br>Exposure Type: PV01 | 50,496.07 |
| Portfolio Type: PV01 | 0.00 |

Page: 1 of 1        Record: 1 of 20

Clearing Members \ Dynamic \ Violations \ Curve \ Concentration Risk \

TEST G/TEST G                                     lglawlor

FIG. 13E

| Portfolio Keys | Limit Utilization | Limit Level | Upper Limit Level | Warning Level |
|---|---|---|---|---|
| Portfolio Type: Daily Variation Margin<br>Account: AgFirst Cust<br>Exposure Type: Variation Margin | 325,437.38 | | | |
| Portfolio Type: Daily Variation Margin<br>Account: Agrib Cust<br>Exposure Type: Variation Margin | 1,452,640.20 | | | |
| Portfolio Type: Daily Variation Margin<br>Account: BlkRk House<br>Exposure Type: Variation Margin | 4,574.54 | | | |
| Portfolio Type: Daily Variation Margin<br>Account: Bank of America Cust<br>Exposure Type: Variation Margin | 7,003,337.71 | | | |
| Portfolio Type: Daily Variation Margin<br>Account: CoBank Cust<br>Exposure Type: Variation Margin | 5,659,246.81 | | | |
| Portfolio Type: Daily Variation Margin<br>Account: CitiBank HSE<br>Exposure Type: Variation Margin | 5,006,102.66 | | | |
| Portfolio Type: Daily Variation Margin<br>Account: Freddie Mac Cust<br>Exposure Type: Variation Margin | -80,908,360.85 | | | |
| Portfolio Type: Daily Variation Margin<br>Account: Freddie Mac Cust FSS<br>Exposure Type: Variation Margin | -66,338,993.93 | | | |
| Portfolio Type: Daily Variation Margin<br>Account: FCB of Texas Cust<br>Exposure Type: Variation Margin | 12,694.30 | | | |
| Portfolio Type: Daily Variation Margin<br>Account: FastFill Cust<br>Exposure Type: Variation Margin | 8,048,338.41 | | | |
| Portfolio Type: Daily Variation Margin<br>Account: FastFill House<br>Exposure Type: Variation Margin | -8,048,338.41 | | | |
| Portfolio Type: Daily Variation Margin<br>Account: IDCG Hedge<br>Exposure Type: Variation Margin | -2,624.43 | | | |
| Portfolio Type: Daily Variation Margin<br>Account: JEFF House<br>Exposure Type: Variation Margin | -96,059.35 | | | |

FIG. 13F

| ALERT LIMITS | | | | |
|---|---:|---|---|---|
| Portfolio Keys | Limit Utilization | Limit Level | Upper Limit Level | Warning Level |
| Portfolio Type: Initial Margin<br>Account: BLKRK OBSID<br>Exposure Type: Summary | 4,075,512.18 | | | |
| Portfolio Type: Initial Margin<br>Account: CITIB Trader<br>Exposure Type: Summary | 208,382,163.95 | | | |
| Portfolio Type: Initial Margin<br>Account: FSTT2 Trader1<br>Exposure Type: Summary | 150,000,000.00 | | | |
| Portfolio Type: Initial Margin<br>Account: IDCG Hedge<br>Exposure Type: Summary | 162,300.00 | | | |
| Portfolio Type: Initial Margin<br>Account: JEFF JEFF<br>Exposure Type: Summary | 9,014,877.07 | | | |
| Portfolio Type: Initial Margin<br>Account: MKPCA Credit<br>Exposure Type: Summary | 230,000.00 | | | |
| Portfolio Type: Initial Margin<br>Account: MKPMF Master<br>Exposure Type: Summary | 1,299,000.00 | | | |
| Portfolio Type: Initial Margin<br>Account: MKPNF OpMaster<br>Exposure Type: Summary | 0.00 | | | |
| Portfolio Type: Initial Margin<br>Account: MKPOF OpMaster<br>Exposure Type: Summary | 6,467,000.00 | | | |
| Portfolio Type: Initial Margin<br>Account: MKPT1 Test1<br>Exposure Type: Summary | 7,476,400.00 | | | |
| Portfolio Type: Initial Margin<br>Account: MLBOA ADAS<br>Exposure Type: Summary | 0.00 | | | |
| Portfolio Type: Initial Margin<br>Account: MLBOA Trader<br>Exposure Type: Summary | 150,760,698.10 | | | |
| Portfolio Type: Initial Margin<br>Account: MLBOA SSTEV<br>Exposure Type: Summary | 14,000,000.00 | | | |

Portfolio Filter: RAV

Page: 1 of 1    Record: 1 of 13

\Clearing Members \Dynamic \Violations \Curve \Concentration Risk \Sensitivity \Alerts \Settlemen TEST G/TEST G    glawlor

FIG. 13G

| ▼ ALERT LIMITS | | | |
|---|---:|---:|---:|
| Portfolio Keys | Limit Utilization | Limit Level | Upper Limit Level |
| Participant: THE HOUSE<br>Exposure Type: Summary | -2,849.42 | -1.00 | 1.00 |
| Portfolio Type: Total Liquidity Value<br>Participant: AgFirst<br>Exposure Type: Summary | -13,496,437.38 | 0.00 | |
| Portfolio Type: Total Liquidity Value<br>Participant: AgriBank<br>Exposure Type: Summary | -74,282,640.20 | 0.00 | |
| Portfolio Type: Total Liquidity Value<br>Participant: Blackrock Inc.<br>Exposure Type: Summary | -4,080,086.72 | 0.00 | |
| Portfolio Type: Total Liquidity Value<br>Participant: Bank of America<br>Exposure Type: Summary | -157,764,035.81 | 0.00 | |
| Portfolio Type: Total Liquidity Value<br>Participant: CoBank<br>Exposure Type: Summary | -255,444,246.81 | 0.00 | |
| Portfolio Type: Total Liquidity Value<br>Participant: CitiBank<br>Exposure Type: Summary | -213,388,266.61 | 0.00 | |
| Portfolio Type: Total Liquidity Value<br>Participant: Freddie Mac<br>Exposure Type: Summary | -758,122,192.56 | 0.00 | |
| Portfolio Type: Total Liquidity Value<br>Participant: Freddie Mac FSS<br>Exposure Type: Summary | -1,073,801,406.60 | 0.00 | |
| Portfolio Type: Total Liquidity Value<br>Participant: Farm Credit Bank of Texas<br>Exposure Type: Summary | -1,187,694.30 | 0.00 | |

FIG. 13H

| ▼ Lodged Collateral | | | ▼ Initial Margin | | |
|---|---|---|---|---|---|
| Portfolio Keys | Limit Utilization | | Portfolio Keys | Limit Utilization | |
| Portfolio Type: Lodged Collateral<br>Account: AgFirst Cust<br>Exposure Type: Weighted Notional | 0.00 | | Portfolio Type: Initial Margin<br>Account: AgFirst Cust<br>Exposure Type: Summary | 13,171,000.00 | |
| Portfolio Type: Lodged Collateral<br>Account: Agrib Cust<br>Exposure Type: Weighted Notional | 0.00 | | Portfolio Type: Initial Margin<br>Account: Agrib Cust<br>Exposure Type: Summary | 72,830,000.00 | |
| Portfolio Type: Lodged Collateral<br>Account: BlkRk House<br>Exposure Type: Weighted Notional | 0.00 | | Portfolio Type: Initial Margin<br>Account: BlkRk House<br>Exposure Type: Summary | 4,075,512.18 | |
| Portfolio Type: Lodged Collateral<br>Account: Bank of America Cust<br>Exposure Type: Weighted Notional | 0.00 | | Portfolio Type: Initial Margin<br>Account: Bank of America Cust<br>Exposure Type: Summary | 150,760,698.10 | |
| Portfolio Type: Lodged Collateral<br>Account: CoBank Cust<br>Exposure Type: Weighted Notional | 0.00 | | Portfolio Type: Initial Margin<br>Account: CoBank Cust<br>Exposure Type: Summary | 249,785,000.00 | |
| Portfolio Type: Lodged Collateral<br>Account: CitiBank HSE<br>Exposure Type: Weighted Notional | 0.00 | | Portfolio Type: Initial Margin<br>Account: CitiBank HSE<br>Exposure Type: Summary | 208,382,163.95 | |
| Page: 1 of 1  Record: 1 of 93 | | | Page: 1 of 1  Record: 1 of 93 | | |

| ▼ Base Margin | | | ▼ Variation Margin | | |
|---|---|---|---|---|---|
| Portfolio Keys | Limit Utilization | | Portfolio Keys | Limit Utilization | |
| Portfolio Type: Base Margin<br>Account: AgFirst Cust<br>Exposure Type: MTM | -97,458,394.37 | | Portfolio Type: Daily Variation Margin<br>Account: AgFirst Cust<br>Exposure Type: Variation Margin | 325,437.38 | |
| Portfolio Type: Base Margin<br>Account: Agrib Cust<br>Exposure Type: MTM | -309,840,868.19 | | Portfolio Type: Daily Variation Margin<br>Account: Agrib Cust<br>Exposure Type: Variation Margin | 1,452,640.20 | |
| Portfolio Type: Base Margin<br>Account: BlkRk House<br>Exposure Type: MTM | 14,028,683.34 | | Portfolio Type: Daily Variation Margin<br>Account: BlkRk House<br>Exposure Type: Variation Margin | 4,574.54 | |
| Portfolio Type: Base Margin<br>Account: Bank of America Cust<br>Exposure Type: MTM | -137,269,437.74 | | Portfolio Type: Daily Variation Margin<br>Account: Bank of America Cust<br>Exposure Type: Variation Margin | 7,003,337.71 | |
| Portfolio Type: Base Margin<br>Account: CoBank Cust<br>Exposure Type: MTM | -1,169,290,471.66 | | Portfolio Type: Daily Variation Margin<br>Account: CoBank Cust<br>Exposure Type: Variation Margin | 5,659,246.81 | |
| Portfolio Type: Base Margin | 71,199,689.07 | | Portfolio Type: Daily Variation Margin | 5,006,102.66 | |
| Page: 1 of 1  Record: 1 of 93 | | | Page: 1 of 1  Record: 1 of 93 | | |

FIG. 13J

| ? | Portfolio Search: | | |
|---|---|---|---|

| ▼ Available Margin | | | |
|---|---|---|---|
| Portfolio Keys | Limit Utilization | Warning Level | |
| Portfolio Type: Available Margin<br>Account: AgFirst Cust<br>Exposure Type: Summary | -13,171,000.00 | 1,000,000.00 | |
| Portfolio Type: Available Margin<br>Account: Agrib Cust<br>Exposure Type: Summary | -72,830,000.00 | 1,000,000.00 | |
| Portfolio Type: Available Margin<br>Account: BlkRk House<br>Exposure Type: Summary | -4,075,512.18 | 1,000,000.00 | |
| Portfolio Type: Available Margin<br>Account: Bank of America Cust<br>Exposure Type: Summary | -150,760,698.10 | 1,000,000.00 | |
| Portfolio Type: Available Margin<br>Account: CoBank Cust<br>Exposure Type: Summary | -249,785,000.00 | 1,000,000.00 | |
| Portfolio Type: Available Margin<br>Account: CitiBank HSE<br>Exposure Type: Summary | -208,382,163.95 | 1,000,000.00 | |

Page: 1 of 1   Record: 1 of 93

| ▼ Total Liquidity Value | | |
|---|---|---|
| Portfolio Keys | Limit Utilization | Warning Level |
| Portfolio Type: Total Liquidity Value<br>Account: AgFirst Cust<br>Exposure Type: Summary | -13,496,437.38 | 2,000,000.00 |
| Portfolio Type: Total Liquidity Value<br>Account: Agrib Cust<br>Exposure Type: Summary | -74,282,640.20 | 2,000,000.00 |
| Portfolio Type: Total Liquidity Value<br>Account: BlkRk House<br>Exposure Type: Summary | -4,080,086.72 | 2,000,000.00 |
| Portfolio Type: Total Liquidity Value<br>Account: Bank of America Cust<br>Exposure Type: Summary | -157,764,035.81 | 2,000,000.00 |
| Portfolio Type: Total Liquidity Value<br>Account: CoBank Cust<br>Exposure Type: Summary | -255,444,246.81 | 2,000,000.00 |
| Portfolio Type: Total Liquidity Value<br>Account: CitiBank HSE<br>Exposure Type: Summary | -213,388,266.61 | 2,000,000.00 |

Page: 1 of 1   Record: 1 of 93

| ▼ Close Out Balance | | |
|---|---|---|
| Portfolio Keys | Limit Utilization | |
| Portfolio Type: Closed-out Balance<br>Account: AgFirst Cust<br>Exposure Type: MTM | 0.00 | |
| Portfolio Type: Closed-out Balance<br>Account: Agrib Cust<br>Exposure Type: MTM | 0.00 | |
| Portfolio Type: Closed-out Balance<br>Account: BlkRk House<br>Exposure Type: MTM | 0.00 | |
| Portfolio Type: Closed-out Balance<br>Account: Bank of America Cust<br>Exposure Type: MTM | 0.00 | |
| Portfolio Type: Closed-out Balance<br>Account: CoBank Cust<br>Exposure Type: MTM | 0.00 | |
| Portfolio Type: Closed-out Balance | 0.00 | |

Page: 1 of 1   Record: 1 of 93

| ▼ Risk Margin | |
|---|---|
| Portfolio Keys | Limit Utilization |
| Portfolio Type: Risk Margin<br>Account: AgFirst Cust<br>Exposure Type: Summary | 325,437.38 |
| Portfolio Type: Risk Margin<br>Account: Agrib Cust<br>Exposure Type: Summary | 1,452,640.20 |
| Portfolio Type: Risk Margin<br>Account: BlkRk House<br>Exposure Type: Summary | 4,574.54 |
| Portfolio Type: Risk Margin<br>Account: Bank of America Cust<br>Exposure Type: Summary | 7,003,337.71 |
| Portfolio Type: Risk Margin<br>Account: CoBank Cust<br>Exposure Type: Summary | 5,659,246.81 |
| Portfolio Type: Risk Margin | 5,006,102.66 |

Page: 1 of 1   Record: 1 of 93

SYSTEMS AND METHODS FOR SWAP CONTRACTS MANAGEMENT WITH A DISCOUNT CURVE FEEDBACK LOOP

This application claims the benefit of U.S. Provisional Application 61/288,247 filed Dec. 18, 2009 the entire content of which is expressly incorporated herein by reference thereto.

TECHNICAL FIELD

The present invention relates to managing a computer system for electronic trading of financial instruments with a clearinghouse as a counter-party to trades, and more and more particularly but not exclusively to managing swap contracts.

BACKGROUND

The Commodity Futures Modernization Act (CFMA) of 2000 regulates futures clearinghouses. The CFMA permits clearinghouses to participate in the clearing of Over the Counter (OTC) derivatives. Prior to the CFMA, OTC contracts had to be cleared "bilaterally," that is, between the two counterparties to a contract. After the CFMA, OTC contracts could be cleared "multilaterally," that is, collectively across multiple OTC counterparties through a central clearinghouse."

Futures clearinghouses, including the NYMEX clearinghouse, offers products that facilitate OTC clearing. The clearinghouses offer for example OTC clearing services on selected energy products. The clearinghouses convert OTC positions into futures positions and then clears the futures positions. OTC positions are converted to futures through a transaction called an exchange of futures for swaps, or EFS transaction. The parties to EFS are allowed to privately negotiate the execution of an OTC swap and related futures transaction on their own pricing terms. To initiate an EFS position a market participant must work through a member of the clearinghouse. The clearing member is responsible for evaluating the creditworthiness of the market participant.

Certain types of derivative contracts such as interest rate swap contracts are traded in a bilateral manner in an OTC market between buyers and sellers and have not traditionally been traded on an electronic exchange with a clearinghouse as a counter-party (e.g., multilateral clearing). Because these contracts have not been traded on an electronic exchange with a clearinghouse as a counter-party, certain efficiency, accuracy, and transparency in the use of technical components of the exchange have not been realized. For example, accurate and timely management of the computer system for providing the exchange, and accurate and timely data management, data presentation, margin management, and other financial risk management of the trading system itself has not been needed or realized.

Moreover, bilateral trading without the use of an accurate, timely, and risk managed electronic exchange (e.g., using a computer system) creates systemic risk in the financial system, that for example, is attributed in part to the financial crisis in the second half of 2008. Risks of defaults by the bilateral parties also increase transaction costs and create risks in the global financial markets. A lack of an open exchange and a lack transparency of the costs and values of these derivative trading also create systemic risk, for example, the risk that failure of a single market participant having a disproportionate effect on the overall market, the risk of financial bubbles and dangerous imbalances, or the like. Therefore, it is with respect to these problems and others that the current invention is directed.

SUMMARY OF THE INVENTION

One embodiment of the present invention is directed to a computer implemented method for managing a computer system for electronic trading of financial instruments that include swap contracts with a clearinghouse as a counter-party to trades. In one embodiment, each step is conducted by a computer system. In one embodiment, the steps include receiving in real-time a plurality of inputs that includes trade data for trades of swap contracts executed using the computer system; determining by an electronic component within the computer system in real-time, a discount curve for projected prices of future swap contracts over time based on the received plurality of inputs; and incorporating data about a trade of the swap contract that is valued based on the discount curve and that is executed within the computer system into the trade data used for determining the discount curve to provide a feedback loop into the real-time determination of the discount curve to provide information that assists in managing the electronic trading of the financial instruments.

In one embodiment, the inputs include data for historical or real-time trades of swap contracts and the method further includes valuing a swap contract price based on the determined discount curve; and determining a margin requirement for a user who wishes to trade or hold a position in the swap contract based on the swap contract price and the determined discount curve, with the trading or holding managed in a user account.

In one embodiment, the executing of the trade for the user further includes receiving a request for the trade of the swap contract by the user based on the provided determined discount curve and the swap contract price; and executing the trade at a price that is based on the swap contract price.

In one embodiment, the discount curve is determined in real-time by aggregating the inputs based on a source of the inputs, wherein the source of the inputs includes an interbroker dealer specializing in a type of the swap contract, financial data vendors, and prior trades executed using the computer system, and wherein the inputs include characteristics that include a bid price, an offer price, a best offer price, a best bid price, and a time; filtering the inputs based on the source of the inputs and the characteristics of the inputs; projecting the discount curve through data points in time that are based on the filtered inputs; and constraining the projected discount curve at or near a time of at least one of the inputs based on the best offer price and the best bid price.

In one embodiment, the determining in real-time of the discount curve includes filtering the inputs based on the source of the inputs and a value of the inputs; weighting the inputs based on the source of the inputs and the characteristics of the inputs.

In one embodiment, the method further includes providing in real-time to a plurality of users the determined discount curve and the swap contract price; wherein the swap contract price has a price range that includes three or more decimal places, wherein the provided discount curve includes a plurality of time portions associated with a type or rate of the swap contract, wherein the portions includes a short term portion, a medium term portion, and a long term portion.

In one embodiment, the method further includes valuing the swap contract price by calculating the swap contract price over a plurality of dates based on a net present value of a cash flow for the swap contract and a discount rate that is based on the discount curve.

In one embodiment, the method further includes receiving a plurality of swap contracts configured for trading over a network or market; determining data structures based on the plurality of swap contracts for trading within the computer system; and based on the determined data structures, transferring an interest rate exposure of the plurality of swap contracts into a centrally cleared environment by providing executions for trading the plurality of swap contracts with the clearinghouse as the counter party.

In one embodiment, the method further includes providing a margin call report for a hierarchy of users ranging over a company level, a group level, and an individual trader level based on the determination of the user's margin requirement.

In one embodiment, method further includes providing in real-time to the plurality of users, data from the inputs in a user interface that includes the discount curve determined from such data. In one embodiment, the method further includes providing in real-time to the plurality of users, the determined discount curve and the swap contract price; wherein the discount curve is configured as data compatible for computing trading strategies or validation of contract prices of at least one of the financial instruments or swap contracts to be traded.

In one embodiment, the trading of the swap contracts includes recording in processor readable media a sell or buy of the trade at the price in an account of the clearinghouse, wherein other trades within the computer system is recorded against the clearinghouse account.

In one embodiment, the determining of the margin requirement further includes determining a long and short position of the user in each contract held by the user; determining margin charges for a plurality of buckets, each bucket including at least one year, wherein a charge in each bucket is netted or offsetted based on a charge in other buckets for other years; and determining the margin requirement in a current time based on the determined positions and the margin charges.

One embodiment of the present invention is directed to a computer system for electronic trading of financial instruments that include swap contacts with a clearinghouse as a counter-party to trades, comprising a server configured to perform actions that include receiving in real-time a plurality of inputs that includes trade data for trades executed using the server; determining in real-time, a discount curve for projected prices of future swap contracts over time based on the received plurality of inputs; and incorporating data about a trade of the swap contract that is valued based on the discount curve and that is executed within the computer system into the trade data used for determining the discount curve to provide a feedback loop into the real-time determination of the discount curve to provide information that assists in managing the electronic trading of the financial instruments. The computer system can also include a third-party data provider device configured to provide pricing data; and a client device configured to send trade information to the server to trade the financial instruments.

In one embodiment, the inputs include data for historical or real-time trades of swap contracts and the discount curve is determined by filtering the inputs for outlier data; weighting the inputs based on their source; and computing the discount curve based on a decomposition of a covariance matrix of the filtered and weighted inputs.

In one embodiment, the discount curve includes a plurality of time portions associated with a type or rate of the swap contract, wherein the portions includes a short term portion, a medium term portion, and a long term portion.

In one embodiment, the actions further includes valuing of the swap contract price by calculating the swap contract price over a plurality of dates based on a net present value of a cash flow for the swap contract and discount rate that is based on the discount curve.

One embodiment of the present invention is directed to a computer apparatus for managing electronic trading of financial instruments that include swap contacts with a clearinghouse as a counter-party to trades, comprising a transceiver for sending and receiving data; a processor. In one embodiment, the process is configured to perform actions that include receiving in real-time a plurality of inputs that includes trade data for trades executed using the apparatus; determining in real-time, a discount curve for projected prices of future swap contracts over time based on the received plurality of inputs; and incorporating data about a trade of the swap contract that is valued based on the discount curve and that is executed within the computer system into the trade data used for determining the discount curve to provide a feedback loop into the real-time determination of the discount curve to provide information that assists in managing the electronic trading of the financial instruments.

In one embodiment, the discount curve is determined by filtering the inputs for outlier data; weighting the inputs based on the source of the inputs; and computing the discount curve based on interpolation between the inputs over time that have been filtered and weighed.

In one embodiment, the discount curve includes a plurality of time portions associated with a type or rate of the swap contract, wherein the portions includes a short term portion, a medium term portion, and a long term portion.

One embodiment of the present invention is directed to a processor readable medium for managing a computer system for electronic trading of financial instruments that include swap contacts with a clearinghouse as a counter-party to trades, the processor readable medium comprising instructions that when executed by a processor causes the processor to perform actions that includes receiving in real-time a plurality of inputs that includes trade data for trades executed using the computer system;

determining by an electronic component within the computer system in real-time, a discount curve for projected prices of future swap contracts over time based on the received plurality of inputs; and incorporating data about a trade of the swap contract that is valued based on the discount curve and that is executed within the computer system into the trade data used for determining the discount curve to provide a feedback loop into the real-time determination of the discount curve to provide information that assists in managing the electronic trading of the financial instruments.

In one embodiment, the actions further includes providing a carry and decay analysis of the valued swap contract; and providing a principal component analysis of the valued swap contract.

One embodiment of the present invention is directed to a computer implemented method for managing a computer system for electronic trading of financial instruments that include swap contacts with a clearinghouse as a counter-party to trades. In one embodiment, each step is conducted by a computer system. In one embodiment, the method includes receiving historical and ongoing data about trades of bilateral swap contracts of a user to generate a discount curve with projected prices for future swap contracts; simulating the trades with the clearinghouse as a simulated counterparty within the computer system based on the discount curve; incorporating data about the simulated trades into trade data used for generating the discount curve to provide a feedback loop into the generation of the discount curve; and generating simulated daily reports about the simulated trades comprising margin usage and pricing of the trades. One embodiment of the present invention is directed to a computer system comprising a server configured to perform the steps. One embodiment of the present invention is directed to a computer apparatus comprising a processor configured to perform the steps. One embodiment of the present invention is directed to a processor readable medium comprising instructions that when executed by a processor causes the processor to perform the steps.

One embodiment of the present invention is directed to a computer implemented method for managing a computer system for reducing risk during electronic trading of financial instruments that include swap contacts with a clearinghouse as a counter-party to trades. In one embodiment, each step is conducted on a computer system. In one embodiment, the method includes managing trading of a user that meets risk standards by managing a margin requirement of the user based on a computed discount curve for a plurality of swap contracts; netting and offsetting similar contacts managed by the system to reduce overall residual risk of the electronic trading of the financial instruments between users the clearinghouse; and incorporating data about the trading of the user into trade data used for computing the discount curve to provide a feedback loop into the computation of the discount curve to provide information that assists in managing the electronic trading of the financial instruments.

Other embodiments of the present invention are directed to a computer system comprising a server configured to perform the method, a computer apparatus comprising a processor configured to perform the previous methods and a non-transitory processor readable medium comprising instructions that when executed by a processor causes the processor to perform the previous methods.

BRIEF DESCRIPTION OF THE DRAWINGS

Further features of the invention, its nature and various advantages will be more apparent from the following detailed description, taken in conjunction with the accompanying drawings in which like reference characters refer to like parts throughout, and in which:

FIGS. 3C-3K show block diagrams of examples of processes for managing internal and market risk in relation to a swap contract exchange in accordance with embodiments of the present invention;

FIGS. 5A-5C are flow charts and data structures for determining in real-time the discount curve in accordance with embodiments of the present invention;

FIGS. 6A-6C show examples of processes and data structures for using a Discount Curve to value swap contracts/instruments in accordance with embodiments of the present invention;

FIGS. 7A-7H are examples of flow charts and data structures for managing margin within the system in accordance with embodiments of the present invention FIGS. 8A-8F are examples of flow charts and data structures for providing analysis data for the system in accordance with embodiments of the present invention;

FIGS. 11A-11D, 12A-12L and 13A-13M show examples of processes, data structures, and user interfaces for managing trading of swap contracts and margin based on a determined discount curve in accordance with embodiments of the present invention.

DETAILED DESCRIPTION OF EMBODIMENTS

Figure 1:
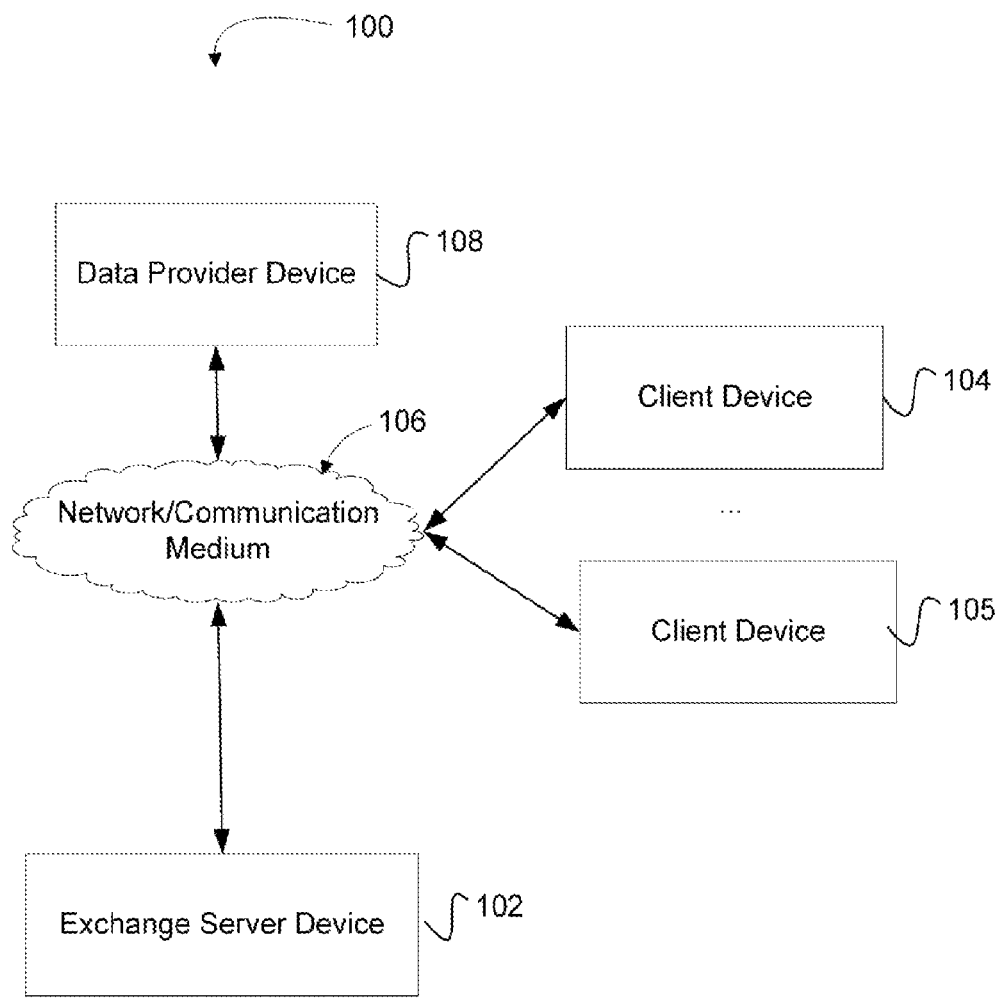
FIG. 1 shows a block diagram that illustrates a system for managing swap contracts in accordance with embodiments of the present invention.

The following description is presented to enable any person of ordinary skill in the art to practice the present invention. Various modifications to the preferred embodiment will be readily apparent to those of ordinary skill in the art, and the principles defined herein may be applied to other embodiments and applications without departing from the spirit and scope of the present invention and appended claims. Thus, the present invention is not intended to be limited to the specific embodiments shown, but the claims are to be accorded an appropriate scope consistent with the principles and features disclosed herein as understood by skilled artisans.

As used herein, the term "component" refers to computer implemented mechanisms, including software combined with hardware such as a computer process and/or computer memory, or purely hardware mechanisms such as an application-specific integrated circuit (ASIC), or the like.

As used herein, the term "financial instrument" contract includes data structures and computer processor executed rules for representing a obligations of a plurality of parties, including the obligations to transact commerce, pay monies, provide information through a variety of mechanisms, including computer and/or network based mechanisms or the like.

As used herein, the term "derivative" contract includes data structures and computer processor executed rules for representing a financial instrument that is derived from some other asset, index, event, value or condition (known as the underlying asset). As used herein, the term swap, swap contract, and/or interest rate swap refers to a derivative contract in which one party exchanges a stream of interest payments for another party's stream of cash flows. Interest rate swaps can be used by hedgers to manage their fixed or floating assets and liabilities. These data structures preferably are stored and managed in computer readable memory such as main memory, cache, files, databases, data streams, or the like.

Generally, aspects of the invention are directed to a method, system, apparatus and media for providing an exchange and clearinghouse for trading swap contracts. Embodiments of the invention are directed to manage trading of financial instruments with a clearinghouse as a counter-party to trades. A plurality of inputs that includes trade data for trades executed using the computer system is received. A discount curve for projected prices of a swap contract over time based on the received plurality of inputs is determined in real-time. A swap contract price is valued based on the determined discount curve. A margin requirement is determined for a user who wishes to trade or hold a position in the swap contract in the user's account based on the swap contract price and/or the determined discount curve. Data about a trade of the swap contract that is executed within the computer system is incorporated into the trade data used for determining the discount curve to provide a feedback loop into the real-time determination of the discount curve.

While the description below is directed to trading on an exchange and/or a clearinghouse, the system can be modified to for the trading of the swap to occur off the exchange at an OTC market based on the discount curve provided through the system, and the trade can be recorded and/or cleared within the system. In one embodiment, where exchange processing is mentioned, the system can be modified to provide trade in an OTC and settle trade within the system.

In one embodiment, components of the system are configured to receive in real-time a plurality of inputs that includes at least real trade data (e.g., ask price, bid price, and trade rate) performed within the system. The components can be configured to determine in real-time a discount curve that reflects the projected future price of the swap contract based on the plurality of inputs.

In one embodiment, the components can value the swap contract price in real-time based on the determined curve. For example, the swap contract price can be valued for at least 30 years and/or rest of the lifetime of the swap contract; the dates and associated cash flow for the swap contract is determined; the discount rate is determined based on the curve; and/or the price is determined based on the net present value that is based on the cash flow and discount rate.

In one embodiment, the components can determine in real-time a margin requirement for an account of a trader who wishes to trade or holds a position in the swap contract based on the discount curve and the valued swap contract price. For example, the margin requirement can also be determined based on the characteristics of all swap contracts owned by the trader, the long and short positions of the trader, the amount of funds available for the trader, and/or a history of trading of the trader; and/or the margin calculation can be based on computing the margin charges per buckets over a plurality of years, where the charge in each bucket can be netted or offsetted based on the charge in other buckets for other years.

In one embodiment, the components can electronically trade the swap contract based on the real-time determined swap contract price similar to trading of traditional futures contract within the exchange, with the clearinghouse acting as the counter party.

In one embodiment, the components can provide the discount curve in real-time for third-parties. For example, the third parties can use the discount curve to project trade strategies; and/or the third parties can use the discount curve to independently validate other contract prices In one embodiment, the components can determine in real-time the discount curve by, for example, pre-processing the inputs and/or calculating the curve. For example, the components can aggregate the inputs; the inputs can include at least data from interbroker dealer(s) specializing in the type of the swap contract and financial data vendor(s); and/or the input can also include data for trades performed within the system, thus providing a feedback loop for determining the discount curve. The data from within the system can include bid and offer prices, best offer and best bid prices.

In one embodiment, the components can calculate the curve. For example, the inputs can be filtered to remove outlier data; the inputs can combined in a weighted average; for a data point in time of the inputs that includes a bid and offer price, the projected point can be a computed average or the traded rate can be used; for a data point in time, the curve can be constrained to fall between a best offer and best bid price; the input from within the system can be weighted higher or prioritized more; the curve can be based on at least one of least square regression, log-linear interpolation, or the like; the curve can be based on a time weighted average of the real time received data (e.g., in the last 15 minutes)

In one embodiment, the components can provide the curve. For example, the discount curve can be projected out to at least 30 years; the discount curve can be projected for time intervals appropriate for the swap contract; the discount curve can also be characterized as a zero coupon discount curve; and/or the discount curve can have several portions, including a short term, medium term, and long term portion, where each portion can be applicable to particular types of rates.

In other embodiments, the system can also be configured to provide a price range for the swap contract, including to 3 or more decimal places in a more narrow range than in prior swap contracts for greater transparency; provide reports based on the margin calls for a hierarchy of traders (e.g., the reports can range from a company level, a group level, to an individual trader level); provide the inputs to the public via a plurality of interfaces; provide a substantially unbiased discount curve that is based on publicly provided inputs; and/or provide a trading system for other types of options contracts and/or derivative contracts normally traded over the counter or bilaterally between two parties.

The methods, systems, apparatuses, and media of the invention described herein produces tangible technical results that are at least an improvement over other techniques, including for example, producing a more accurate and timely discount curve for managing trades. The methods described herein are implemented using a computer or processor combined with software. Moreover, the use of the methods, systems, apparatuses, and media described herein create a transformation of articles because they reduce memory usage since not all inputs needs representing a discount curve needs to be to be stored, allows more and quicker trades since the trades can be substantially concurrent based on real-time computed data.

In one embodiment, the clearing of swap contracts using the present invention as described herein increases the efficiency of the transactions by, for example, facilitating the offset and netting of contract obligations, and lowers the systemic risk by lower the risk that failure of a single swap trader market participant having a disproportionate effect on the overall swap market. In general, the evolution of the OTC market to use clearing houses for heretofore purely bilateral contracts leads to several benefits for market participants as well as for the financial infrastructure. Clearing necessitates a much higher level of transparency which leads to lower transaction costs and increased liquidity. By widening and deepening the liquidity pool, systemic risk is lowered as the risk transfer mechanism is strengthened and renewed. The payment of margin (initial and variation) acts as a deleveraging mechanism which helps to prevent financial bubbles and dangerous imbalances.

Illustrative System

As discussed above, the present invention relates to electronic identification and/or associating data with an identified user. FIG. 1 shows a block diagram that illustrates a system for managing swap contracts in accordance with embodiments of the present invention. The system 100 includes an server 102 that can communicate via a network/communication medium 106 with the client 104. Network/communication medium 106 can be a wired and/or wireless communication medium. System 100 can also include third-party services 108, which can communicate with the server 102 or client 104 via the network/communication medium 106.

In one aspect, client 104 and server 102 can be separate devices in communication over a computer network. The network communications can be via network interfaces. In one aspect, client 104 and server 102 can be separate devices in communication over a communication interface, such as a cellular or PSTN telephone call. There can be more or fewer components without departing from the scope of the invention. For example, there can be other processors computing different aspects of the operations of the components of server 102. In other aspects, the processor of the client 104 and server 102 can be the same processor. Also, other communication configurations can also be used besides client-server, such as a peer-to-peer configuration with a plurality of interconnected peers, wherein any node in the peer-to-peer network can perform the actions of the client 104 or server 102. Of course, any additional components can be in communication or otherwise in operative association with the client 104 or server 102.

Third-party data provider device 108 includes any device configured to provide pricing data. In one embodiment, device 108 can host bilateral swap exchanges between parties. The trade data for the bilateral contracts can be gathered and sent to server device 102. Device 108 can also provide information varying from, for example, short term. LIBOR rates, medium term FRA rates, to longer term swap rates.

Client devices 104-105 includes any device configured to send trade information to the server to trade the financial instruments. In one embodiment, the client devices 104-105 are configured to trade swap instruments based on information provided by the server device 102. The information can include the projected price of the swap instrument based on a project discount curve as described herein.

Server device 102 includes any device configured to managing trading of swap or other derivative contracts. In one embodiment, the server device 102 can perform actions including receiving in real-time, a plurality of inputs that includes trade data for trades from the services 108 and/or executed using the server device and the pricing data provided by the third-party data provider device; determining in real-time, a discount curve for projected prices of a swap contract over time based on the received plurality of inputs; valuing a swap contract price based on the determined discount curve; and determining a margin requirement for a user who wishes to trade or hold a position in the swap contract in the user's account based on the swap contract price. Server device 102 can also be configured to perform actions including receiving a request for a trade of the swap contract by the user based on the provided determined discount curve and the swap contract price; executing the trade at a price that is based on the swap contract price; and incorporating data about the trade into the trade data used for determining the discount curve to provide a feedback loop into the real-time determination of the discount curve. Generally, server device 102 can be configured to perform the processes of FIGS. 3-11.

Attachment A discloses a rule book for implementing an embodiment of a system in accordance with the present invention. Where Attachment A recites the rules "must" or "shall" be performed, it is understood that this is one embodiment, and that in other embodiments, the rules are non-limiting, and in some embodiments, not all rules are performed, and/or other rules may also be added without departing from the scope of the invention. The entities defined e.g., in Rule 501 of Attachment A should be considered non-limiting, and entities that are persons can replaced with computer components where appropriate. Time limits, amount limits, or the like are preferred embodiments, and other values can be used without departing from the scope of the invention.

The rules described in Attachment A, while in some cases are recited as being performed by persons, committees, or the like, can also or alternately be performed by computer components, including server device 102 of the system and/or other hardware or hardware in combination with software of various apparatuses as described herein. For example, at least some operations of the clearinghouse, including margin maintenance, fund management, provisioning of discount curves, sending of notices, or the like can be performed by server device 102.

Where Attachment A describes operations performed "only" by or "always" by an entity, it is understood that this is one embodiment, and that in other embodiments, other entities may perform the actions and/or the actions may selectively performed or not performed at all. Where Attachment A describes "all" of something is determined, performed, or otherwise operated on, it is understood that this is one embodiment, and that in other embodiments, some of the things may be selectively operated on, or none of the things may be operated on.

Illustrative Apparatus

Figure 2A:
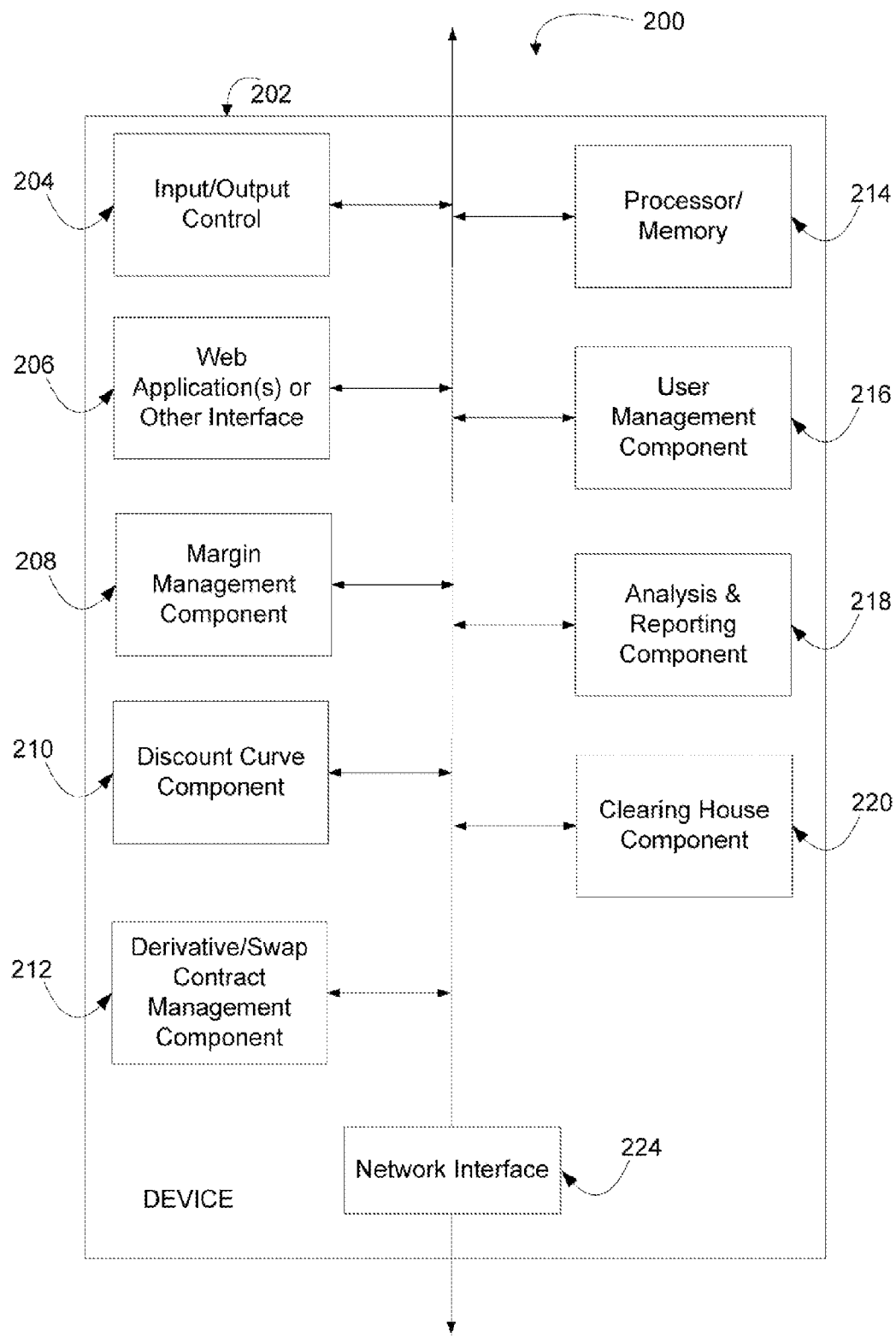
FIGS. 2A-2E show block diagrams of examples of one or more apparatuses for managing swap contracts in accordance with embodiments of the invention.
Figure 2B:
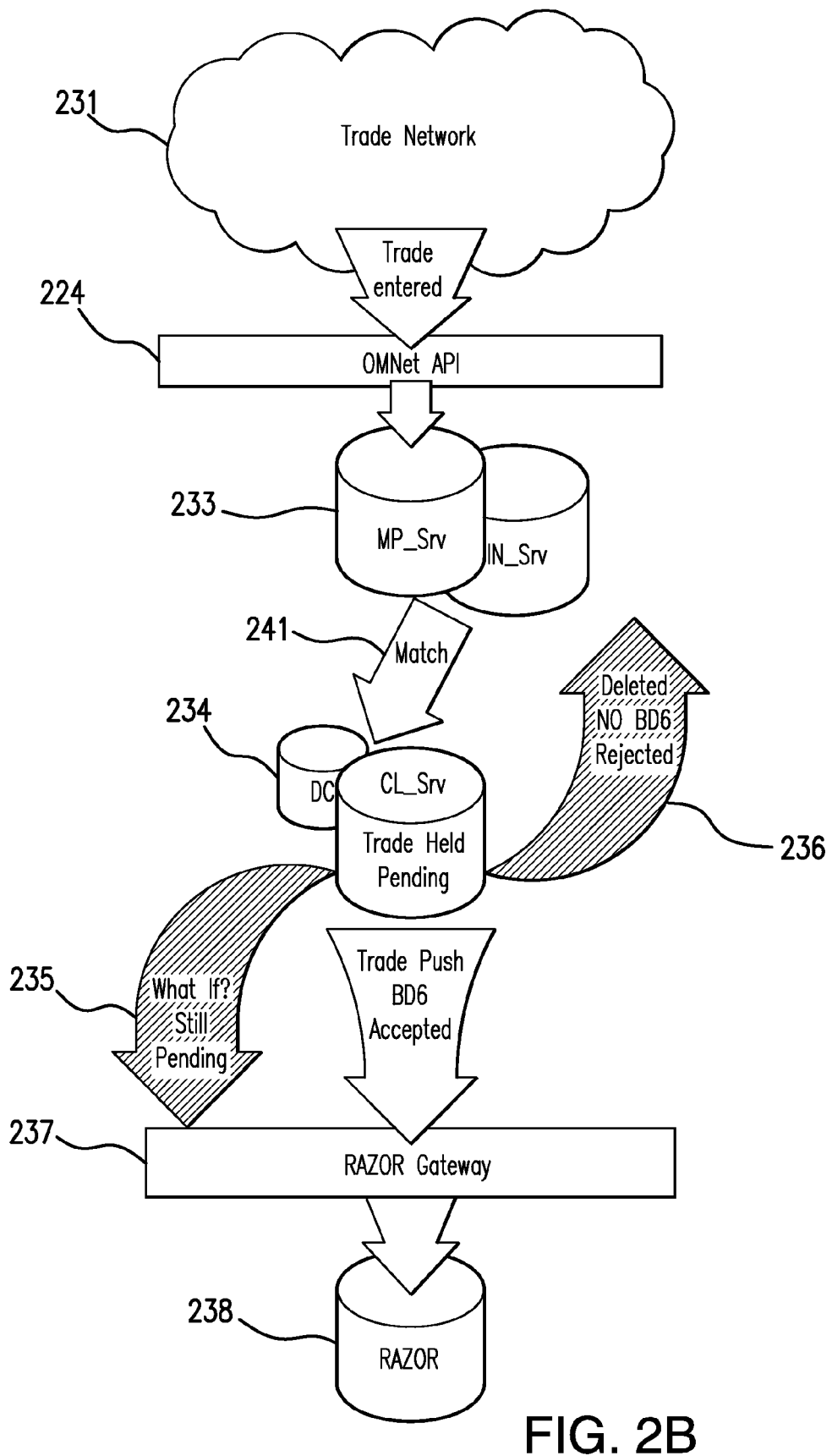
Figure 2C:
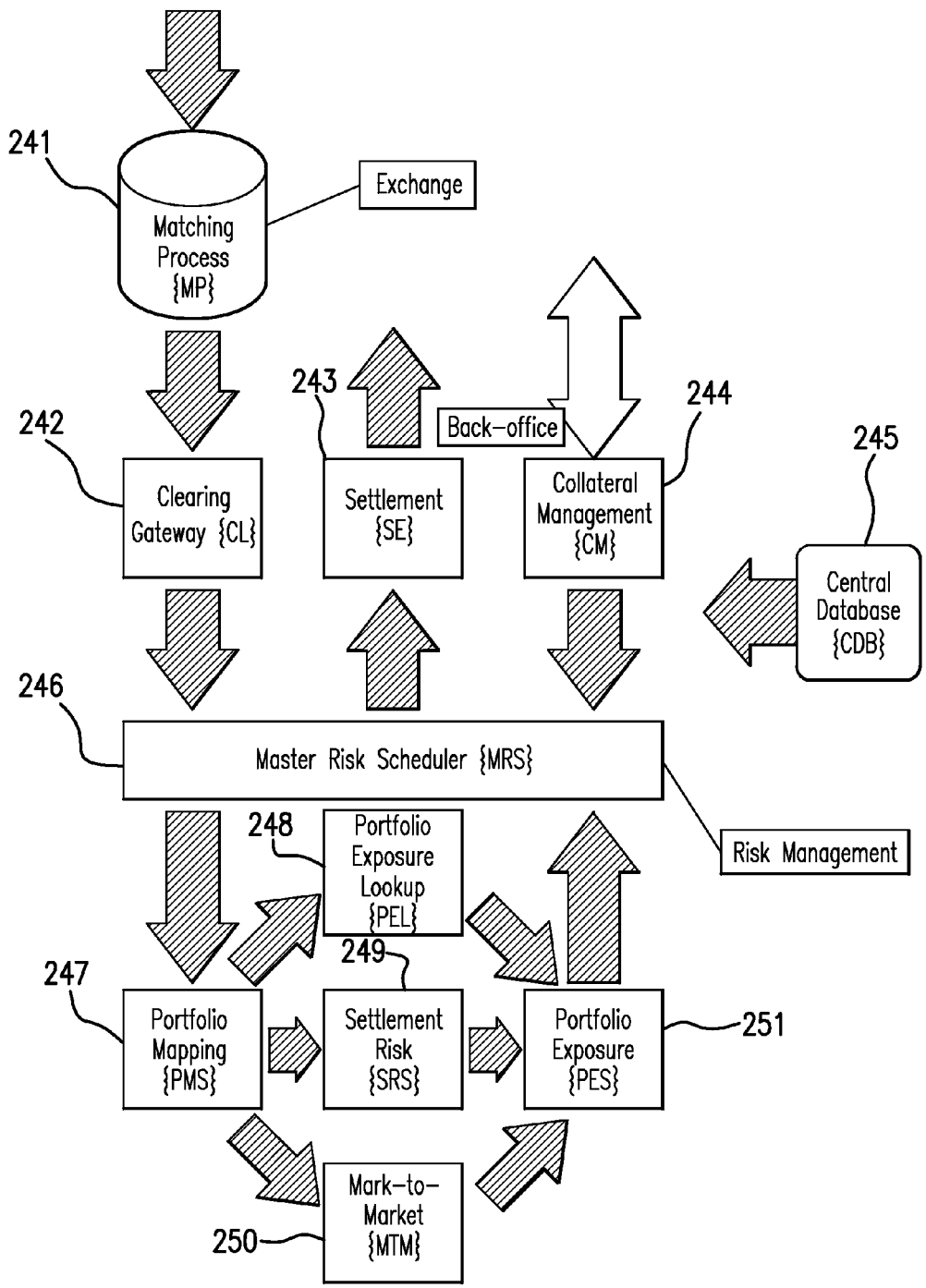

FIGS. 2A-2C show block diagrams of examples of one or more apparatuses for managing swap contracts in accordance with embodiments of the invention. Device 200 of FIG. 2A can implement any of the components of FIG. 1, and in particular, server 102.

As shown, device 200 comprises components in communication with each other, including input/output control 204, processor/memory 214, and web application 206. Input/output control 204 provides an interface for entering user commands and/or receiving feedback from the device. The control 204 can comprise a keyboard, mouse, sound output, haptic output, visual output, etc. Processor/memory 214 includes any computing component and/or computer memory component. For example, the processor includes any device for performing computerized operations, such as running a program based on processor-readable instructions stored within a memory such as RAM, ROM, EEPROM, hard-disk drive, etc. Web application 208 includes any component for providing a user interface. Web application 208 can provide access to the resources of device 200, including providing a web interface for trading, providing margin calls and/or providing the discount curve. A user can manage the services provided using the web application 206 using input/output control 204. As shown, the components of device 200 are configured to communicate via network, bus, or communication interface 224.

Margin management component 208 includes any hardware and/or hardware and software component configured to determine a margin requirement for a user who wishes to trade or hold a position in the swap contract in the user's account based on the swap contract price; wherein if the determined margin requirement equals or exceeds a threshold for maintenance of funds for the account, issuing a margin call for the account. Component 208 can be configured to perform at least some of the steps of the processes of FIGS. 3B, 7A-7H.

Discount curve component 210 includes any hardware and/or hardware and software component configured to determine in real-time based on a plurality of inputs that includes trade data for trades including historic and/or real-time data (e.g., received in real-time over the network interface 224) and/or trades executed using the apparatus and/or determine in real-time, a discount curve for projected prices of a swap contract over time based on the received plurality of inputs. Component 210 can be configured to perform the process of FIG. 3A-3B.

Derivative/Swap Contract Management component 212 includes any hardware and/or hardware and software component configured to value a swap contract price based on the determined discount curve. Component 212 can be configured to perform the processes of FIGS. 6A-6C.

Trading component 216 includes any hardware and/or hardware and software component configured to receive a request for a trade of the swap contract by the user based on the provided determined discount curve and the swap contract price; execute the trade at a price that is based on the swap contract price; and/or send the data to component to 216 to incorporate data about the trade into the trade data used for determining the discount curve to provide a feedback loop into the real-time determination of the discount curve.

Analysis component 218 includes any hardware and/or hardware and software component configured to produce analysis reports about the swap contracts in the system and/or shadow or simulated clearing of a portfolio derivates within the electronic exchange computer system and/or providing reports.

Clearinghouse component 220 includes any hardware and/or hardware and software component configured to manage the accounts and processing of the clearinghouse. In one embodiment, component 220 may manage a guaranty fund based, for example, on the results of a discount curve as disclosed herein.

FIG. 2B shows other components that may be included in device 200 and/or used to perform the processes disclosed herein. In one embodiment, FIG. 2B shows a logical layout of the systems subsystems that are involved in a swapdrop transaction. The cloud 231 can represent the internet. Components of FIG. 2B can implement any of the components of FIG. 1, and in particular, server 102. As shown, Trade network 231 receives trades from client devices. The trades are entered into the OMNet Application Programming Interface (API) 224 which may be exposed as a network protocol. The data is sent via component 224 to various databases 233. The trades entered into various databases 233 are matched by matching process 241 against the offered contracts in databases 234 and held pending in databases 234. In one embodiment, matching process 241 includes any component configured to match transactions involving a swap contract, e.g., matching a buy to a sale of the swap contract.

Trades (e.g., BD6) that are cleared or accepted for processing are sent or pushed to the Razor gateway 237 for risk management. Razor gateway 237 may manage the margin based on the discount rate as described herein. If the trades are not accepted but are instead rejected as determined by component 236, the trades are sent back to the clients or otherwise cleared from the system. If the trades are not accepted but are still pending as determined by component 235, the trades are sent to Razor gateway 237 for processing. Razor gateway 237 process and stores data associated with risk management and/or margin management as described herein and stores related data in razor database 238.

FIG. 2C shows other components that may be included in device 200 and/or used to perform the processes disclosed herein. In one embodiment, FIG. 2C provides a logical layout of subsystems and shows matching into risk and into settlement process flow.

Components of FIG. 2C can implement any of the components of FIG. 1, and in particular, server 102. The components communicate with each other via OMNet 224.

As shown, matching process 241 includes any component configured to match a trade of a swap contract with appropriate clearing and risk management facilities. The swap trades may be stored in component 241. The swap trade may flow next to clearing gateway 242.

Clearing gateway 242 includes any component configured to receive and confirm appropriate parameters of a trade. The trade next flows to master risk scheduler 246. Master risk scheduler 246 routes the trade to various risk and settlement components based on a process flow. Scheduler 246 may route the trade to Portfolio mapping 247. Portfolio mapping 241 may be configured for a particular user and/or type of user. Based on the portfolio limits and/or requirements of the user, the trade is routed to any, some, or all of portfolio exposure lookup 248, settlement risk component 249, mark-to-market 250. Portfolio exposure lookup 248 looks up the exposure of the trade if it were to be executed on the portfolio, including the risk of default on payments by the user. Settlement risk component 249 computes the risk of the settlement not being performed, or other risks associated with the settlement. Mark-to-market 250 marks to market the value of the swap trade. These components send the results of this analysis and/or the trade to portfolio exposure 251 which bundles the information, determines if the trade satisfies risk criteria, and if so, sends the trade and associated settlement and risk data to master risk scheduler 246. Master risk scheduler 246 then sends the trade and associated data to settlement 243 to settle the trade. Settlement 243 may exist in a back-office and may send the trade settlement acknowledgment to other computers. Collateral management 244 may receive funds for collateral and/or send notifications for more funds for collateral to a user (e.g., to the back-office). Master risk scheduler 246 receives information about the collateral associated with a user and sends this information to the risk management component 247. Various data produced and/or used throughout the process and system may be stored and provided from central database 245.

Figure 2D:
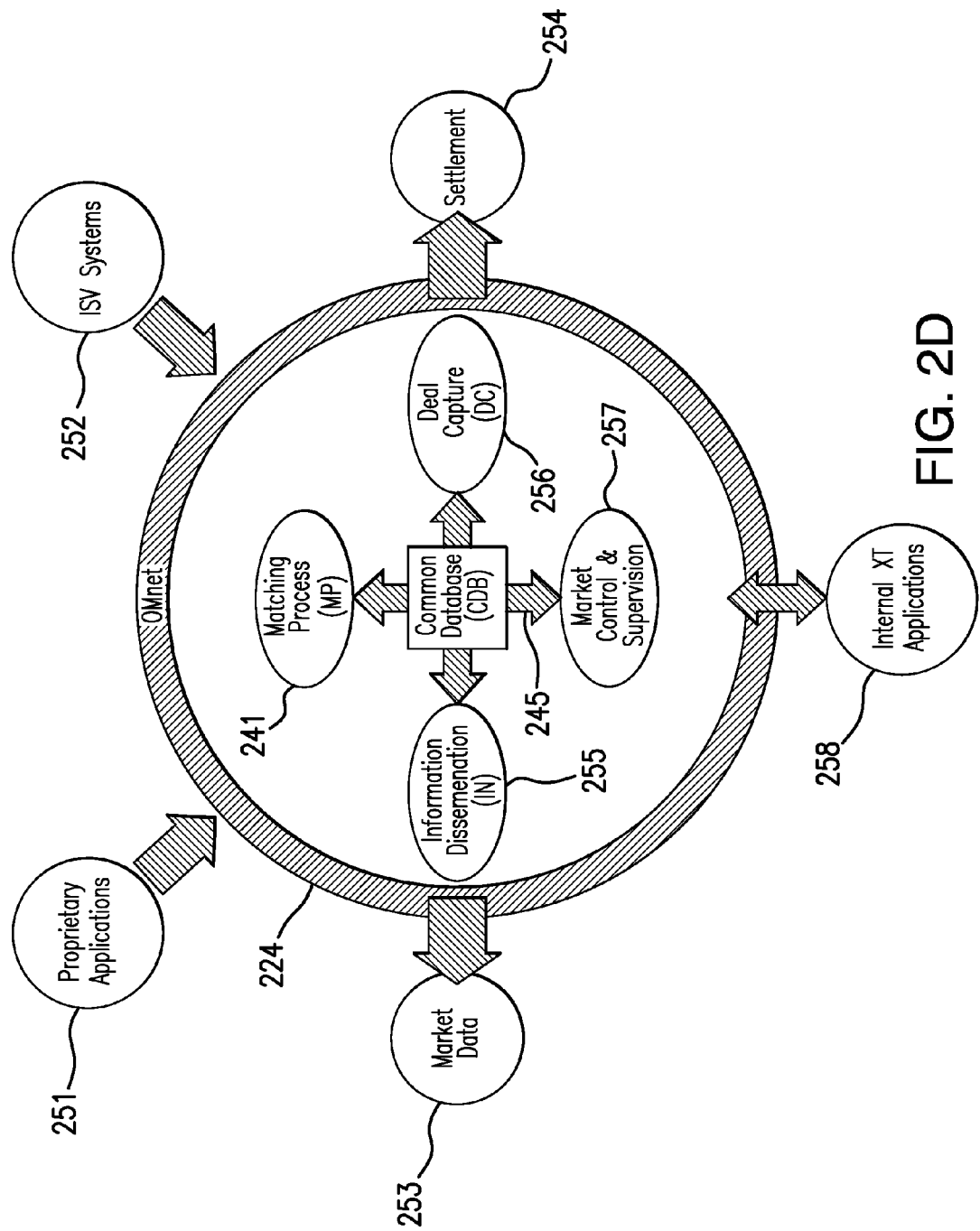

FIG. 2D shows other components that may be included in device 200 and/or used to perform the processes disclosed herein. 2D is an example of external communications to various standard systems that are configured to connect to the trading system.

Components of FIG. 2D can implement any of the components of FIG. 1, and in particular, server 102. Various third-party components (e.g., from data provider 108) are configured to components of the system (e.g., from server 102) via OMNet 224. For example, Internal XT Applications 258 includes any component configured to manage third-party programs for communicating with the system, processing trading of swaps, etc. Proprietary applications 251 include any component configured to further process data provided by the system, including the discount curve and swap contract. ISV systems 252 include any component configured to provide yet other services, such as from independent software vendors. Internal XT Applications 258, Proprietary applications 251, and ISV systems 252 are in communication with the other components of the apparatus 200 via the OMNet network 224.

As shown, common database 245 is configured to store a plurality of information including information from matching process 241, information dissemination 255, deal capture 256, and market control and supervision 257. Matching process 241 includes any component configured to process received trades as described above. Deal capture 256 is configured to capture information about various settlements of trades, trading strategy, or the like. Market control & supervision 257 manages the timing of sales, movements of trades within the market, margin, the discount curve, and the like. Information dissemination 255 provides information about the various processes that are in communication with common database 245 and may provide information external to the system, for example to market data 253. Market data 253 may include any component configured to provide the data for re-use.

Figure 2E:
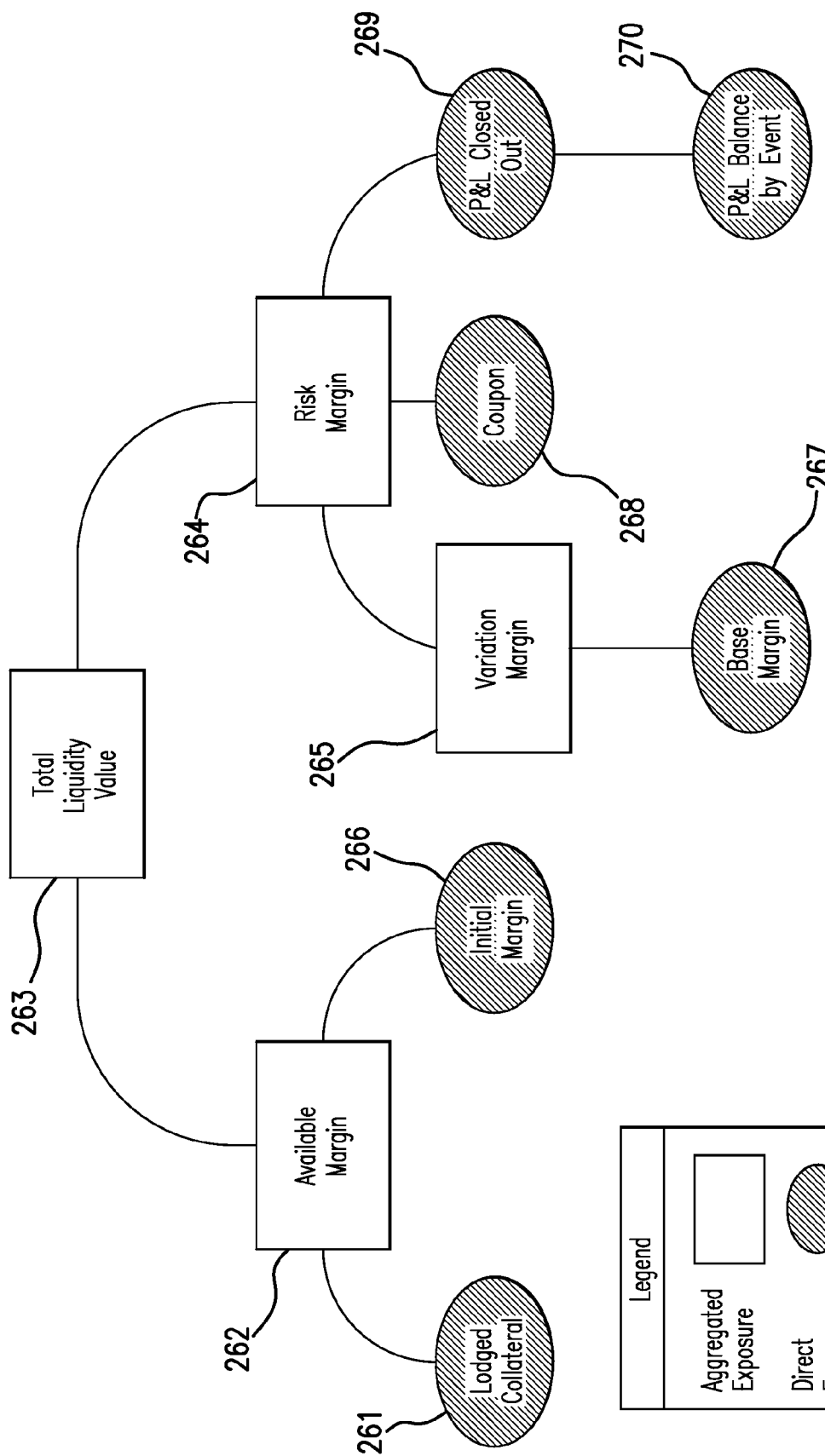

FIG. 2E shows other components that may be included in device 200 and/or used to perform the processes disclosed herein. In one embodiment, FIG. 2E is a graphical example of the account risk hierarchy for a clearing members house or client account. Components of FIG. 2E can implement any of the components of FIG. 1, and in particular, server 102. The components may use the process of FIGS. 3B, 7A-7H to manage the margin.

As shown, total liquidity value 263 includes any component configured to compute the total liquidity value of the system and/or of a user's account. Component 263 may base its computation on data from available margin 262 and risk margin 264. Available margin 262 may compute the available margin available for the system and/or a user's account based on lodged collateral 261 and/or initial margin 266. Risk margin 264 compute the risk to the system posed by the various margin amounts and/or the Guaranty Fund of the system. Risk margin 264 can base its determination on the results of variation margin 265, coupon 268, and/or P&L closed out 269. Coupon 268 can compute and provide necessary amounts to be deducted from various funds to fulfill paying coupons for various instruments, or the like. P&L closed out 269 can compute and provide the profits and losses of sales (e.g., by netting buys/sells). P&L closed out 269 can be computed on a per event basis, for example by P&L Balance by Event 270. Component 270 may net based trades at various event levels, types, times, or the like.

Figure 2F:
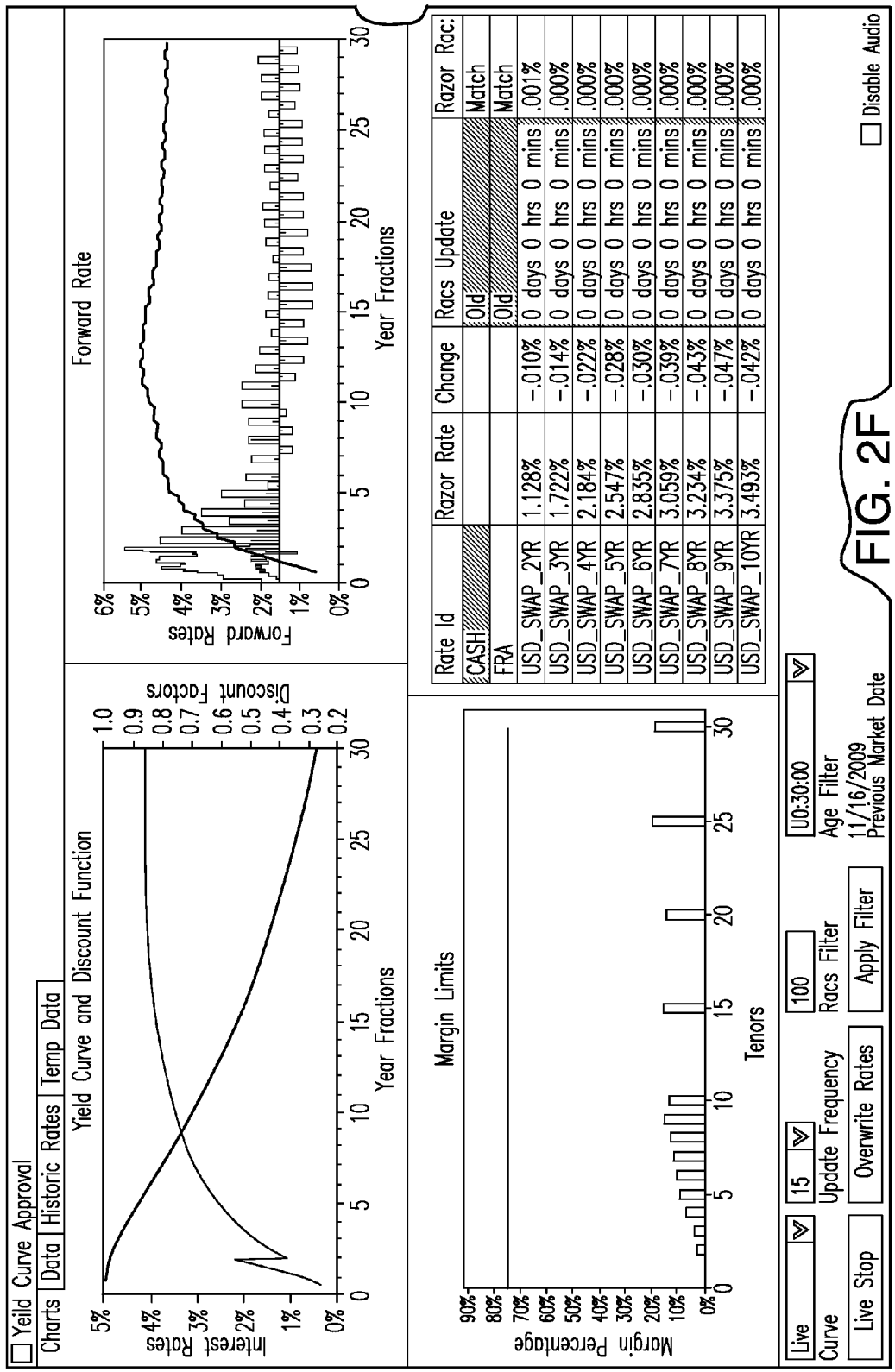
FIG. 2F shows a process, interface, and component for providing discount curve management in accordance with one embodiment of the invention.

FIG. 2F shows a process, interface, and component for providing discount curve management in accordance with one embodiment of the invention. The component for providing the interface and process of FIG. 2F can be components 210 and/or 220. As shown, the system provides management of the discount curve in a variety of forms, including as charts, data (e.g., in table form), historic rates about historically traded swap contracts, and temporary data that are the results of computations leading to the creation of the discount curve as described by the processes herein. The system receives input about which view to provide. If the chart view is chosen, the system provides the chart view, as shown. The view provides three graph charts, a data table chart, and, at the bottom, a control view. A yield curve and discount function chart shows the yield curve (ascending line), and the discount function (discount line) mapped in the same chart. A forward rate chart shows the projected valuation of swap contract prices over time (candle lines), and the yield, discount and/or projected interest rate (ascending curve) curve mapped to the same chart. The margin limit chart shows margin percentage for an individual user and/or for the clearinghouse and/or system cumulatively, over time based on the computed discount curve, using the process for margin management described for example in FIGS. 3B, 7A-7H. A data table chart provides data in table form representing inputs to the discount curve computation and risk management values. Any of the inputs can also be changed and/or inputted by the user and/or received and/or updated by the system based on real-time information. Any of the charts can be changed in real-time and/or on a continuous and/or periodic basis based on real-time computation of the discount curve and valuations. Control view also enables control of the discount curve computation, including a live stop of the discount curve computation, overwriting the rates based on data entered, entering various filters to the data (e.g., Racs filter, Age filter, and/or other filters described herein) and applying various filters, including the entered filters and/or pre-configured filters. The real-time computation can be modified to run on a live and/or various update frequencies.

The system components described above can be used to perform analysis, risk management, and settlement on an each intraday and daily practice, or the like. In one embodiment, the Razor components discussed above can include the RAZOR products of Razor Risk Technologies, the details of which are provided at http://www.razor-risk.com as of Dec. 18, 2009, including the products: Core Services Module, Credit Risk Module, Advanced Credit Risk Module, Market Risk Module, Limit Management Module Economic, Capital Module, Reporting Module, and/or Velocity Engine Commercial Lending Module.

Illustrative Processes

FIGS. 3-7H are flow charts and associated data structures for processes for managing a computer system for electronic trading of financial instruments, with a clearinghouse as a counter-party, using among other things, the computation of discount curves and margin maintenance to trades in accordance with embodiments of the invention. In one embodiment, at least some of the steps of FIGURES can be performed by, for example, the system (e.g., server device 102) and/or computing device(s) of FIGS. 1-2E. In one embodiment, at least some of the steps of FIGURES can be performed by a person and/or a group of person alone or with the aid of computer components.

Figure 3A:
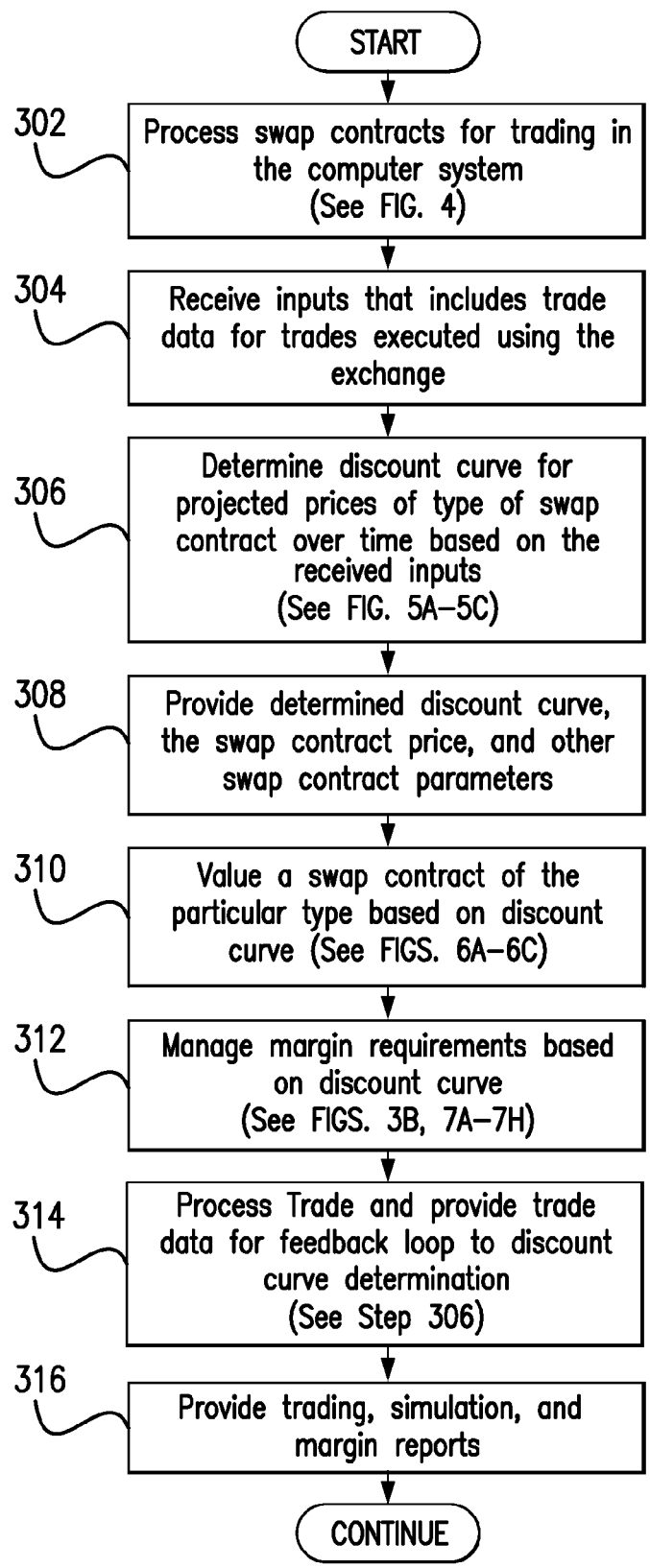
FIGS. 3A-3B show block diagrams of examples of processes for managing swap contracts in accordance with embodiments of the present invention.
Figure 3B:
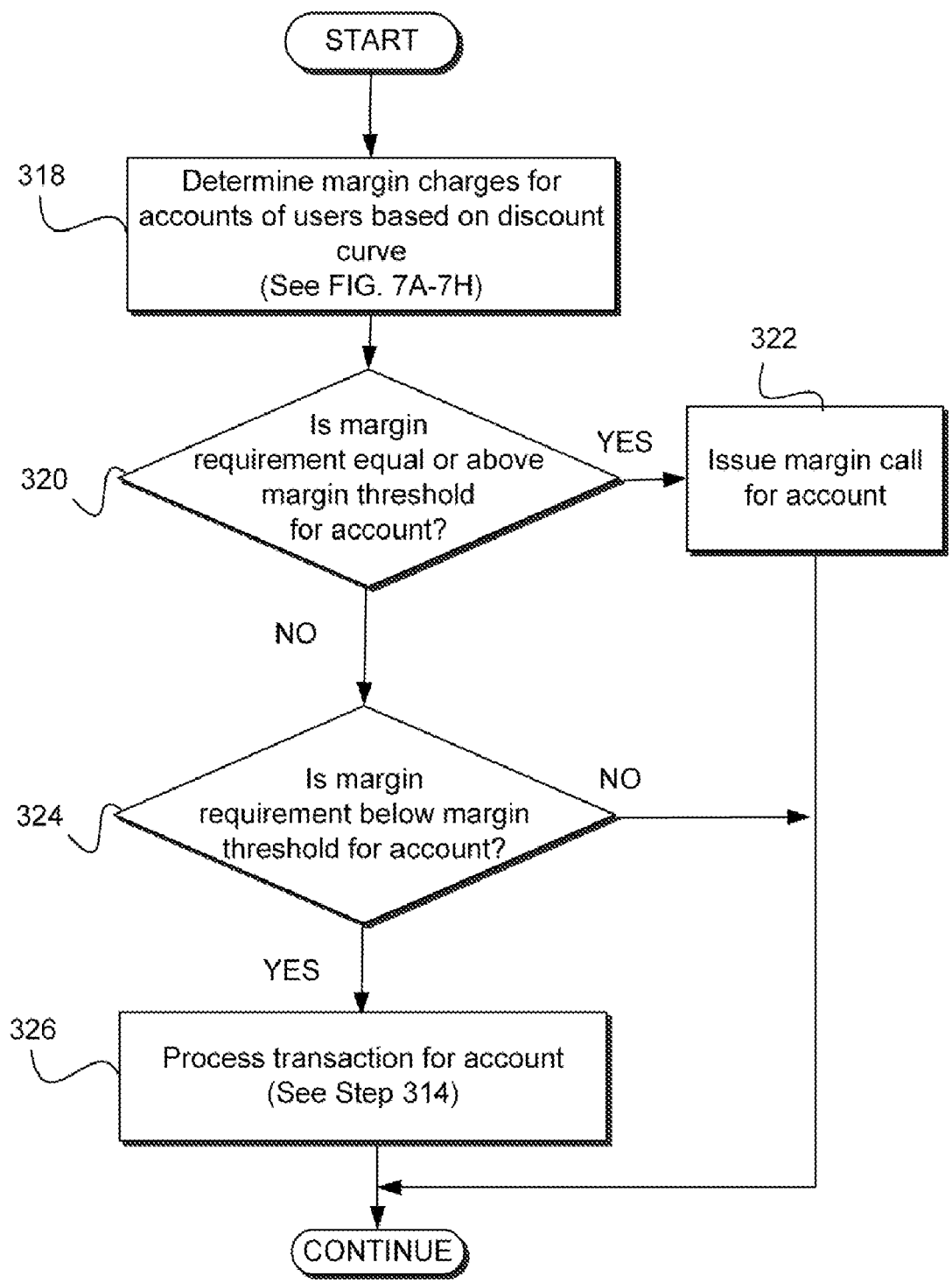

FIGS. 3A-3B show block diagrams of examples of processes for managing swap contracts in accordance with embodiments of the present invention. FIG. 3A is a flow chart for a process for managing trading of financial instruments based on a computed discount curve in accordance with embodiments of the invention. At step 302, a plurality of swap contracts is processed for trading in the computer system. The process of step 302 is described in more detail with respect to FIG. 4.

At step 304, a plurality of inputs that includes trade data for trades executed using the computer system is received in real-time. In one embodiment, the data includes both trade data from bi-lateral exchanges as well as tri-lateral exchanges using the computer system.

At step 306, a discount curve is determined for projected prices of a type of swap contract over time based on the received plurality of inputs. In one embodiment, the determination is performed by an electronic component within the computer system in real-time. In one embodiment, the provided discount curve includes a plurality of time portions associated with a type or rate of the swap contract, wherein the portions includes a short term portion, a medium term portion, and a long term portion.

In one embodiment, the discount curve can be based on historic swap contract trade data, including trades of short, medium, and long term swap contracts. The computation can be based on various known methods, including (a) using a spline, such as described in Andersen, Leif B. G., Yield Curve Construction with Tension Splines (Dec. 2, 2005), available at SSRN: http://ssrn.com/abstract=871088 as of Dec. 18, 2009; (b) the processes described in Yield Curve available from http://en.wikipedia.org/wiki/Yield_curve as of Dec. 18, 2009; and (c) the various financial processes, including swap curve computations described in U.S. Patent Applications 2009/0216673, 2008/0249958, 2008/0249956, 2008/0167981, 2008/0065528, 2007/0118459, 2004/0220870, 2002/0010670; U.S. Pat. Nos. 7,565,316, 7,467,112, 5,924,082, and 5,787,402 and/or UK Patent GB 2,398,895. Each of the references (a)-(c), and in particular, those disclosures directed to discount curve computations are incorporated herein by reference.

In a preferred embodiment, instead of the known methods, a novel and non-obvious method based on various parameterization, filtering, weighting, and/or a feedback loop can be used instead of and/or in addition to the known methods. This novel and non-obvious process is described in more detail with respect to FIGS. 5A-5C.

At step 308, the determined discount curve, the swap contract price, and other swap contract parameters are provided in real-time. In one embodiment, the data is provided to modules within the system, and/or to a plurality of users. In one embodiment, the data is provided in a plurality of interfaces (user interface and/or application programming interface). In one embodiment, the swap contract price has a price range that includes 3 or more decimal places. The process and interfaces of step 308 is described in more detail with respect to FIGS. 12A-13M.

At step 310, a swap contract price for a swap contract of the particular type is valued based on the determined discount curve. In one embodiment, the swap contract price is calculated over a plurality of dates based on a net present value of a cash flow for the swap contract and a discount rate that is based on the discount curve. The process of step 306 is described in more detail with respect to FIG. 6A-6C.

At step 312, a margin requirement for a user who wishes to trade or hold a position in the swap contract in the user's account is determined or otherwise managed based on the swap contract price. An embodiment of the process of step 312 is described in more detail in conjunction with FIGS. 3B, 7A-7H.

At step 314, a trade is processed and trade data from the computer system is provided as a feedback loop to the discount determination step of step 306. A request for a trade of the swap contract by the user is received based on the provided determined discount curve and the swap contract price. The trade at a price that is executed based on the swap contract price. In one embodiment, trading includes recording in processor readable media a sell or buy of the trade at the price in an account of the clearinghouse. In one embodiment, all or substantially all trade within the computer system is recorded against the clearinghouse account. Data about the trade is incorporated into the trade data used for determining the discount curve to provide a feedback loop into the real-time determination of the discount curve.

At step 316, reports including trade reports, shadow reports, and/or margin call reports are provided for a hierarchy of users ranging over a company level, a group level, and an individual trader level based on the determination of the margin requirement for the user's account. Daily Reports can include five main sections: Summary Report, Open Position Report, Closed Position Report, Coupon Paid Report, and Yield Curve Details. The process for generating reports are described in more detail with respect to FIGS. 9, 10. Processing then returns to other processing.

FIG. 3B is a flow chart for a process for managing margin in accordance with embodiments of the invention.

At step 318, the margin charges for the accounts of the users are determined, using, for example, the standardized portfolio analysis of risk (SPAN) algorithm. The process of step 318 is described in more detail with respect to FIGS. 7A-7H.

At decision step 320, it is determined whether the determined margin requirement equals or exceeds a threshold for maintenance of funds for the user's account. If so, processing continues to step 322, where a margin call for the account is issued. Otherwise, processing continues to step 324.

At step 324, it is determined whether the determined margin requirement is below the threshold for maintenance of funds for the account. If so, processing continues to step 326, where the transaction for the account is processed (See step 314 of FIG. 3A). Otherwise, processing returns to other processing.

Figure 4:
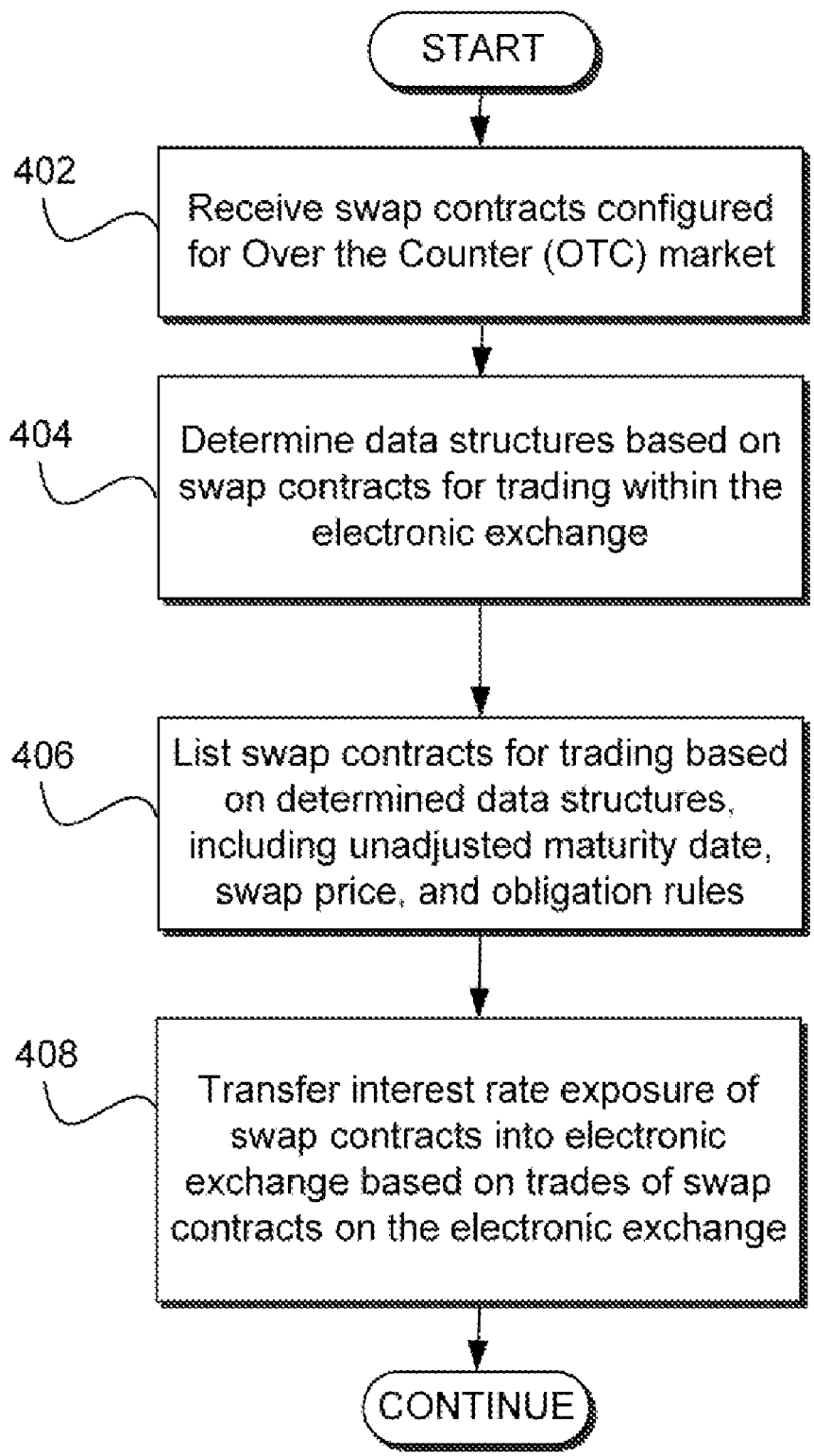
FIG. 4 shows a flow chart for processing swap contracts for trading in the computer system in accordance with embodiments of the present invention.

FIG. 4 is a flow chart for processing swap contracts for trading in the computer system in accordance with embodiments of the present invention. At step 402, a plurality of swap contracts configured for trading over an Over the Counter (OTC) market is received.

At step 404, data structures are determined based on the plurality of swap contracts for trading within the computer system. In one embodiment, the data structures are configured to conform with EFS (Exchange Futures of Swaps) rules. In one embodiment, the data structure includes data fields configured to represent at least one of a Month Index Interest Rate Swap (MIIRS), a Forward Rate Agreement (FRA), a London Interbank Offered Rate (LIBOR) Swap, an IDEX USD DLOC contract, an Overnight Index Swaps (OIS) Index Interest Rate Swap, a Short Throw Swaps, a Swaption, an interest rate option on a floating index, a European Swap, an Asian Swap, a Constant Maturity Swap (CMS), a Constant Maturity Treasury (CMT), a Constant Maturity Mortgage (CMM), a Cross Currency Swap, a Bond Future, a Bond Option, a Mortgage Pool, a Credit Default Swap, a Total Return Swap, an Inflation Index Swap, or the like.

At step 406, the swap contracts are listed for trading based on determined data structures, including unadjusted maturity date, swap price, and obligation rules. In other embodiments, the contract definition can be provided as unadjusted maturity date, rules for trading and redemption, and a price. In this way, all contracts can be listed in data triples and processed in a homogenous way by the system. For example, based on this data, the contract can be uniquely identified, compared, offsetted, netted, etc.

At step 408, based on the determined data structures, an interest rate exposure of the plurality of swap contracts is transferred into a centrally cleared environment by providing executions for trading the plurality of swap contracts with the clearinghouse as the counter party. Processing then returns to other processing.

Embodiments of Swap Data Configurations are described below. The configuration and use of these data configurations are described in more detail with respect to FIG. 4.

Forward Starting Swaps: The same 3 Month Index Interest Rate Swap but with a delayed start. This product is heavily traded by hedge funds and it will be important to capture as much of their portfolios as possible in order to encourage their uptake and sponsorship of the platform. Most of the system and valuation work is already done, incorporating the product into the risk management framework and self certification with the CFTC remain outstanding and the timing of its release should be determined to deliver maximum commercial impact.

1 Month Index Interest Rate Swap: A similar product to the current 3 month index listing, which is employed by some liability managers to hedge their portfolios, notably the Farm Credit System. The shortcut treatment that these managers achieve in the accounting treatment of their derivatives would need to be replicated by the product to encourage their uptake of the platform. There are some valuation issues in introducing another index, namely employing a common discount function, which remain unresolved; however most of the system work is a replication of what has already been done. Incorporating the product into the risk management framework will start to push the limits of the SPAN method of net margin calculation, but this should not be insurmountable. Timing of its release may be accelerated to bring motivated participants onto the platform in short order.

Forward Rate Agreements (FRA's): A forward starting one roll swap which is more flexible than but provides a similar function to the CME's Eurodollar contract. Traditionally FRA's have been used as a hedging tool for the floating resets of swap portfolios and as a trading instrument. The ability of the nontraditional community to have access to a cleared version of this product may be important for their ability and/or desire to participate in the wider swap space. This product can be released as part of a richer set of short end instruments (FRA's, OIS, and short throw swaps).

OIS Index Interest Rate Swap: Overnight Index Swaps (OIS) are interest rate swaps whose floating rate is linked to a daily overnight reference rate. OIS is a popular tool for hedging funding exposures to the overnight market, especially in repo and FX forward markets. They are similar to the current offering but there are some key differences in how interest payments are compounded, because of this they will require some additional system work to implement. The valuation and risk management work required would be similar to the other indices, as would the impact on the usefulness of SPAN. As with the FRA product, the product can be released as part of a richer set of short end instruments (FRA's, OIS, and short throw swaps).

Short Throw Swaps: This is a catch all for a variety of shorter maturity interest rate swaps. In one embodiment, the system can offer these as aged versions of other product offerings, however in order to be more commercial greater granularity in the risk management framework will need to be developed. These products complement FRA's and OIS and should be released as a set with them in order to get greatest attention.

Swaptions: Interest rate options on forward starting swaps which would require substantial standardization in order to be cleared and/or to maximize the benefits of clearing. The contract may be combined with an automatic exercise and some standardization in the combinations of expiry and strike.

Caps & Floors: Interest rate options on a floating index, which are to Eurodollar options what FRA's are to the Eurodollars themselves. Their conventions lend themselves to clearing in some ways, automatic exercise and cash settlement, but may require some standardization in the combinations of expiry and strike in order to gain the maximum benefit of clearing.

IMM & Variants: There are a number of ways of standardizing the terms of an interest rate swap. These variants can be offered while maintaining the granularity of maturity, convexity, and persistence that other attempts have failed to achieve.

European Swaps: All of the product outlined above is applicable to the European markets, particularly EUR and GBP. The greater the percentage of participants, and their portfolios, that are used within the system, the greater the efficiencies created. In addition the wider the product range, the more leverage the system can compute in the margin offset argument with established clearinghouses.

Asian Swaps: As with the European theater the product offering outlined above is applicable in the Asian region, and doing so should be additive to the benefits of the offering in total. A collaborative approach might be the most productive given the regulatory complexities of Japan and the diversity of markets in the region.

Constant Maturity Product: Constant Maturity Swaps (CMS), Constant Maturity Treasury (CMT), and Constant Maturity Mortgages (CMM) are all bespoke hedging markets that may be offered. For these products, the floating rate is set on a much longer maturity instrument than others described herein. This has significant implications for valuation and risk management.

Cross Currency Swaps: Interest rate swaps where the interest payments are determined and paid in different currencies, and which have exchanges of notional in those currencies on the effective and maturity dates. These instruments are extremely credit intensive because of the currency risk involved which may be a driver for central clearing; these risks may also mean that the commercial terms on which they can be cleared are prohibitively expensive.

Other Random Potential Product:
Government Bond Futures
Agency Bond Futures
Bond Options
Mortgage Pools
Credit Default Swaps
Total Return Swaps
Inflation Index Swaps Tables 1-5 show examples of data configurations of an example swap contract managed by the computer system for trading as described herein. As shown, the data structure includes a spot date, effective data, maturity date, notional principal, fixed leg definition, fixed rate, payment frequency, payment holiday centers, payment holiday convention, accrual year fraction, accrual holiday centers, accrual holiday convention, first roll date and last roll date, and various other fields. The examples are non-limiting and other configurations may be used without departing from the scope of the invention. The data may be stored in computer readable medium of for example processor/memory 214 of FIG. 2A. The data may be presented in a user interface to a user as part of the trading process. Other contract specifications can be defined within the system without departing from the scope of the invention. Other data structures with similar fields can also be configured for the swap products described above. In one embodiment, the data configurations and/or structure includes data fields configured to represent at least one of a Month Index Interest Rate Swap (MIIRS), a Forward Rate Agreement (FRA), a London Interbank Offered Rate (LIBOR) Swap, an IDEX USD DLOC contract, an Overnight Index Swaps (OIS) Index Interest Rate Swap, a Short Throw Swaps, a Swaption, an interest rate option on a floating index, a European Swap, an Asian Swap, a Constant Maturity Swap (CMS), a Constant Maturity Treasury (CMT), a Constant Maturity Mortgage (CMM), a Cross Currency Swap, a Bond Future, a Bond Option, a Mortgage Pool, a Credit Default Swap, a Total Return Swap, an Inflation Index Swap, or the like.

TABLE 1

Exemplary Swap Contract Introduction

The IDEX USD Interest Rate Swaps are USD denominated interest rate swaps that IDCH will accept for clearing. They will require the exchange of two interest payment streams that conform to one or both of the Fixed Leg TABLE 1-continued Exemplary Swap Contract Introduction or Floating Leg Definitions set out below in a form suitable for use by the computer-implemented systems and methods of the present invention.
The IDEX USD Interest Rate Swaps are defined by an IDEX USD defining data structure and an IDEX USD defining rule structure. Words and phrases used in the defining data and rule structures are to be understood according to an IDEX USD system glossary.
The previously described systems and methods apply the IDEX USD defining rules to the IDEX USD defining data structure and to extrinsic input data (304) to the systems and methods to determine required payments. Required payments are recorded in IDEX USD payment history records.
The following presents exemplary an IDEX USD defining data structure, an IDEX USD defining rule structure, IDEX USD payment history records, and an IDEX USD system glossary.

TABLE 2

Exemplary Data Structure defining IDEX USD Interest Rate Swaps

| Field | Value of field |
|---|---|
| Spot Date | 2 Week Days after the current date, adjusted by the Following Business Day Convention for New York. |
| Effective Date | The start date of the first interest accrual period. It shall not be more than thirty years from the prevailing spot date at any time and must be at least one month prior to the Maturity Date. |
| Maturity Date | The final payment date, adjusted by Business Day Convention, of the IDEX USD Interest Rate Swap. It shall not be more than thirty years from the prevailing spot date at any time or less than one month from the prevailing spot date at the time that it is accepted for clearing. |
| Notional Principal | The Notional Principal is used to calculate the individual interest payments; it must be common for both legs of the swap at all times throughout the life of the transaction. The minimum notional that will be accepted for clearing is $1,000,000.00, but there will be no minimum incremental restriction. |
| Fixed Leg Definition | Fixed Rate Expressed as a percentage with no more than five decimal places.
Payment Frequency One of; monthly, quarterly, semi-annual, annual or at maturity.
Payment Holiday Centers New York and any other center(s).
Payment Holiday Convention One of; Preceding, Following, Modified Following, or End of Month.
Accrual Year Fraction One of; 30/360, Actual/Actual, Actual/365 Fixed, or Actual/360.
Accrual Holiday Centers None or any one or group of centers.
Accrual Holiday Convention One of; None, Preceding, Following, Modified Following, or End of Month.
First Roll Date The unadjusted End Date of the first interest accrual period, if not specified it will be assumed to be one Payment Frequency after the Effective Date.
Last Roll Date The unadjusted Start Date of the last interest accrual period, if not specified it will be assumed to be one Payment Frequency before the unadjusted Maturity Date.
Fixed rate payment The fixed rate payment for a given accrual period shall be equal to the notional value multiplied by the Fixed Rate multiplied by the Accrual Year Fraction of the leg. |
| Floating Leg Definition | Floating Rate Index The USD London Interbank Offered Rate ("USD LIBOR") expressed as a percentage with no more than five decimal places. Index Tenor One of; monthly, quarterly, semi-annual, or annual.
Reset Lag Expressed as a number of Business Days prior to the Start Date of the interest accrual period that the Index will be reset taking into account the Reset Holiday Centers. It must be no greater than five Business Days and no less than zero Business Days taking into account the Reset Holiday Centers. Reset Holiday Centers None or, any one or group of centers. First Floating Rate Expressed as a percentage with no more than five decimal places, if not specified it will be assumed to follow the reset conventions above.
Payment Frequency One of monthly, quarterly, semi-annual, annual or at maturity.
Payment Holiday Centers New York and any other center(s).
Payment Holiday Convention One of; Preceding, Following, Modified Following, or End of Month.
Accrual Year Fraction One of; 30/360, Actual/Actual, Actual/365 Fixed, or Actual/360.
Accrual Holiday Centers None or any one or group of centers.
Accrual Holiday Convention One of; None, Preceding, Following, Modified Following, or End of Month.
First Roll Date The unadjusted End Date of the first interest accrual period, if not specified it will be assumed to be one Payment Frequency after the Effective Date.
Last Roll Date The unadjusted Start Date of the last interest accrual period, if not specified it will be assumed to be one Payment Frequency before the unadjusted Maturity Date.
Floating Rate Payment The floating rate payment for a given accrual period shall be an amount equal to the Notional Value multiplied by the Floating Rate Index setting multiplied by the Accrual Year Fraction of the leg. |

TABLE 3

Exemplary Rule Structure defining IDEX USD Interest Rate Swaps

| Rule name | Rule |
|---|---|
| Fixed Leg Rules nth interest accrual period rules | Start Date the First Roll Date for the swap plus (n − 2)* Payment Frequency of the leg. The exceptions to this are the Start Date of the first interest accrual period which will be the Effective Date, the Start Date of the second interest accrual period which will be the First Roll Date, and the Start Date of the last interest accrual period which will be the Last Roll Date. All Start Dates will be adjusted by the Accrual Holiday Convention and Accrual Holiday Centers of the leg.
End Date the First Roll Date for the series plus (n − 1)* Payment Frequency of the leg. The exceptions to this are the End Date of the first interest accrual period which will be the First Roll Date, the End Date of the penultimate interest accrual period which will be the Last Roll Date, and the End Date of the last interest accrual period which will be the Maturity Date. All End Dates will be adjusted by the Accrual Holiday Convention and Accrual Holiday Centers of the leg.
Interest Payment Date the First Roll Date for the series plus (n − 1)* payment frequency of the leg. The exceptions to this are the Payment Date of the first interest period which will be the First Roll Date, the Payment Date of the penultimate interest period which will be the Last Roll Date, and the Payment Date of the last interest period which will be the Maturity Date. All Payment Dates will be adjusted by the Accrual Holiday Convention and Accrual Holiday Centers of the leg.
Interest Payment Dates must occur within five Business Days of the corresponding End Date of the interest accrual period taking into account the Payment Holiday Centers. |
| Floating Leg Rules nth interest accrual period rules | Start Date the First Roll Date for the swap plus (n − 2)* Payment Frequency of the leg. The exceptions to this are the Start Date of the first interest accrual period which will be the Effective Date, the Start Date of the second interest accrual period which will be the First Roll Date, and the Start Date of the last interest accrual period which will be the Last Roll Date. All Start Dates will be adjusted by the Accrual Holiday Convention and Accrual Holiday Centers of the leg.
End Date the First Roll Date for the series plus (n − 1)* Payment Frequency of the leg. The exceptions to this are the End Date of the first interest accrual period which will be the First Roll Date, the End Date of the penultimate interest accrual period which will be the Last Roll Date, and the End Date of the last interest accrual period which will be the Maturity Date. All End Dates will be adjusted by the Accrual Holiday Convention and Accrual Holiday Centers of the leg.
Interest Payment Date the First Roll Date for the series plus (n − 1)* payment frequency of the leg. The exceptions to this are the Payment Date of the first interest period which will be the First Roll Date, the Payment Date of the |

TABLE 3-continued

Exemplary Rule Structure defining IDEX USD Interest Rate Swaps

| Rule name | Rule |
|---|---|
| | penultimate interest period which will be Date, and the Last Roll the Payment Date of the last interest period which will be the Maturity Date. All Payment Dates will be adjusted by the Accrual Holiday Convention and Accrual Holiday Centers of the leg. Interest Payment Dates must occur within five Business Days of the corresponding End Date of the interest accrual period taking into account the Payment Holiday Centers. For all but two interest accrual periods the Index Tenor must be within five days of the Term of the interest accrual period, for up to two interest accrual periods the Index Tenor may be a linear interpolation of other available tenors to an equivalent Term. |

TABLE 4

Exemplary Payment History records
Fixed Leg Payment history

| Interest Period | Start Date | End Date | Notional Principal | Fixed Rate | Accrual Year Fraction |
|---|---|---|---|---|---|
| 1 | | | | | |
| ... | | | | | |
| N | | | | | |

Floating Leg Payment history

| Interest Period | Start Date | End Date | Notional Principal | Accrual Year Fraction |
|---|---|---|---|---|
| 1 | | | | |
| ... | | | | |
| ... | | | | |
| n | | | | |

TABLE 5

Exemplary IDEX USD Interest Rate Swap System Glossary

Term means the difference between the Start Date and the End Date of an interest accrual period.
Following Business Day Convention means the date will be adjusted to be the first following day that is a Business Day in the locations listed.
Modified Following Business Day Convention means the date will be adjusted to be the first following day that is a Business Day in the locations listed unless that day falls in the next calendar month, in which case that date will be the first preceding day that is a Business Day in the locations listed.
Preceding Business Day Convention means the date will be adjusted to the first preceding day that is a Business Day in the locations listed.
End of Month Business Day Convention means the date will be adjusted to the last Business Day of the calendar month in the locations listed.
Business Day means a day in which the banking system is open to settle payments in the locations listed.
Week Day means any calendar day which is not a Saturday or Sunday.
30/360 Accrual Year Fraction means the number of days in the interest period in respect of which payment is being made (assuming 30 day months) divided by 360, calculated on a formula basis as follows;
$\{[360 \times (Y2 - Y1)] + [30 \times (M2 - M1)] + (D2 - D1)\}/360$
Where:
Y1 is the year, expressed as a number, in which the start date of the interest period falls.
Y2 is the year, expressed as a number, in which the end date of the interest period falls.

TABLE 5-continued

Exemplary IDEX USD Interest Rate Swap System Glossary

M1 is the calendar month, expressed as a number, in which the start date of the interest period falls.
M2 is the calendar month, expressed as a number, in which the end date of the interest period falls.
D1 is the first calendar day expressed as a number, of the interest period, unless such a number would be 31, in which case D1 will be 30.
D2 is the last calendar day, expressed as a number, of the interest period, unless such a number would be 31 and D1 is greater than 29, in which case D2 will be 30.
Actual/Actual Accrual Year Fraction means the actual number of days in the interest period in respect of which payment is being made divided by 365 unless any portion of the interest period falls within a leap year in which case divided by 366.
Actual/365 Fixed Accrual Year Fraction means the actual number of days in the interest period in respect of which payment is being made divided by 365.
Actual/360 Accrual Year Fraction means the actual number of days in the interest period in respect of which payment is being made divided by 360.

Figure 5A:
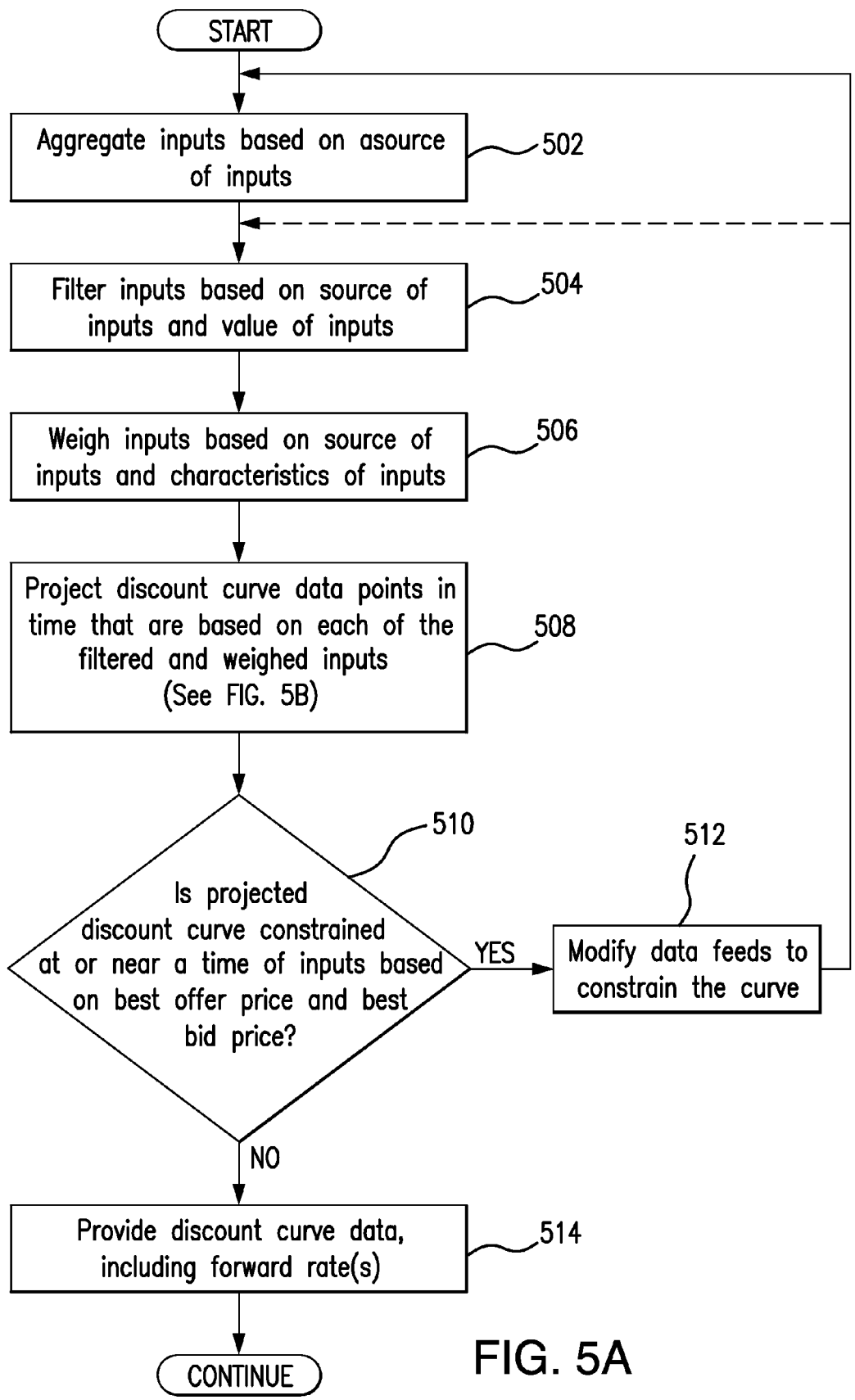
Figure 5B:
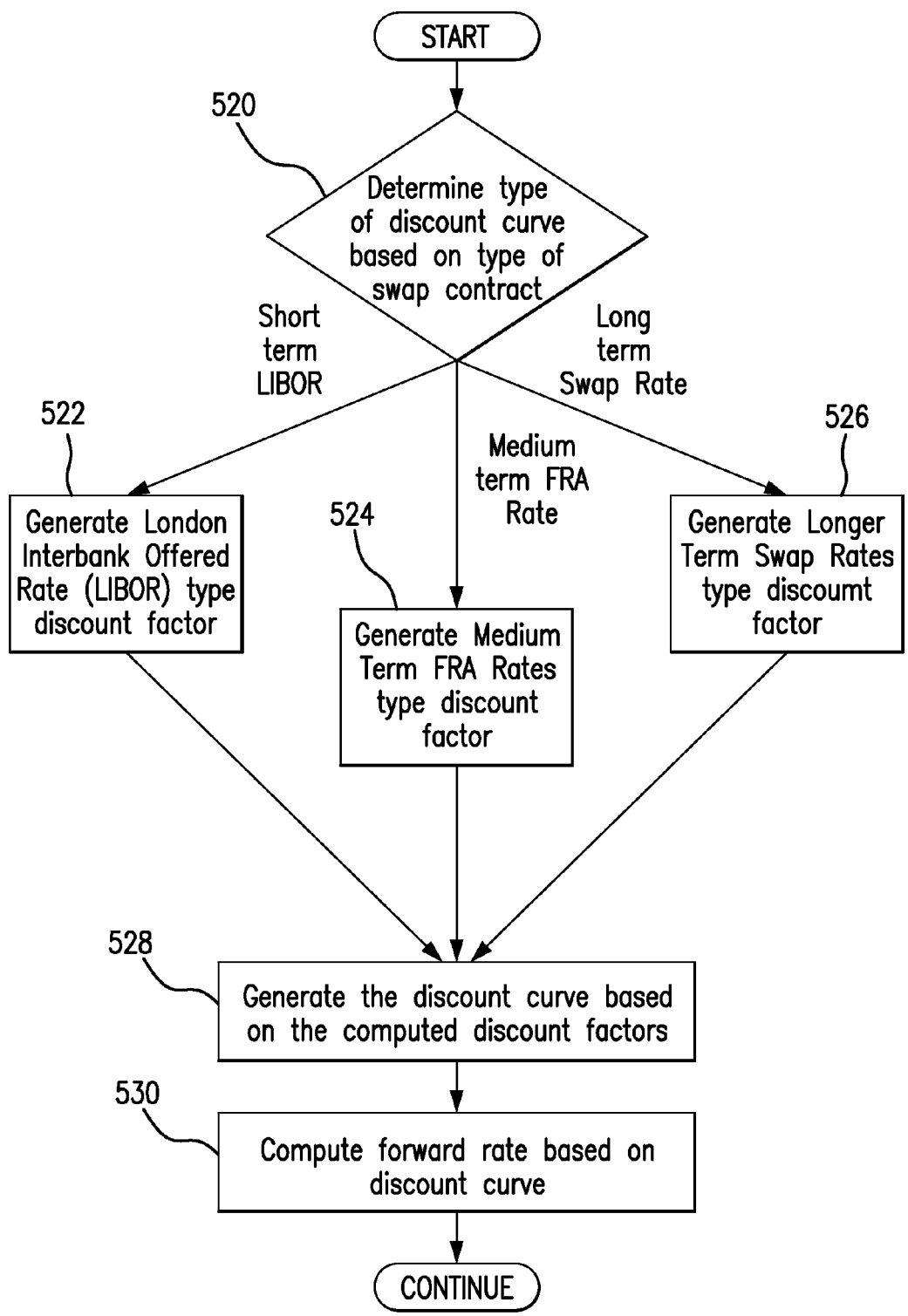

FIGS. 5A-5C are flow charts and data structures for determining in real-time the discount curve in accordance with embodiments of the present invention. A process for sampling market data in order to build zero coupon discount curve is used. The zero coupon discount curve can be used for variation margin calculation. This is a multi stage process which involves filtering of the raw feeds to remove obviously erroneous datum, prioritizing the data to give added weight to the most robust information, and potential modification to ensure that the sum of the parts represent a sensible solution relative to industry standard benchmarks.

FIG. 5A begins at step 502 where the inputs are aggregated based on a source of the inputs. In one embodiment, the source of the inputs comprises an interbroker dealer specializing in a type of the swap contract, financial data vendors, and the trades executed using the computer system. In one embodiment, the inputs includes characteristics that comprise a bid price, an offer price, a best offer price, a best bid price, and a time.

At step 504, the inputs are filtered based on the source of the inputs and a value of the inputs. In one embodiment, raw data feeds are filtered. The OTC data feed itself can represent important insight into the very vibrant OTC market, but because it is not necessarily subject to the same rigor as an executable price the raw data can be filtered to remove obvious errors, while being careful not to exclude valid price observations.

Raw data is collected from multiple sources which include at a minimum; one major interbroker dealer specializing in the product and one major financial data vendor. A simple model is then applied to the various data sources where a cleaned price series $\{P^*_t\}$ constructed from the original series $\{P_t\}$ by defining a suitable large price increment c. If the price changes by more than this amount, but the next price does not verify this change, then the price is ignored. The value of c is configurable, such that it can be increased in fast market periods such as over economic releases, central bank announcements, pricing of significant debt issuance, or any other time when the system deems it appropriate.

So $P^*_t$ is defined recursively by setting $P^*_t = P_t$ and then
if $|P_t - P^*_{t-1}| > c$,
and $|P_{t+1} - P^*_{t-1}| < c$,
then $P^*_t = P^*_{t-1}$
else $P^*_t = P_t$ The individual cleaned series which are considered timely, are then combined by an weighted averaging process which gives some precedence to series which are the product of multiple sources, such as those provided by financial data vendors, over individually generated data streams.

At step 506, the inputs are weighted based on the source of the inputs and the characteristics of the inputs. In one embodiment, the data feeds are prioritized. This step can involve combining price information from the exchange's based order book (e.g., actual trades performed by the computer system) and observations from the Over the Counter (OTC) environment (e.g., from bilateral trades). As the observations of exchange's activity represent verifiable transactions they are given priority over OTC observations. This priority takes the following form:

Where a bid and offer exist with a maximum configurable width the average of these two rates will be used.
1. Where a bid and offer exist with a width outside that described above but a trade was recently executed within that bid and offer spread, that traded rate will be used.
2. Failing either of the above, the filtered and averaged raw data feed are further filtered to be constrained to higher than the current best offer or lower than the current best bid in the order book (e.g., the exchange's actual trades).

Once rounded to three decimal places these filtered and prioritized data feeds then form the inputs to the system's Discount Curve Generation process as described in the steps below. This curve is produced on a real time basis and/or in a static form at 11 am and 4 pm (or any additional time as determined by the system) for, among other things, margining purposes, pricing purposes, or the like. The static curve can be computed as a time weighted average of the final data feed over the preceding fifteen minutes.

At step 508, the discount curve is projected through data points in time that are based on each of the filtered and weighted inputs using interpolation of the filtered and weighted inputs, interpolation, or the like. The process of step 508 is described in more detail with respect to FIG. 5B.

At decision step 510, it is determined if the projected discount curve should be constrained at or near a time of at least one of the inputs based on the best offer price and the best bid price of the inputs. If so, the processing continues to step 512. Otherwise, processing continues to step 514.

At step 512, the data feeds are modified to constrain the curve. In one embodiment, the output of the system Discount Curve Generation process is constantly compared to a number of industry standard benchmarks to ensure that it represents a sensible solution. Inputs may be adjusted when there are obvious errors.

FRA inputs are compared to prices implied from a discount curve built from CME Euro Dollar contracts adjusted for convexity and the impact of monetary supply conditions and announcements. This is the industry standard method of generating FRA rates. It is not employed in the official the system curve because of the commercial sensitivities of using a CME product and more importantly because replicating the various adjustments would be far more difficult for participants than observing the resultant prices.

The form of the forward curve is an industry standard method of ensuring the effectiveness of a discount curve building process. It is more desirous to have a smooth forward curve as this helps maintain a zero arbitrage environment. By design the 11 am and 4 pm static curve generation coincides closely with the ISDAFIX process. This is considered the leading benchmark for fixed rates on swaps worldwide and enables the system to facilitate more stable and risk managed trading of the derivate contracts. Processing then loops back to step 502 or alternately to step 504 to re-compute the discount curve.

At step 514, the discount curve data including a determined forward rate is provided. The discount curve can be provided as data usable within the electronic exchange computer system, over a network, over an interface (e.g., API, user interface), or the like. In one embodiment, the discount curve data, including the implied forward rate, are configured and provided as data compatible for computing trading strategies or validation of contract prices of at least one of the financial instruments. The data can be configured as an XML file, comma separated data, a stream of data, or the like. A device of a third-party separate from the computer system can perform the computing and/or validation.

In one embodiment, discount curve data including the forward rate and a user input interface (such as an interface for receiving trade requests) are provided through a computer interface. The interface can be a user interface (e.g., the inputs and swap data can be provided within the same screen and/or with mechanisms for trading the swap contract). The interface can be Application Programming Interfaces (API), network interfaces (e.g., networking ports and protocols for communication), or the like, configured for sending and receiving such data. The interface provisioning can include the provided discount curve of FIG. 5B, and other determined data about the swap contract, thereby providing transparency for trading and analyzing the discount curve. Processing then returns to other processing.

FIG. 5B is a flow chart for a process for generating in real-time the discount curve. In one embodiment, a discount curve can comprise a set of factors that represent the present value of a constant amount receivable at future points of time. The zero-coupon curve is analogous to the discount curve in that it represents the set of zero-coupon yields which imply these same present values. Generating such a discount or zero-coupon curve from a set of tradable instruments enables the computer system to imply or determine forward rates and to value any cash flow on any date.

The task of generating discount curves has been made much easier with the development of modern computing power. This process, or bootstrapping, is relatively light on assumptions, the two assumptions being that the discount curve represents a zero arbitrage environment and that the interpolation between known points reflects the true market behavior.

At decision step 520, it is determined which type of discount curve is to be computed based on the type of swap contract. The swap contracts can be data provided by the system as feedback and/or provided from third-party providers. The set of tradable instruments which are used to generate a discount curve can vary, normally on the basis of their liquidity which is determined by the fairness of their prices, and the degree of definition that they provide to the overall curve. In one embodiment, the set of points that is used by the system to generate the system Discount Curve, initially breaking them down into three groups based on their conventions and how discount factors are derived for them. Conveniently this can also be thought of in broad maturity profiles; shorter term LIBOR rates, medium term FRA rates, and longer term swap rates.

If the type is a swap contract for Shorter Term LIBOR Rates, processing continues to step 522. If the type is a swap contract for Medium Term FRA Rates, processing continues to step 524. If the type is a swap contract for Longer Term Swap Rates, processing continues to step 526. In one embodiment, all steps 522-526 may be performed in sequence or even in parallel. In one embodiment, only some but not all steps 522-526 may be performed.

At step 522, London Interbank Offered Rate (LIBOR) type discount factor is generated. LOBOR is the rate at which banks are prepared to lend each other unsecured funds in the London wholesale market. It is referenced once per day and is the floating rate index of the majority of USD Interest Rate Swaps. These loans are short term zero coupon instruments, and as such their discount factor is very similar to their price and can be generated as follows;

$$DF_{t_0 \to t_1} = \frac{1}{(1 + I_{t_0 \to t_2} \times YF_{t_0 \to t_2})}$$

where;
$DF_{t_o-t_1}$ is the discount factor from $t_o$ until $t_1$
$I_{t_o-t_1}$ is the zero coupon yield from $t_o$ until $t_1$
$YF_{t_o-t_1}$ is the year fraction from $t_o$ until $t_1$
Processing then continues to step 528.

At step 524, Medium Term FRA Rates type discount factor is generated. Forward Rate Agreements (FRA's), in the sense considered here, are contracts on the future level of one three month LIBOR setting. Again these instruments are already zero coupon in nature so their discount factors are readily generated, given that the system has stored in memory or computed the discount factor to the start date of the instrument, as follows;

$$DF_{t_0 \to t_2} = DF_{t_0 \to t_1} \times \frac{1}{(1 + I_{t_1 \to t_2} \times YF_{t_1 \to t_2})}$$

where;
$DF_{t_o-t_2}$ is the discount factor from $t_o$ until $t_2$
$DF_{t_o-t_1}$ is the discount factor from $t_o$ until $t_1$
$I_{t_1-t_2}$ is the zero coupon yield from $t_1$ until $t_2$
$YF_{t_1-t_2}$ is the year fraction from $t_1$ until $t_2$
Processing then continues to step 528.

At step 526, Longer Term Swap Rates type discount factor is generated. The system generates the discount factors from the swap rates themselves. This is more involved than with the LIBOR or FRA rates because swaps do make periodic interest payments and as such are not zero coupon instruments. However if the swap rate is such that the value of the swap is zero (a so called par swap) and the system has discount factors for all but the last coupon payment of the swap, either from LIBOR, FRA, or other swap rates, then the discount factor for the maturity date of the swap can be generated as follows;

$$DF_{t_0 \to t_N} = \frac{1 - \sum_{i=1}^{N-1} CP_{t_i} DF_{t_0 \to t_i}}{(1 + CP_{t_N})}$$

where;
$DF_{t_o-t_N}$ is the discount factor f from $t_o$ until $t_N$
N is the maturity of the swap
$CP_{t_i}$ is the coupon payable at $t_i$
$CP_{t_i} = PR_N \times YF_{t_{(i-1)}-t_i}$
$PR_N$ is the annualized par rate of a swap with maturity N
$YF_{t_{(i-1)}-t_i}$ is the year fraction from $t_{(i-1)}$ until $t_i$
This forward substitution is why the process is sometimes referred to as bootstrapping. The specific instruments of each type employed in the system curve can be seen in the FIG. 5C. Processing then continues to step 528.

At step 528, the system generates the discount curve based on the computed discount factors, using for example, interpolation. As discussed above, the method of interpolation is used between known points reflecting true market behavior. There are at least two places in the curve generation process where interpolation can be used; determining the semi-annual swap rates between the observed annual par rates and determining intermediate discount factors from known points. In one embodiment, the semi-annual swap rates are implied from observed rates with a natural spline function and discount factors are calculated using a log-linear approach.

In a log-linear interpolation, the system linearly interpolate the log of the adjacent discount factors and obtain the required discount factor by taking the exponential of this result. Both of the methods of interpolation are selected to generate smooth discount and forward curves (something which is generally desirous in a zero arbitrage environment) and to replicate market practice.

At step 530, forward rate(s) can be computed and provided based on the discount curve. The discount curve can be used to determine the forward interest rates implicit in the set of tradable instruments. If the system has a discount curve and two dates that are to be determined, the forward rate can be calculated by using the following formula;

$$I_{t_1 \to t_2} = \frac{\left(\frac{DF_{t_0 \to t_1}}{DF_{t_0 \to t_2}} - 1\right)}{YF_{t_1 - t_2}}$$

This will produce a zero coupon rate but the system can use a similar process to generate the equivalent yield for a coupon paying instrument. Processing then returns to other processing.

Figure 6A:
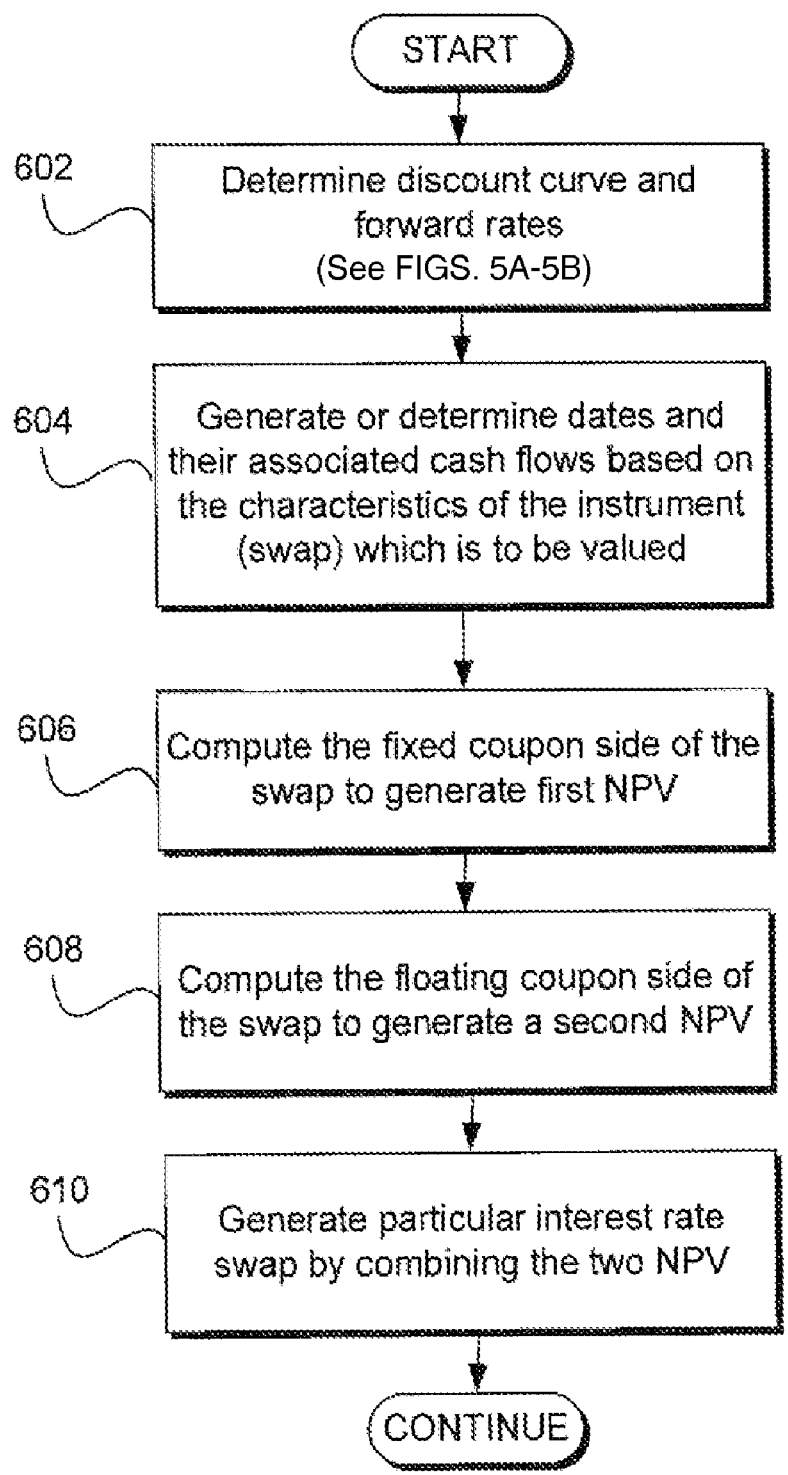

FIGS. 6A-6C show examples of processes and data structures for using a Discount Curve to value swap contracts/instruments in accordance with embodiments of the present invention. Based on the discount curve and a method of implying forward rates disclosed above, the system is configured to value any cash flow on any date. Specifically the system uses a discount curve to value a swap, e.g., an aged Three Year Interest Rate Swap.

At step 602, the discount curve and forward rates are determined as described for example in the processes of step 306.

At step 604, the system generates or determines the dates and their associated cash flows based on the characteristics of the instrument (swap) which is to be valued. Once this is done the system can imply discount factors from the curve to each of these dates and calculate the present value of the payments.

At step 606, the system computes the fixed coupon side of the swap to generate a first NPV; the summary of the calculations can be seen in FIG. 6B. FIG. 6B shows that the fixed payments are semi-annual and relatively even; they are also positive indicating receiving of the fixed rate. The present value of each of these payments is the product of the payment and the discount factor (remember that the discount factor can be thought of as the present value of $1 on that date). The present value declines the further they are from payment. The Net Present Value (NPV) of the fixed coupon side of the swap is simply computed as the sum of the individual present values, in one embodiment, At step 608, the system computes the floating coupon side of the swap to generate a second NPV; the summary of the calculations can be seen in FIG. 6C. FIG. 6C shows that the payments are not even but follow the forward LIBOR rates implied by the discount curve; they are also negative indicating paying of the floating rate. The floating payments are quarterly but where the dates align with the previously considered fixed payments, the discount factors can also be determined to match.

At step 610, by combining the two NPVs, this particular interest rate swap is generated as a positive NPV, e.g., of 381,765 for the receiver of the fixed rate. In summary this example shows the use of the system's Discount Curve and its application in valuing swap and other derivative transactions.

Figure 7A:
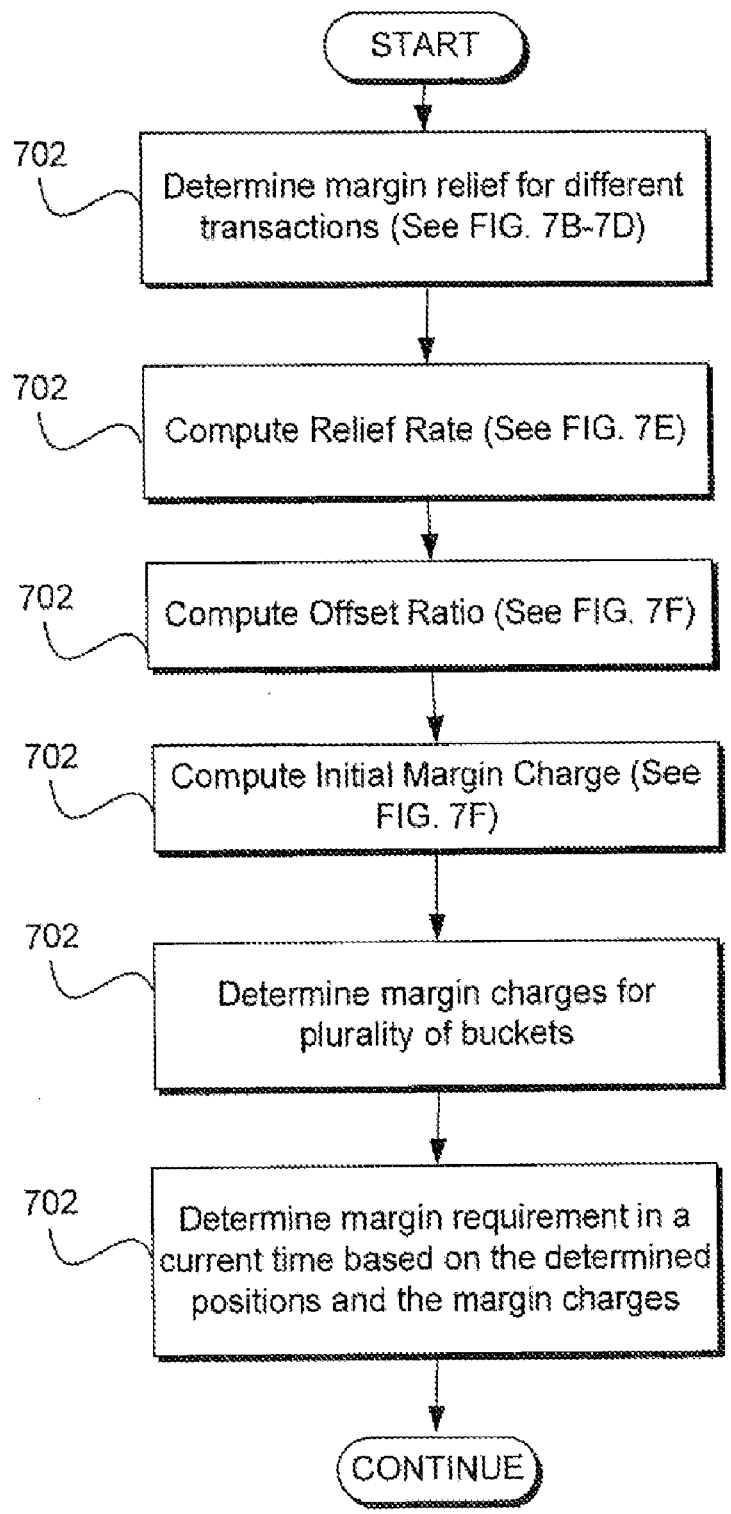

FIGS. 7A-7H are examples of flow charts and data structures for managing margin within the system based at least on the determined discount curve in accordance with embodiments of the present invention. FIG. 7A is a flow chart for an example of a process for determining of the margin requirement. At step 702, margin relief for different transactions are determined based on the compute discount curve. The valuation of each transactions based on the discount curve are described above with respect to FIGS. 6A-6C. As described below, swap contract trades (including actual and/or requested trades) are analyzed and/or offsetted against each other. It is to be understood that when a contract is referred to below, the meaning is a trade of a contract and/or the valuation of the trade of the contract, including valuation based on the discount curve, where appropriate.

In one embodiment, margin relief for IDEX swap futures uses the standardized portfolio analysis of risk (SPAN) algorithm and/or models. Below is a further description of a process for managing margin for swap futures contracts. The system's margin charge depends on the time to maturity, or tenor, of the traded instrument. The tenor is used to break down the full breadth of instruments into 13 separate buckets, which will be associated with a different margin charge per bucket. In a scenario where there is no margin relief, each individual instrument traded (long or short) would be subject to the full margin charge irrespective of a reduction in portfolio risk. SPAN margining allows for the reduction in collateral requirements needed to trade IDEX Swap Futures. All traded instruments are charged the full margin amount in a given bucket unless there is some offsetting or netting of risk. More specifically, margin relief is applied when newly executed trades reduce the risk composition of a given swap futures portfolio. SPAN Margining Methodology The calculation of margin offsets begins with three inputs: The Relief Rate (FIG. 7B) that describes the discount in IM that is given for risk offsets, the Offset Ratio (FIG. 7C) that describes the number of contracts of a shorter tenor that would be required to offset 1 contract of a longer tenor, and the Initial Margin (IM; FIG. 7D) charge per bucket. Each of these inputs will be pulled from tables that are posted on a monthly basis on the system's website or otherwise provided by the computer system. The Offset Ratio and the Relief Rates are displayed in a matrix form with the thirteen buckets on each axis.

In one embodiment, the Initial Margin is designed to protect the clearing house against adverse price moves. Interest Rate Swap can be configured with a unique daily value that can be calculated. The system bases its calculation by looking at its Interest Rate Swap Contracts as thirteen discrete time buckets, for example: 2 Years through 10 Years; 15, 20, 25 and 30 Years. By revaluing each Interest Rate Swap on a daily basis, a time series can be constructed which can then be evaluated by the system.

In one embodiment, the minimum time series that the system will use is 125 trading days or six calendar months. This period can be chosen because it captures at least one June 30 or December 31 period. The market value of an interest rate swap has two components: (1) Clean Price; (2) Accruals. The Clean Price is computed as the result of the shape of the interest rate curve and changes according to the market. The Accruals are computed as the daily amount of money that every plain vanilla interest rate swap must account for on both the paying and receiving side. Accruals are known through the next payment period.

Figure 7B:
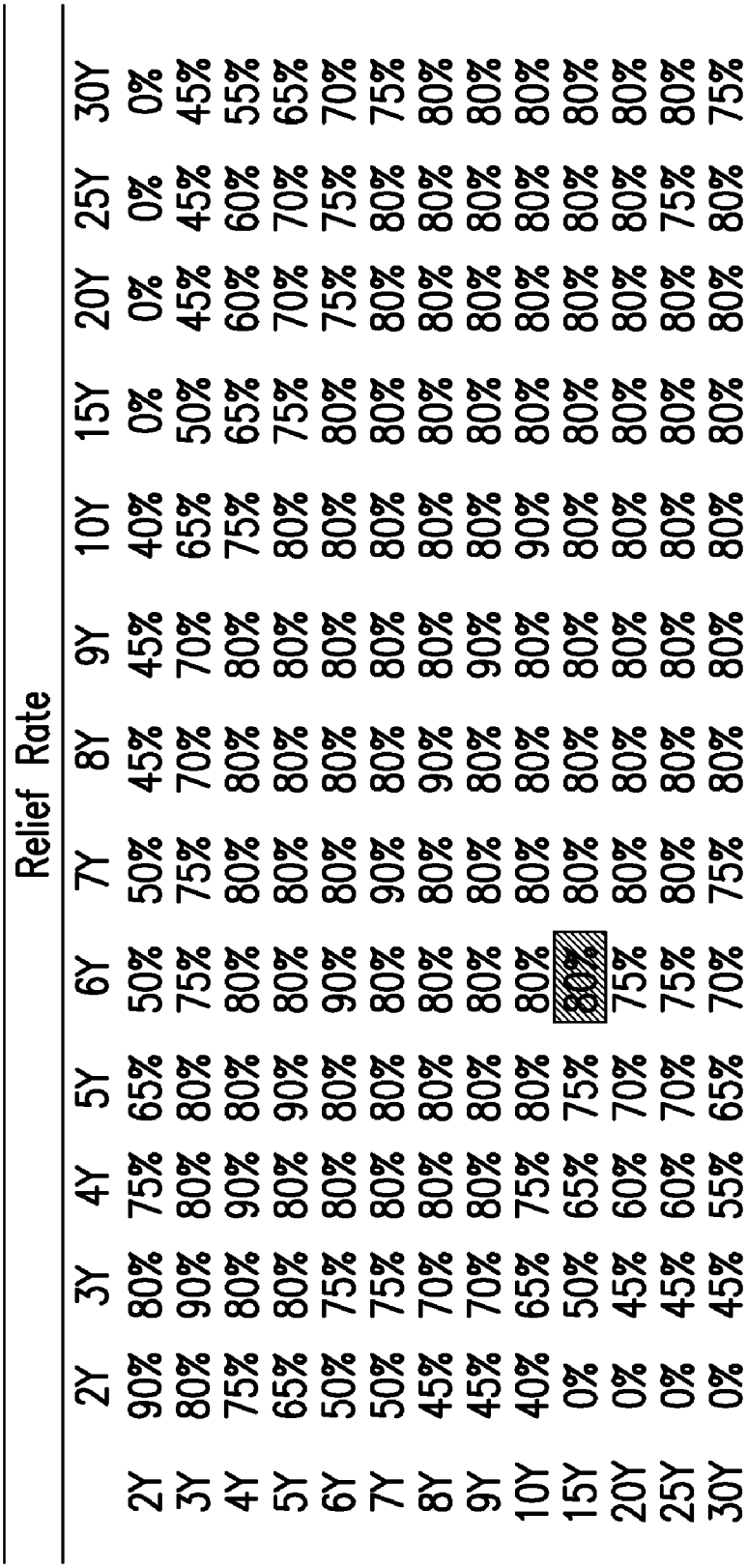

In one embodiment, to calculate initial margin, the system uses the observed Clean Prices for each time bucket over the preceding 125 days. A time series is constructed by the system and a variance is established in matrix format for 30, 90 and 125 days. To the resulting variances, the system applies the following confidence intervals: 95% (2.045 Standard Deviations); 99% (2.736 Standard Deviations); 99.7% (3 Standard Deviations). According to the Risk Manual configured by the system, the amount chosen can be the largest value observed in the 99.7% Confidence Interval. The calculation is performed at least monthly in normal market conditions. The process allows for back testing as maximums are reported along with recommended margin amounts At step 704, a Relief Rate is computed for example using the Sample Relief Rate Matrix of FIG. 7B. FIG. 7B shows a Sample Relief Rate Matrix including the intersection of the column and row highlighted represent the relief rate applied to a given offset.

At step 706, an Offset Ratio is computed for example using the Sample Offset Ratio Matrix of FIG. 7C. FIG. 7C shows a Sample Offset Ratio Matrix including the intersection of the column and row highlighted represent the number of lower tenor bucket contracts required to offset 1 contract of the higher tenor bucket.

At step 708, an Initial Margin (IM) charge is computed for example using a Sample Initial Margin charge table and/or formulas described herein. FIG. 7D shows a Sample Initial Margin charge table. In one embodiment, the formula for Total IM is below:

$$\text{Total IM Requirement} = \text{Total of Intra-Bucket Offset Charges} + \text{Total of Inter-Bucket Offset Charges} + \text{Remaining Portfolio IM Charge}$$

At step 710, margin charges for a plurality of buckets are determined. In one embodiment, each bucket includes at least one year. In one embodiment, a charge in each bucket is netted or offsetted based on a charge in other buckets for other years. The offset methodologies are applied in the order shown:

1st Intra-bucket offsets—Relief given to offsetting contracts (e.g., based on the contracts' valuation) that are in the same bucket 2nd Inter-bucket offsets—Relief given to offsetting contracts (e.g., based on the contracts' valuation) that are in 2 different buckets 3rd Remaining Margin—Residual (post-netting); non-offsetting contracts (e.g., based on the contracts' valuation) which receive full margin treatment The same equation used for Intra-bucket offset calculations is used for Inter-bucket offset calculations:

$$\text{Offset Charge} = \{(ConsLongTenor \times \text{LIM}) + (ConsLongTenor \times OffsetRatio \times SIM)\} \times (1 - ReliefRate)$$
$$= \{\text{Long Tenor } IM \text{ Charge} + \text{Short Tenor } IM \text{ Charge}\} \times (1 - ReliefRate)$$
$$= \text{Zero Relief Margin Charge} \times (1 - ReliefRate)$$

$ConsLongTenor$ = # of Longer Tenor contracts being offset/consumed

-continued

OffsetRatio = Offset Ratio (from matrix)

LIM = Initial Margin charge for longer tenor contract

ReliefRate = Relief Rate from matrix

SIM = Initial Margin charge for shorter tenor contract

As offsets are applied, the number of contracts that have been offset can be removed from the original portfolio as each offset step is applied. The sum of all of the offset charges is added to the total initial margin charge of the remaining positions to calculate the Total IM requirement. The process of step 710 are described in more detail in FIG. 7H.

At step 712, the margin requirement is determined in a current time based on the determined positions and the margin charges. For example the total margin charge with or without offsets can be determined by the formulas:

$$\text{Total Margin Charge (with Offsets)} = \text{Total Intra} + \text{Total Inter} +$$
$$\text{Total Remaining}$$
$$\$466,260 + \$938,155 + \$1,726,200$$
$$\$3,130,615$$

$$\text{Total Margin Charge (No Offsets)} = 15Y \text{ IM Charge} + 6Y \text{ IM Charge} +$$
$$3Y \text{ IM Charge} + 2Y \text{ IM Charge}$$
$$= \$1,113,600 + \$6,355,500 +$$
$$\$2,754,400 + \$339,000$$
$$= \$10,562,500$$

In this example, margin offsets provide a savings of over 70%. FIGS. 7E-7F shows another example of margin offset. Processing then returns to other processing.

Figure 7H:
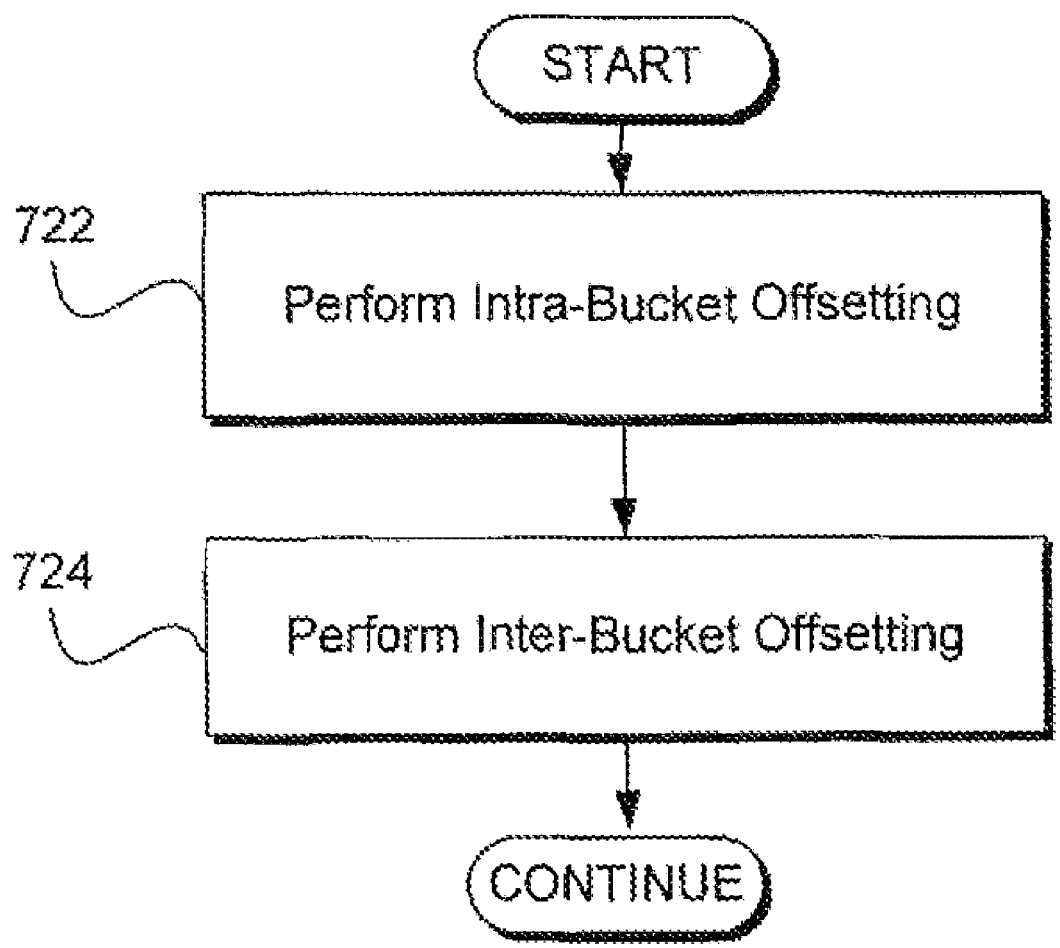

FIG. 7H shows a process for margin charges computation for a plurality of buckets are determined. At step 722, the Intra-Bucket Offsetting is performed. A long and short position of the user in each contract held by the user is determined. Each position is netted down within its own bucket, leaving the net long or short position. As each position is offset, the amount of margin relief applied depends on the offset charge equation. Intra-bucket offsets always have an offset ratio of 1 and the Relief Rate is pulled from the Relief Rate Table (FIG. 7B). 6Y vs. 6Y Intra-offset calculation example:

$$\text{Offset Charge} = \{(ConsLongTenor \times \text{LIM}) + (ConsLongTenor \times$$
$$OffsetRatio \times SIM)\} \times (1 - ReliefRate)$$
$$= \{(1,171 \times \$1,900) + (1,171 \times 1 \times \$1,900)\} \times$$
$$(1 - 90\%)$$
$$= \$444,980$$

This step is completed for the rest of the buckets where a long position can be offset with a short (3Y vs. 3Y and the 2Y vs. 2Y). the remaining positions are in the "Net Positions (Post Intra Offsets)" column in the table above Once intra-bucket netting completed for each bucket with potential intra-bucket offsets, all intra-bucket offset charges are summed to find the total intra offset charge. In this example, the total of all of the intra-bucket charges is $466,260.

At step 724, the Inter-Bucket Offsetting is performed. All inter-bucket offsetting occurs between the longest tenors first, and then offsets the lower tenors until no more offsets are possible. The first 2 offsetting buckets would be the short 15Y vs. the long 6Y. If any long 6Y positions remain, then remaining long position can offset the next short exposure (Long 6Y vs. Short 3Y). This step is repeated until all positive and negative exposures have netted. The first stage is to find out how many contracts can be consumed in a netting operation between a given pair of buckets (long vs. short). The consumed contracts are removed from the portfolio, valued for their total IM charge if given zero margin relief, and then the relief rate equation (1—Relief Rate) is applied.

15Y vs. 6Y Inter-offset calculation example (step 1, above):

$$\text{Offset Charge} = \{(ConsLongTenor \times \text{LIM}) + (ConsLongTenor \times$$
$$OffsetRatio \times SIM)\} \times (1 - ReliefRate)$$
$$= \{(174 \times \$6,400) + (174 \times 3 \times \$1,900)\} \times (1 - 80\%)$$
$$= \{\$1,113,600 + \$991,800\} \times (1 - 80\%)$$
$$= \$421,080$$

FIG. 7G shows another example margin computation. Processing then returns to other processing.

Further Illustrative System

In one embodiment, the system of FIG. 1 as disclosed above may be further configured to manage the risk of users and market risk. In particular, server device 102 of the system may be configured to perform the process of FIGS. 3C-3K.

Attachment A discloses a rule book for implementing an embodiment of a system in accordance with the present invention. Where Attachment A recites the rules "must" or "shall" be performed, it is understood that this is one embodiment, and that in other embodiments, the rules are non-limiting, and in some embodiments, not all rules are performed, and/or other rules may also be added without departing from the scope of the invention. The entities defined e.g., in Rule 501 of Attachment A should be considered non-limiting, and entities that are persons can replaced with computer components where appropriate. Time limits, amount limits, or the like are preferred embodiments, and other values can be used without departing from the scope of the invention.

The rules described in Attachment A, while in some cases are recited as being performed by persons, committees, or the like, can also or alternately be performed by computer components, including server device 102 of the system and/or other hardware or hardware in combination with software of various apparatuses as described herein. For example, at least some operations of the clearinghouse, including margin maintenance, fund management, provisioning of discount curves, sending of notices, or the like can be performed by server device 102.

Where Attachment A describes operations performed "only" by or "always" by an entity, it is understood that this is one embodiment, and that in other embodiments, other entities may perform the actions and/or the actions may selectively performed or not performed at all. Where Attachment A describes "all" of something is determined, performed, or otherwise operated on, it is understood that this is one embodiment, and that in other embodiments, some of the things may be selectively operated on, or none of the things may be operated on.

Further Illustrative Apparatus

In one embodiment, the apparatus of FIG. 2A as disclosed above may be further configured to manage analysis and reporting with respect to the swap contract exchange.

In one embodiment, clearinghouse component 220 of the apparatus includes any hardware and/or hardware and software component configured to manage the accounts and processing of the clearinghouse. In one embodiment, component 220 may manage a guaranty fund based, for example, based on the results of a discount curve as disclosed herein. Component 220 can be configured to perform at least some of the steps of the process of FIG. 3C-3K.

Figure 2G:
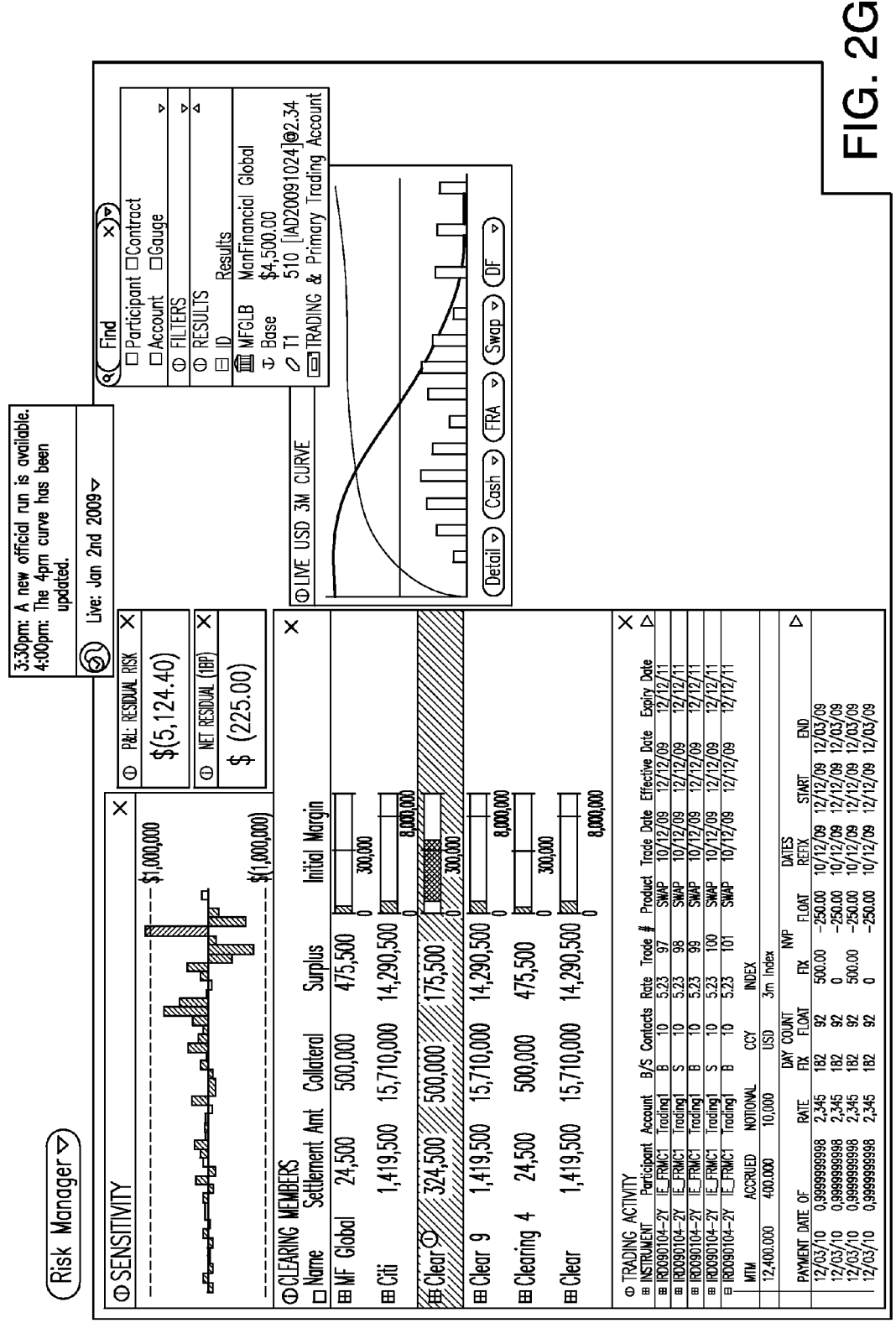
FIG. 2G shows a process, interface, and component for providing risk setup and/or management in accordance with one embodiment of the invention.

In other embodiments, the Razor components described with respect to FIGS. 2A-2F can be replaced with and/or supplemented with KASM Risk. FIG. 2G shows a process, interface, and component for providing risk setup and/or management in accordance with one embodiment of the invention. The component for providing the interface and process of FIG. 2G can be components 210 and/or 220. As shown, the system provides risk management in a variety of forms, including as charts, data (e.g., in table form), and trading data about historically traded swap contracts. The system provides the chart view, as shown. The view provides three graph charts, a data table chart, and various control and/or search views.

A yield curve and discount function chart (live USD 3M Curve) shows the yield curve (ascending line), and the discount function (discount line) mapped in the same chart. The yield curve and be selected for various types of swap contracts (e.g., USD 3M). Further details, cash, FRA, Swap, and DF data may also be selected and provided. As shown, various clearing members (by name, settlement amount, collateral, surplus, and initial margin chart) are provided. In one embodiment, the sensitivity candle chart shows a possible needed margin and/or guaranty funds for the various members. The highlighted candle line above a margin and/or guaranty limit (e.g., $1,000,000) show that a particular member may require attention and/or a notification needs to be or has been sent a notification, as described herein. The user of this interface may select to send the notification. The clearing members list also highlights the member with the problematic risk identification. As shown, the initial margin requirement for the member is below a threshold (shown as a vertical line). The P&L (profits and loss) residual risk (e.g., computed as described herein, e.g., with respect to step 337, FIGS. 3I-3K) is provided. The net residual (IBP) is also shown and represents the overall uncovered possible liability to the clearinghouse for projected defaulting clearing members. The net residual can be computed in various ways, e.g., a sum of the guaranty fund coverage and/or margin coverage provided by each of the clearing members.

Trading activity view provides historical and/or real-time trading data by the various parameters shown (instrument, participant, account, B/S, Contracts, Rates, trade #, Product type, trade data, effective date, expiry date, etc).

The view can be customized by finding and/or filtering the data to be presented in the various other views shown (e.g., sensitive, clearing members, trading, discount and yield curve, etc) by particular participants, account, contact, contract (swap contract), gauge, etc. Various other data reporting is also provided and shown.

In generally, any of the inputs of the views can also be changed and/or inputted by the user and/or received and/or updated by the system based on real-time information. For example, the margin charge of the member (e.g., member "clear") can be manually changed by changing the initial margin slide bar to be beyond the vertical line, thus changing the amounts needed for the particular member. Any of the charts can be changed in real-time and/or on a continuous and/or periodic basis based on real-time computation of the risk management, discount curve, and/or valuations as described herein. The control and/or find view also enables control of the discount curve computation, including a live stop of the discount curve computation, overwriting the rates based on data entered, entering various filters to the data and applying various filters, including the entered filters and/or pre-configured filters. The real-time computation can be modified to run on a live and/or various update frequencies. In one embodiment, the process, component, and interface of FIG. 2G can be combined with the process, component, and interface of FIG. 2F, with duplicate functions and views (e.g., discount/yield curve and control views) consolidated appropriately.

Further illustrative Processes

FIGS. 3C-3K are flow charts and associated data structures for processes for managing a computer system for electronic trading of financial instruments, with a clearinghouse as a counter-party, using among other things, the computation of discount curves and margin maintenance to trades in accordance with embodiments of the invention. In one embodiment, at least some of the steps of FIGURES can be performed by, for example, the system (e.g., server device 102) and/or computing device(s) of FIGS. 1-2E as disclosed above. In one embodiment, at least some of the steps of FIGURES can be performed by a person and/or a group of person alone or with the aid of computer components.

Figure 3C:
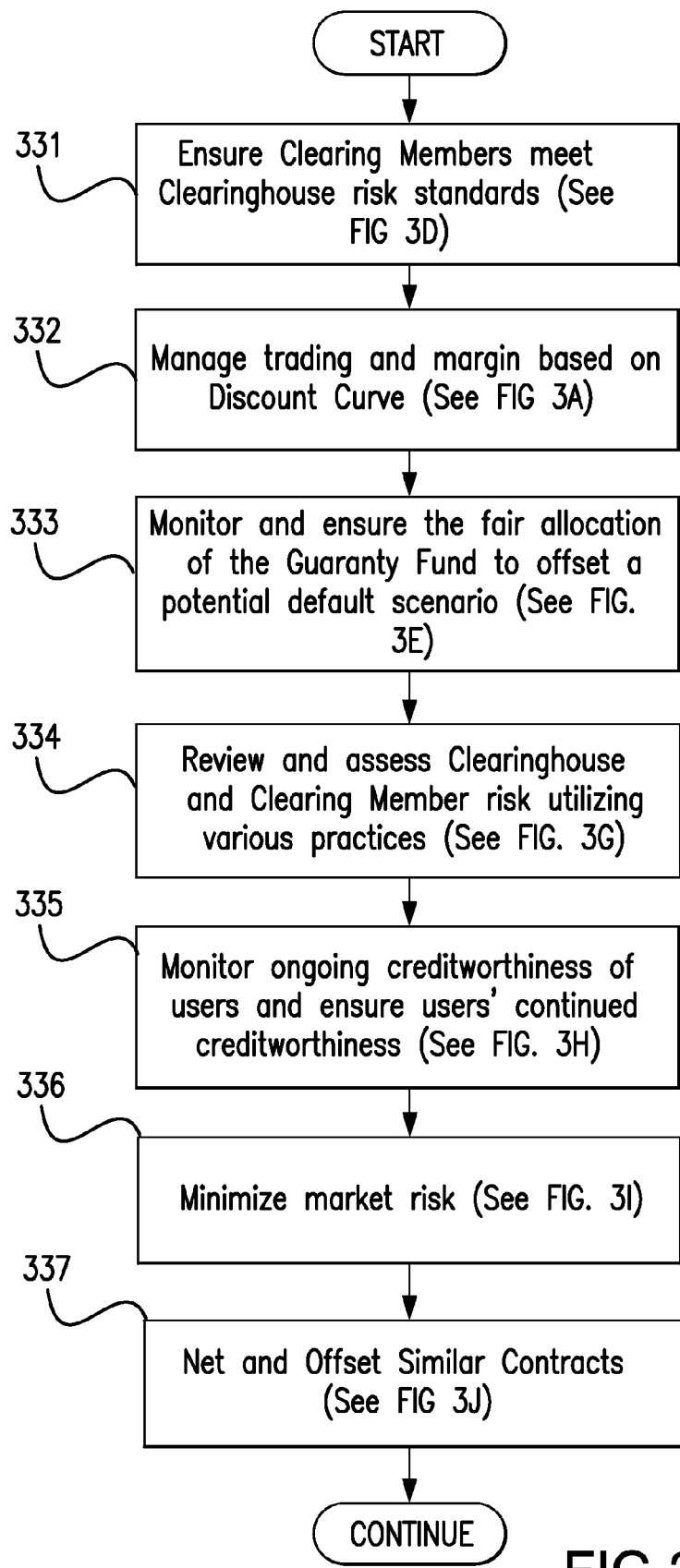

FIG. 3C is a flow chart for a process for managing risk in the clearing house trading system in accordance with embodiments of the invention. At step 331, the system can ensure that users of the system, e.g., Clearing Members, meet Clearinghouse risk standards, have the proper operational capabilities, are adequately staffed and are sufficiently capitalized. The process of step 331 are described in more detail with respect to FIG. 3D.

At step 332, the system manages the trading and margin of a user based on a generated discount curve, that, in one embodiment, is based on the trading data generated by the system. The process of step 332 are described in more detail with respect to FIG. 3A.

At step 333, the system can continuously monitor and ensure the fair allocation of the Guaranty Fund to offset a potential default scenario. The process of step 333 are described in more detail with respect to FIG. 3E.

At step 334, the system can review and assess Clearinghouse and Clearing Member risk utilizing various practices at predetermined frequencies, as described below. Trading activity of the Clearing Members can be processed, pre-trade, through, for example, the system in order to prevent Clearing Members from exceeding risk limits and to protect the Clearinghouse from unauthorized trading events. The process of step 334 are described in more detail with respect to FIG. 3G.

At step 335, the system can monitor the ongoing creditworthiness of all Clearing Members and can initiate appropriate action, when circumstances warrant, ensuring a Clearing Member's continued creditworthiness subsequent to admission. The process of step 335 are described in more detail with respect to FIG. 3H.

At step 336, the system can perform actions to minimize market risk. For example, adequate but not excessive Performance Bonds can be collected to collateralize market risk. The daily marking-to-market of positions can eliminate loss accumulation. This can be done on a near real-time basis as well as preferably at midday and at the end of day. The process of step 336 are described in more detail with respect to FIG. 3I.

At step 337, similar contracts are netted and offsetted to reduce the residual risk of the system. The process of step 337 are described in more detail with respect to FIG. 3J. Processing then returns to other processing.

Figure 3D:
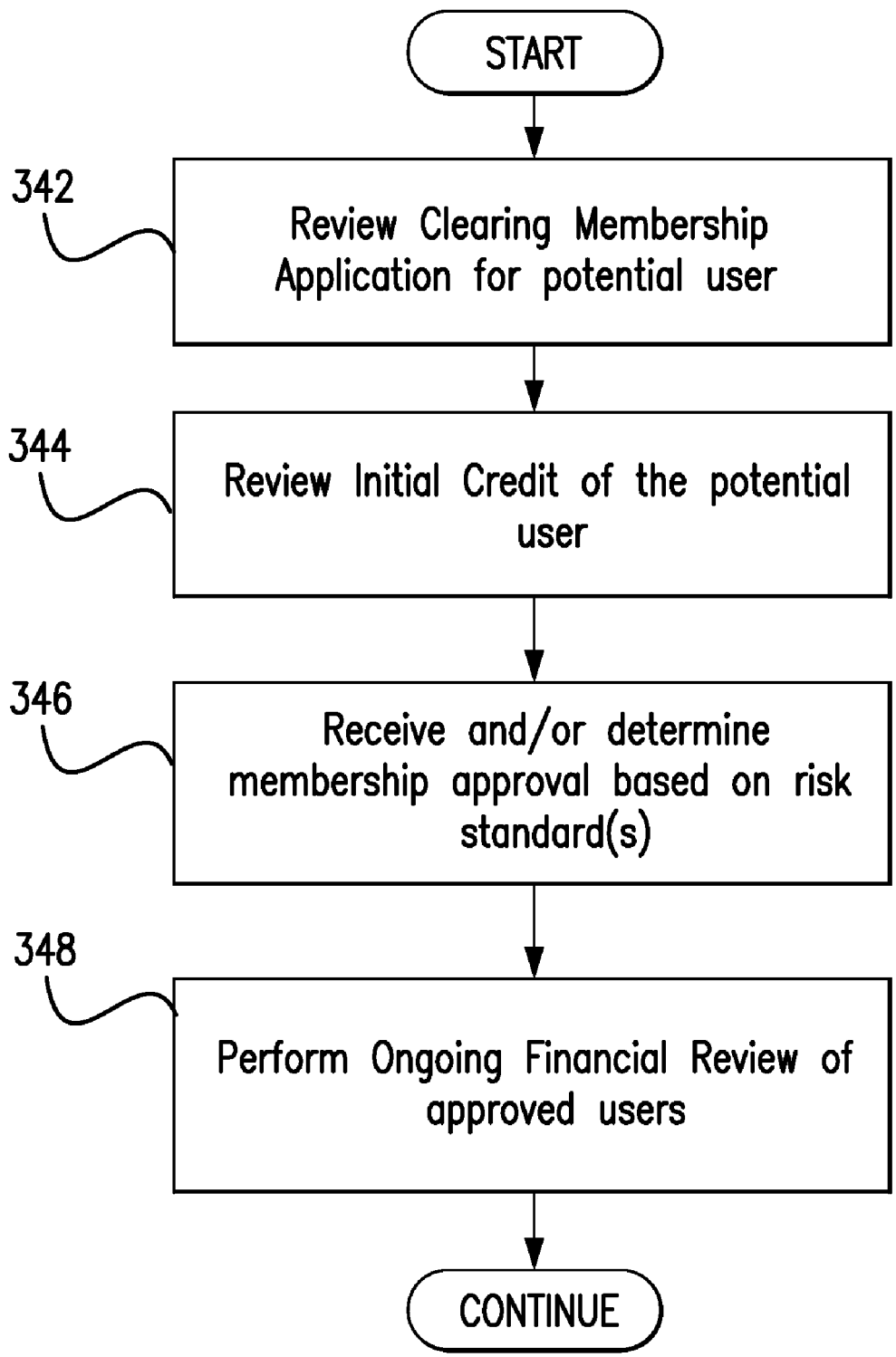

FIG. 3D is a flow chart for a process for managing Membership Standards in the clearing house trading system in accordance with embodiments of the invention. The system can ensure that Clearing Members meet Clearinghouse risk standards, have the proper operational capabilities, are adequately staffed and are sufficiently capitalized At step 342, the Clearing Membership Application is Reviewed. Applications for Clearing Membership can be reviewed by the system, which includes examining the books and records of the applicant, reviewing the applicant's risk management and compliance procedures, performing background checks of management and to take such other steps as it determined necessary to ascertain the facts bearing upon the qualification of an applicant. The system may receive information from a regulatory services provider third party device to assist with such review.

At step 344, the Initial Credit is reviewed Review. In one embodiment, the system may require the Clearing Members to satisfy at least some or all of the following:

Class A Members are required to make a threshold amount (e.g., $5,000,000) contribution to the Guaranty Fund and such contribution is subject to a three-year lock-up period. Class B Members are required to make a threshold amount (e.g., $2,500,000) contribution to the Guaranty Fund and such contribution is subject to a one-year lock-up period. The Risk Committee, in its discretion, may require Clearing Members to deposit additional amounts into the Guaranty Fund.

Clearing Members are required to maintain minimum adjusted net capital in an amount no less than the greater of: (a) threshold amount (e.g., $5,000,000), and (b) for Clearing Members that clear customer business in customer segregated accounts, such amounts as may be required from time to time by the Commodities Futures Trading Commission ("Commission") if the Clearing Member is a FCM or the Securities and Exchange Commission if the Clearing Member is also registered as a broker-dealer. A Clearing Member that is not required to be registered as an FCM can nonetheless have the system compute its adjusted net capital in the same manner as an FCM.

At step 346, the system can receive and base membership approval on the at least some of following information (risk standards) in connection with an applicant's application for Clearing Membership:
1. Applicant's Risk and Performance Bond policies and procedures including:
   a. Debit/deficit history and doubtful account policies
   b. Limit-setting controls
   c. Staffing levels and qualifications
   d. Back-office systems
   e. Monitoring systems
2. Applicant's ability to understand and report on the risks that it is undertaking by trading and clearing interest rate swap contracts.
3. Customer and house trading activity including volume and Performance Bond estimates.
4. Subordinated debt agreements.
5. Previous regulatory reporting issues (if any) and discuss findings with the Legal Department.

At step 348, the system can perform Ongoing Financial Review of Clearing members. In accordance with the Clearing Member's requirement to provide periodic financial statements, the system can receive and base ongoing membership status on the at least some of following information:
1. Adjusted net capital ("ANC") and excess net capital ("ENC") levels.
2. Any on material changes in pertinent balances that have occurred since the previous financial statements.
3. Any unusual items or legal proceedings and bring them to the attention of the Legal Department.
4. Independent Auditors Report (if available) to ensure, that:
   a. The statements fairly present, in all material respects, the financial position of the Clearing Member in accordance with GAAP.
   b. No material weakness or qualified opinions have been granted.
5. Independent Auditors Report (if available) on internal controls to ensure that the Clearing Member's practices and procedures are adequate and meet the standards of the Clearinghouse and any applicable regulator.

The system can receive the above information as scores, points, Boolean values, or the like. The system can use a heuristic such as a weighted sum, rules, or the like to determine approval of the applicant for membership or ongoing membership status.

Figure 3E:
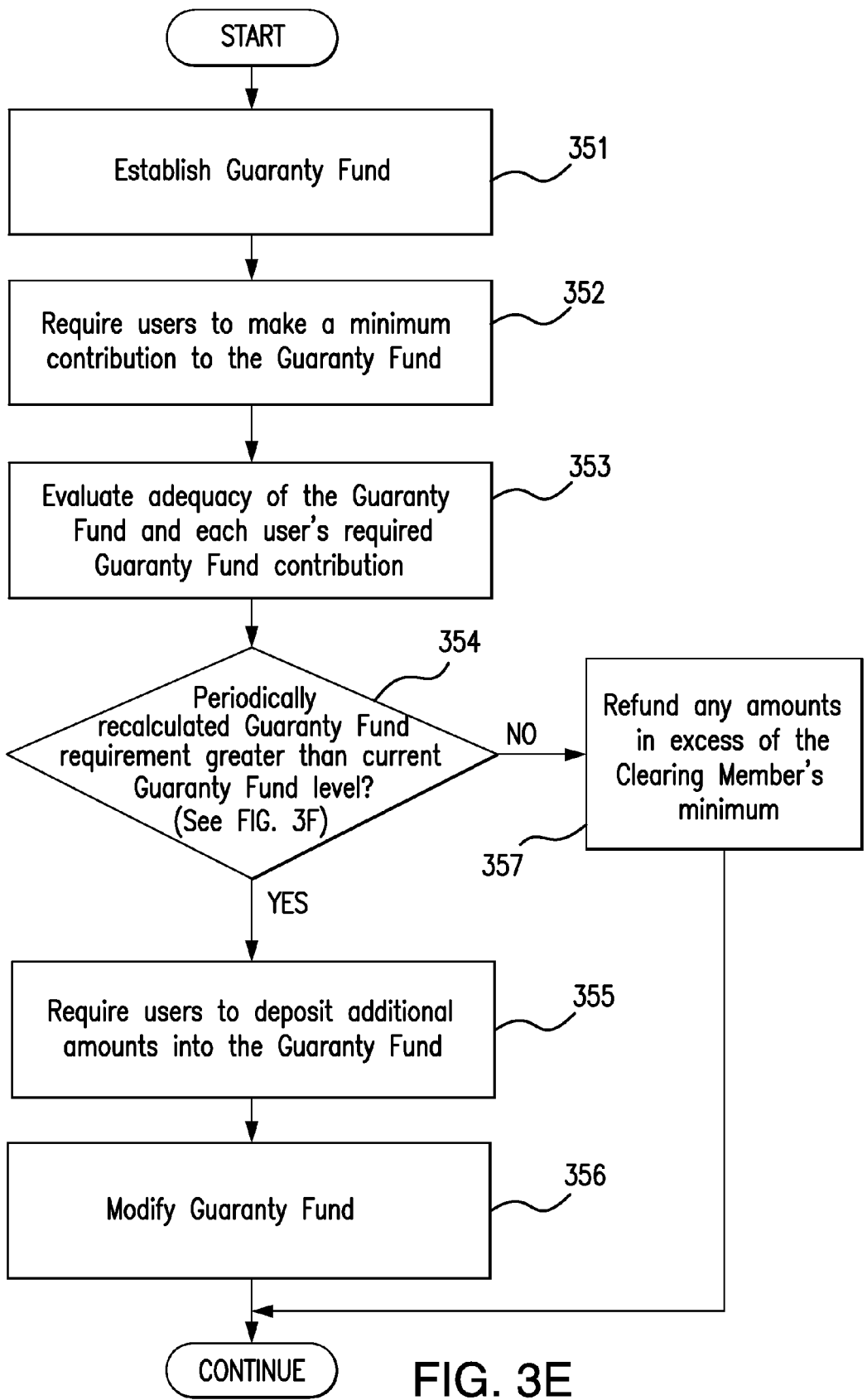

FIG. 3E is a flow chart for a process for managing the Guaranty Fund in the clearing house trading system in accordance with embodiments of the invention. The system can continuously monitor and ensure the fair allocation of the Guaranty Fund to offset a potential default scenario.

At step 351, a guaranty fund is established. The Clearinghouse has established a Guaranty Fund to cover its clearing obligations in the unlikely event of a Clearing Member default. In order to maintain an active status, all Clearing Members are required to contribute and maintain adequate assets in the Guaranty Fund.

At step 352, Clearing Members are required to make a minimum contribution to the Guaranty Fund. In one embodiment, the minimum contribution is threshold amount (e.g., $5,000,000) for Class A Members and threshold amount (e.g., $2,500,000) for Class B Members. The contribution of a Class A Member can be subject to a three-year lock-up provision and the contribution of a Class B Member can be subject to a one-year lock-up provision.

At step 353, the system can evaluate the adequacy of the Guaranty Fund and each Clearing Member's required Guaranty Fund deposit on a periodic (e.g., quarterly basis) and can perform periodic (e.g., daily) stress testing of the Guaranty Fund, each as described below. Clearing Members are required to deposit such additional amounts as the Clearinghouse and/or the system shall determine from time to time.

Based on the feature of allowing clearing participants to back-load portfolios for clearing, the Guaranty Fund can be stressed and reallocated if a portfolio of more than a threshold, e.g., $250,000,000 notional, is added. In one embodiment, each Clearing Member is required to maintain its minimum Guaranty Fund deposit as long as it remains a Clearing Member. In one embodiment, Clearing Members can deposit U.S. Currency in order to satisfy their Guaranty Fund requirements.

At step 354, the system can periodically (e.g., on no less than a quarterly basis) recalculate and set the Guaranty Fund requirement according to the greater of three daily stress tests described in the following paragraphs and perform determinations based on the recalculation of the requirement.

If the result of the calculation of requirement is more than the current Guaranty Fund level, processing continues to step 355, where all Clearing Members may be required, to deposit additional amounts into the Guaranty Fund pro rata based on each Clearing Member's daily average Performance Bond requirement. After any recalculation of the Guaranty Fund requirement, a Clearing Member whose requirement exceeds 125% of the then current Guaranty Fund requirement for any three consecutive days can be required to contribute additional resources within one business day. Any Clearing Member not meeting this deadline can have its account automatically debited on the second business day following the adjustment. A Clearing Member whose requirement has decreased relative to its current contribution may withdraw its excess contribution upon request after fulfilling the three year or one year lock-up requirement. The Clearinghouse can not call for any additional contribution to the Guaranty Fund that would otherwise be required if the amount is less than threshold amount (e.g., $10,000).

At step 356, if the stress testing of the Guaranty Fund show any deficiencies, the system can automatically increase in the size of the Guaranty Fund and/or an indication can be sent to convene a Risk Committee within 5 business days to recommend an increase in the size. In one embodiment, the Guaranty Fund requirement can be increased to a level such that the stress test is satisfied. The minimum Guaranty Fund requirement can also be set as 5% of the average daily Performance Bond at the Clearinghouse over the previous 125 trading days If the result of the calculation is less than (or equal to) the Guaranty Fund level, processing continues to step 357, where any amounts in excess of the Clearing Member's minimum can be returned to the Clearing Member upon request.

Figure 3F:
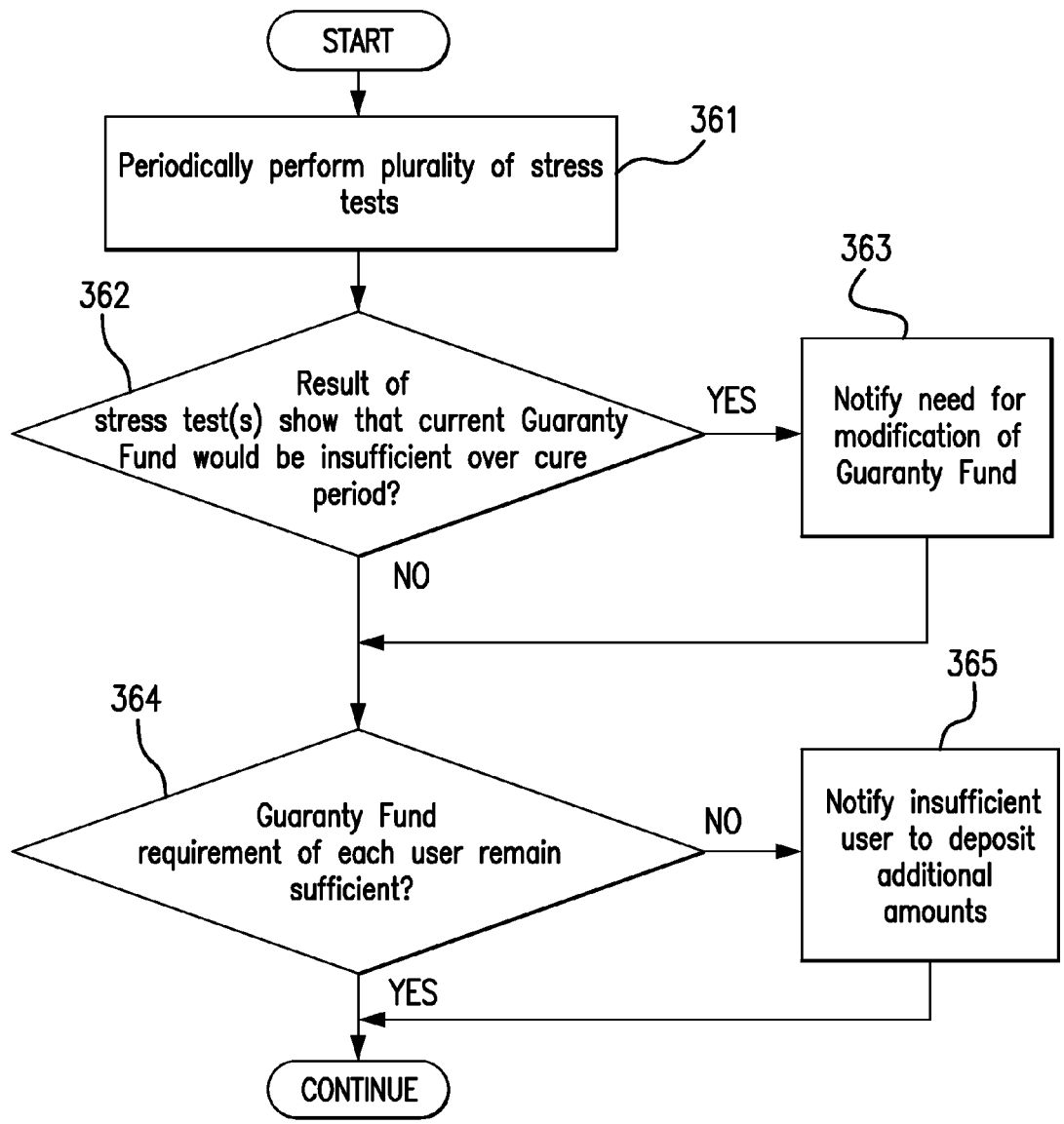

FIG. 3F is another flow chart for a process for managing the Guaranty Fund in the clearing house trading system in accordance with embodiments of the invention.

At step 361, the system can periodically (e.g., on a daily basis) perform, at least one, and preferably two or more stress tests of the Guaranty Fund. In one embodiment, the first stress test simulates the default of the two largest Clearing Members (by Performance Bond deposits) and a randomly selected third Clearing Member, assuming a six standard deviation price change in the underlying interest rate swap as calculated internally by the system using a non-directional shift in the interest curve. The second stress test simulates the default of the largest Clearing Member, assuming the worst-case price change in the underlying interest rate swap contract observed over the prior two years.

In each case, the resulting defaults can be simulated over a one-, two- and three-day cure period, or any number of days determined or adaptable by the system.

At step 362, the sufficiency of the Guaranty Fund can be gauged in curing the defaulting Clearing Members' positions. If the result of either stress test show that the then current Guaranty Fund would be insufficient over the three-day cure period, processing continues to step 363, where the a notification of a need to modify the Guaranty Fund is sent.

At step 364, the system can periodically (e.g., on a daily basis) compares the Guaranty Fund requirements of each Clearing Member to its deposits in the Guaranty Fund to ensure such deposits remain sufficient. If such deposit is insufficient, processing continues to step 365 where the system can notify the Clearing Member of such deficiency and the Clearing Member can be required to deposit additional amounts into the Guaranty Fund within one business day. Any Clearing Member that does not meet this deadline can have its account automatically debited for such deficit on the second business day following the notice.

Figure 3G:
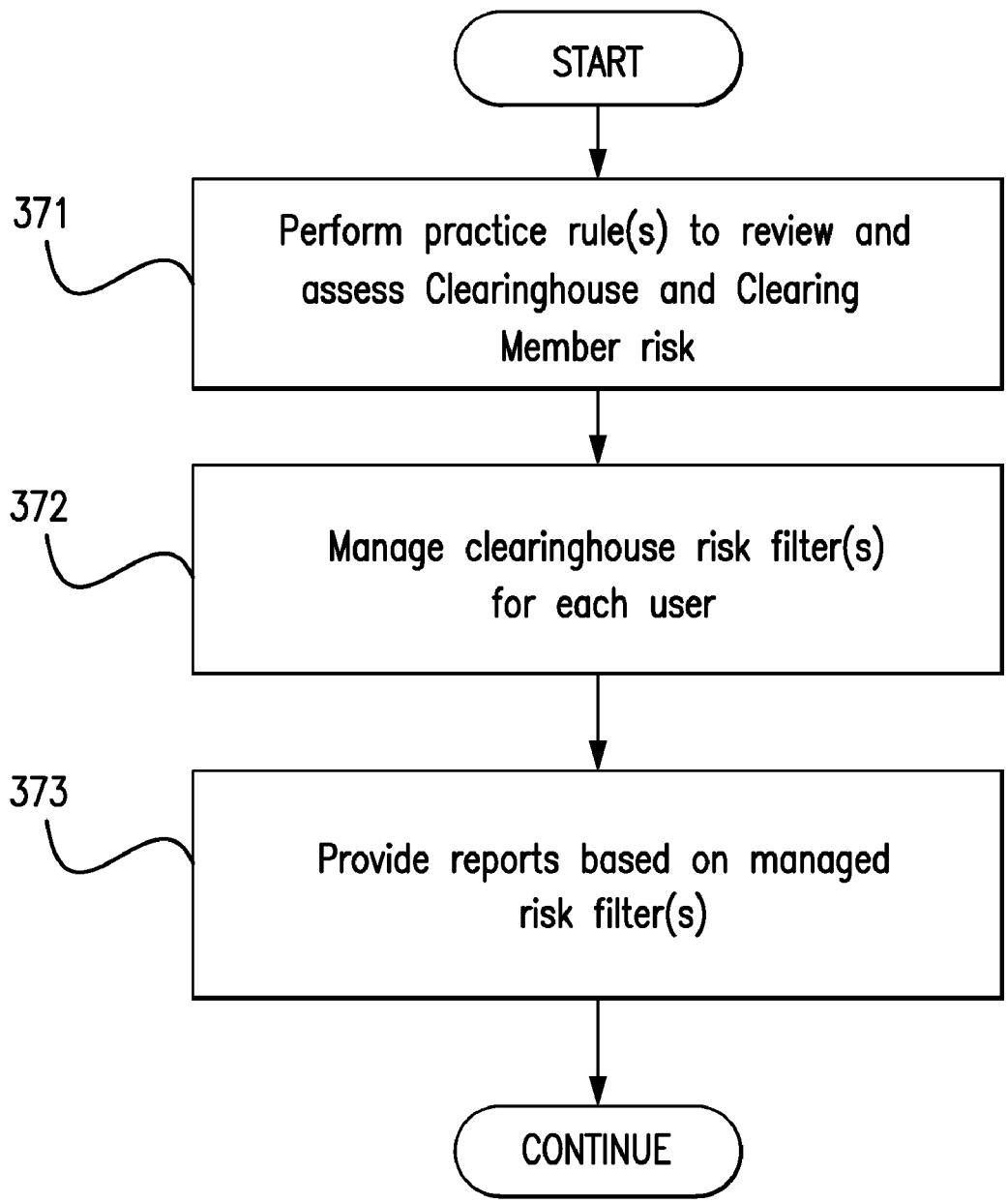

FIG. 3G is another flow chart for a process for managing Risk Monitoring in the clearing house trading system in accordance with embodiments of the invention. The system can review and assess Clearinghouse and Clearing Member risk utilizing various practices at predetermined frequencies. Trading activity of the Clearing Members can be processed, pre-trade, though the Clearinghouse Risk Filter in order to prevent Clearing Members from exceeding risk limits and to protect the Clearinghouse from unauthorized trading events.

At step 371, the system can perform a practice rule to review and assess Clearinghouse and Clearing Member risk utilizing various practices at predetermined frequencies. In one embodiment, the system can use at least one of the following rules. The rules can be configured in processor readable medium. The configurations below shows preferred embodiments of the functions, system component involved, frequency, automatic/manual configuration, or the like, but the rules can be modified, for example, to be performed automatically and or indicated for manual performance through an interface, without departing from the scope of the invention. The system components described below, including the Excel frontend (which can alternately be a web frontend), OMNet/Razor are described in more detail with respect to FIGS. 2A-2E. External sources, including Bloomberg, Reuters, or the like can be data provider device 108 of FIG. 1. The practice rules include:

Intraday Practice 01
Name: Real-Time Risk Monitor
Function: To monitor intraday yield curve movement against established Performance Bond or trigger levels
System component: Excel frontend, data from OMNet/Razor, prices from external sources
Frequency: Intraday
Intraday Practice 02
Name: News Monitoring
Function: To monitor relevant news developments throughout the day
System component: Bloomberg, Reuters, other media streams
Frequency: Intraday
Process: Manual
DAILY PRACTICE 01
Name: Daily Report Final Pay Monitor
Function: Monitor prior day's final pays.
System component: OMNet/Razor
Frequency: Beginning of each day
Process: Automated
DAILY PRACTICE 02
Name: Daily Report Performance Bond as a Percentage of ANC
Function: Monitor prior day's total Performance Bond as a percentage of a Clearing Member's ANC
System component: Excel frontend, data from OMNet/Razor and data warehouse
Frequency: Beginning of each day
Process: Automated
Daily Practice 03
Name: Performance Bond Deficits
Function: Review Performance Bond deficits
System component: OMNet/Razor
Frequency: Beginning of each day
Process: Automated
DAILY PRACTICE 04
Name: Clearing Member Stress-Testing
Function: Review stress-testing results System component: Excel frontend, data from OMNet/Razor, prices from external sources, data warehouse
Frequency: Beginning of each day
Process: Automated
Daily Practice 05
Name: Collateral Monitor
Function: Ensure collateral deposits are in compliance with the Rules
System component: OMNet/Razor
Frequency: Beginning of each day
Process: Automated
Daily Practice 06
Name: Guaranty Fund
Function: Ensure Clearing Members meet their Guaranty Fund obligation on a daily basis
System component: OMNet/Razor
Frequency: Beginning of each day
Process: Automated
Daily Practice 07
Name: Guaranty Fund Level
Function: Ensure the Guaranty Fund is sufficient
System component: OMNet/Razor
Frequency: Beginning of each day
Process: Automated
Daily Practice 08
Name: Previous Day Pays by Clearing Member
Function: Review prior day's final pays by Clearing Member.
System component: OMNet/Razor
Frequency: Beginning of each day
Process: Automated
Daily Practice 09
Name: Daily Report Spread Credits
Function: Review spread credits
System component: OMNet/Razor
Frequency: Beginning of each day
Process: Automated
Daily Practice 10
Name: Midday Pay Collect Review
Function: Review Midday price snapshot and pay/collect calculation.
System component: OMNet/Razor
Frequency: Midday of each day
Process: Automated
Daily Practice 11
Name: Afternoon Deficit Review
Function: Review mid-day Performance Bond deficits for positions to be cleared after 1:30 pm New York time
System component: OMNet/Razor
Frequency: Midday of each day
Process: Automated
Daily Practice 12
Name: Collateral Pricing Report
Function: Review collateral pricing report for missing prices.
System component: OMNet/Razor, Bloomberg
Frequency: At 3 PM each day
Process: Manual
Daily Practice 13
Name: Daily Report Change in Required Performance Bond
Function: Review daily change in required Performance Bond
System component: OMNet/Razor
Frequency: Beginning of each day
Process: Automated
Daily Practice 14
Name: Final Settlement Review
Function: Review daily settlement prices.
System component: OMNet/Razor, Bloomberg, Reuters
Frequency: End of each day
Process: Automated
Daily Practice 15
Name: Daily Report Guaranty Fund Stress Test
Function: Daily stressing of the Guaranty Fund
System component: Excel frontend, MatLab, data from OMNet/Razor, external prices
Frequency: Daily
Process: Automated
Daily Practice 16
Name: Large Trader Reporting
Function: Determine trading activity of large traders
System component: OMNet/Razor
Frequency: Daily
Process: Automated
Daily Practice 17
Name: Review Position Limits
Function: Determine suitability of position limits per Clearing Member
System component: OMNet/Razor
Frequency: Daily
Process: Automated
Other Daily Practices
Other Daily Practices, to be used when deemed necessary by the system are:
  Initiate discussions with Clearing Member's management and banking representatives regarding potential cash flow problems, if necessary; and visit the Clearing Member immediately if conditions warrant.
  Determine price limit projections, analyzing whether additional exposure might be encountered by select Clearing Members or individual accounts; and discuss volatile market exposure with Clearing Member management, where applicable.
  Monitor the liquidation and/or transfer of positions for Clearing Members which have exceeded their position limits on a daily basis.
  Report and review any transactions that trigger the Clearinghouse Risk Filter.
  Contact other clearinghouses to determine if any Clearing Member is experiencing difficulties managing their exposures to other exchanges.
Monthly Practice 01
Name: Performance Bond Interval and Spread Credit Review
Function: Review Performance Bond intervals and spread credits to ensure they meet the required standard set forth in the Original Performance Bond section of the Risk Management Procedures.
System component: Excel frontend, OMNet/Razor, external/internal prices
Frequency: Performance Bond meeting is held within the first five business days of each month.
Process: Automated
Monthly Practice 02
Name: Clearing Member Financial Status Review for firms reporting monthly
Function: Clearing Member Financial Status Review for firms reporting
System component: Physical statement review/download to data warehouse
Frequency: End of month review
Process: Manual
Monthly Practice 03

Name: Volatile Contract/Market Review
Function: Review the change of the settlement prices for each month of each active Contract so as to determine the exposure to volatile markets
  System component: OMX/Razor/Data Warehouse
  Frequency: End of month review
  Process: Automated
Quarterly Practice 01
Name: Acceptable Performance Bond Collateral Haircut Rates and Policies Review
Function: Review the Acceptable Collateral haircut rate and policies.
  System component: Excel, external price reviews
  Frequency: Beginning of January, April, July, and October reviews
  Process: Manual
Quarterly Practice 02
Name: Guaranty Fund Reallocation
Function: Reallocation of the Guaranty Fund using the previous six months of data
  System component: Excel frontend, OMNet/Razor, data warehouse
  Frequency: Beginning of January, April, July, and October
  Process: Automated
Annual Practice 01
Name: Clearing Member Annual Financial Status Review
Function: Credit and Clearinghouse Risk Filter review of existing Clearing Members
  System component: Financial Statements, Excel, Word
  Frequency: Annual (February to April)
  Process: Manual
Annual Practice 02
Name: Review the Risk Management Procedures
Function: Assess the suitability of all risk management procedures based upon the previous year's data
  System component: Excel, MatLab, OMNet/Razor, data warehouse
  Frequency: First Quarter of every year
  Process: Manual At step 372, the system manages the clearinghouse risk filter(s) for each user. The system and/or the Risk Committee can set the Clearinghouse Risk Filter levels for the Proprietary Accounts of each Clearing Member, and each Clearing Member can be responsible for setting the Clearinghouse Risk Filter levels for each of its Customer Accounts.

The Clearinghouse Risk Filter can be set for each Clearing Member after an analysis of their books and records has been undertaken and their knowledge/capabilities of/in the interest rate markets assessed. Given the availability of longer dated and higher risk contracts, the Risk Committee can look at three fundamental factors: (1) the Clearing Member's liquidity and ability to pay, (2) experience in trading along all points on the yield curve and (3) the highest amount in Performance Bond the Clearinghouse can be comfortable to call, weighted by the average duration of all available contracts.

Each Clearing Member can be responsible for actually establishing and enforcing limits for customers that they clear. However, the system has the authority to review and reduce or cancel the limits a Clearing Member sets for its customers.

At step 373, the system can provide periodic reports (e.g., to the Risk Committee) as to whether the recommended limits have been respected over a given period.

Figure 3H:
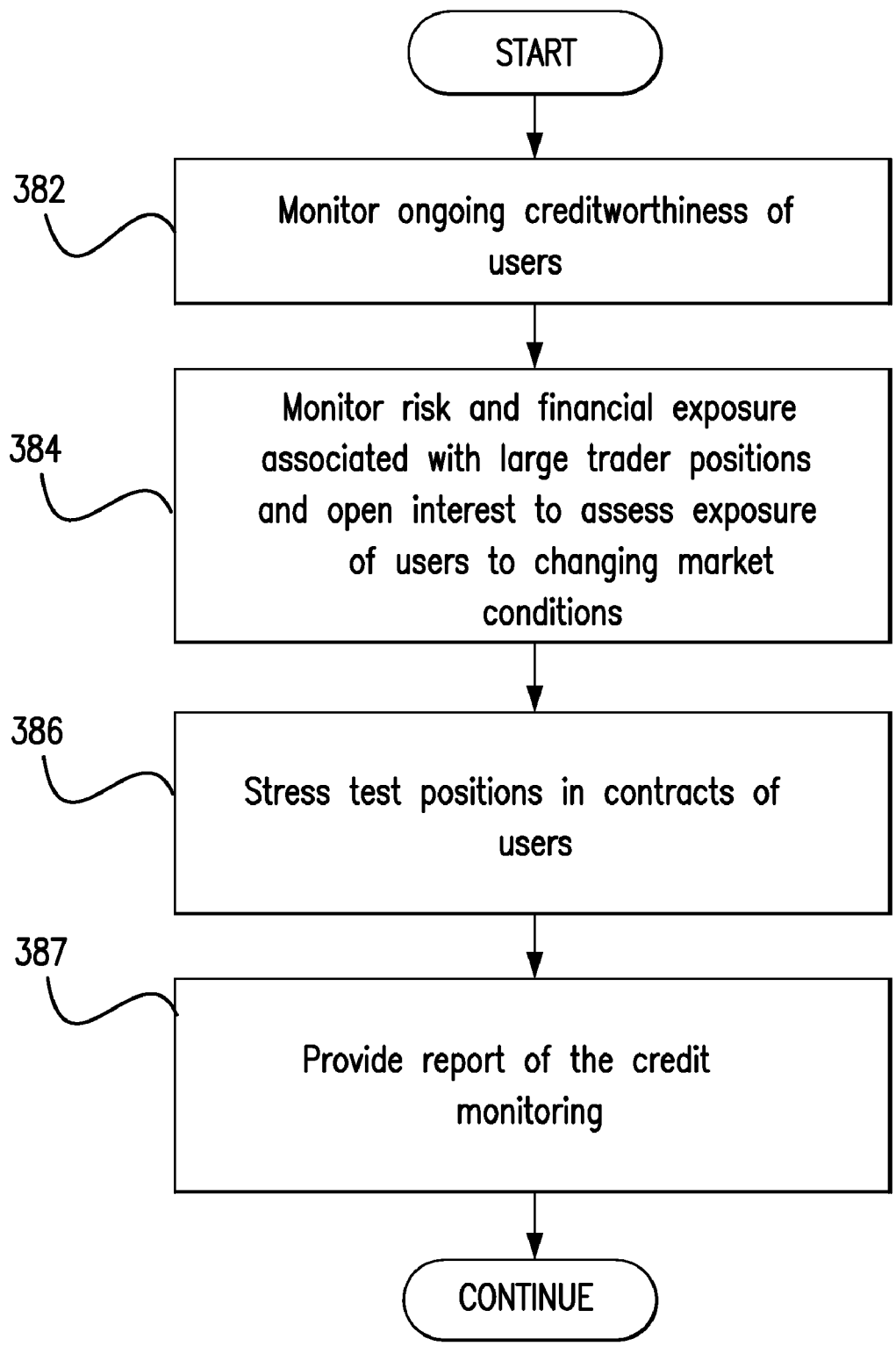
Figure 31:
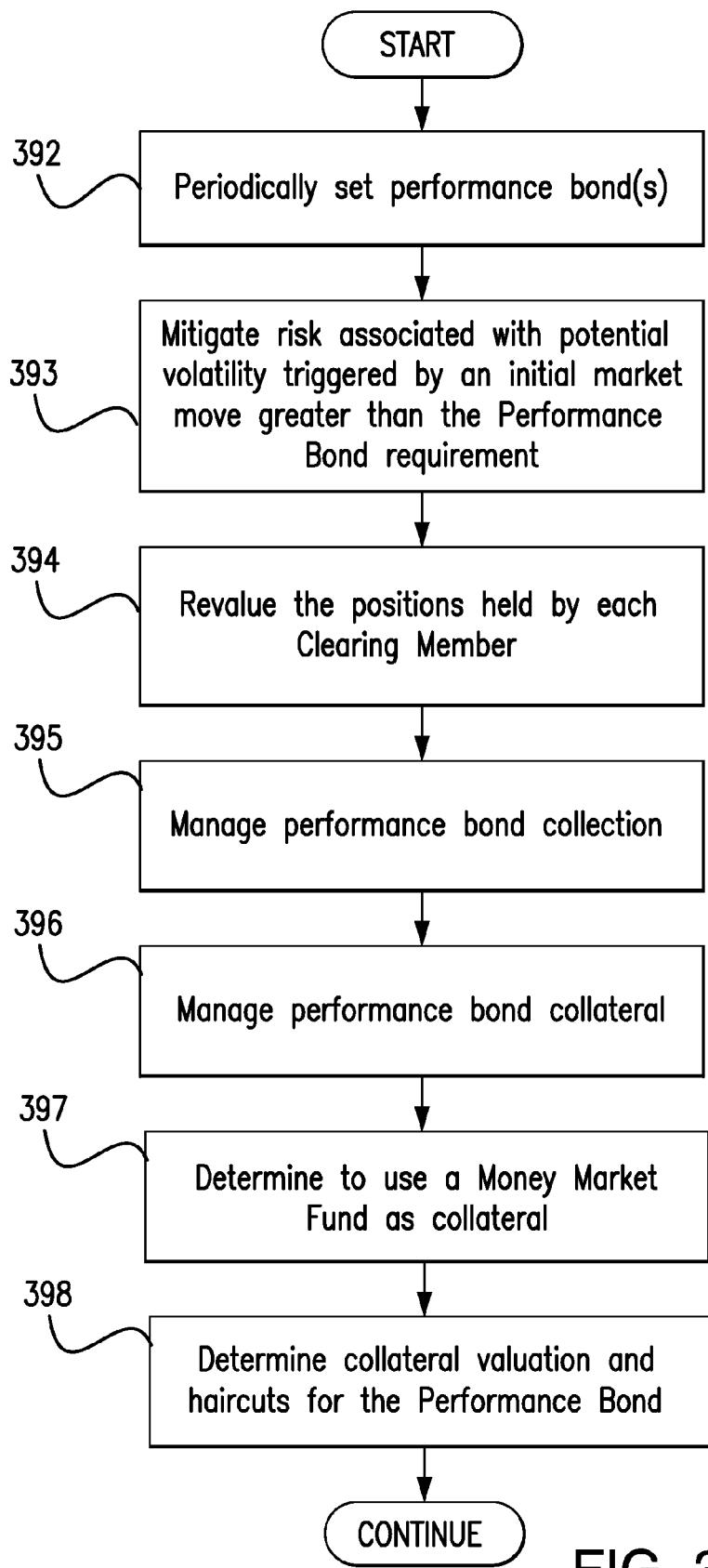

FIG. 3H is another flow chart for a process for managing Credit Monitoring in the clearing house trading system in accordance with embodiments of the invention.

At step 382, the ongoing creditworthiness of all Clearing Members can be monitored and appropriate action can be initiated, when circumstances warrant, ensuring a Clearing Member's continued creditworthiness subsequent to admission. To ensure their ongoing creditworthiness subsequent to admission, the system can monitor the capital levels of all Clearing Members as well as their adherence to regulatory and Clearinghouse requirements. All Clearing Members are required to submit their monthly CFTC Form 1-FR-FCM (or equivalent) for review by the system to ensure they maintain the minimum financial requirements set by the Clearing Member Committee.

At step 384, the system can monitor the risk and financial exposure associated with large trader positions and a firm's open interest to assess the exposure of Clearing Members to changing market conditions. If the notice is received that a Clearing Member has fallen below stated minimum financial requirements, the system can perform an investigation relating to the Clearing Member's ability to meet the financial requirements and confirm that they meet:
  capital requirements of the Clearinghouse, and
  have the financial capacity to meet their obligations to the Clearinghouse in relation to Performance Bond calls and settlement.

At step 386, periodically, positions in contracts of the Clearing Members can be stress tested. In one embodiment, on a daily basis, the positions in all contracts of the Clearing Members can be stress tested using a non-directional shift in the yield curve created in a scenario generator. These shifts can be generated by moving the underlying portions of the yield curve in different directions and differing magnitudes in order to arrive at a worst case scenario. The Clearing Members' positions can be revalued according to this stress test and compared against their existing collateral and last reported Adjusted Net Capital.

At step 386, periodically, a report of the credit monitoring can be provided. In one embodiment, on a monthly basis, a report of each Clearing Members' trading activity, Performance Bond levels and activity averages can be presented or otherwise provided, e.g., to a Risk Committee.

FIG. 3I is another flow chart for a process for managing Performance Bond(s) in the clearing house trading system in accordance with embodiments of the invention. Adequate but not excessive Performance Bonds can be collected to collateralize market risk.

At step 392, on a periodic (e.g., monthly) basis, can set the performance bond(s). The system can conduct an analysis of each product (e.g., each of the 13 stated maturities for each currency denomination) for the previous six months. Using the minimum Performance Bond standards established for each product group, the system can provide recommendations and/or determinations of adequate levels of Performance Bond interval and spread credit changes.

In one embodiment, under normal market conditions, the system can calculate the Performance Bond Requirement using a one day move in the price, calculated on an absolute value basis, of the underlying interest rate swap over a 30, 90 and 125 trading day time horizon. Under extraordinary market conditions, as determined by the Risk Management Department, the system can calculate the Performance Bond Requirement using a two day move in the price, calculated on an absolute value basis, of the underlying interest rate swap over a 30, 90 and 125 trading day time horizon. The resulting variances can be recalculated using 95%, 97% and 99.7% confidence intervals for each time period, and the largest value observed in the 99.7% confidence interval can be used to set the Performance Bond. The system also can calculate the Performance Bond using the largest one day move in price over the preceding 125 trading day time horizon. According to the risk policy adopted for each product, the highest resulting Performance Bond, rounded up to the nearest threshold amount (e.g., $100), can be applied. This procedure also provides a methodology for back-testing the sufficiency of Initial Performance Bond over the previous 125 trading days.

In one embodiment, the system can ensure that the higher risk in longer dated contracts is reflected in the levels chosen for Initial Performance Bond. The primary methods to protect the Clearinghouse are:

Time value of money: the discount factor calculation can reflect greater levels of risk inherent in the longer dated portions of the curve.

Confidence interval: the application of higher confidence intervals can result in higher Initial Performance Bond amounts.

Holding periods: the level of liquidity of longer dated contracts is generally lower and can result in higher Initial Performance Bond levels by adjusting the holding period.

In one embodiment, the system, e.g., system can employ any combination of the following additional Performance Bond methods:

1. Spot month Performance Bond charges
2. Calendar spread Performance Bond charges
3. Short option minimums (when and if options are offered)

In one embodiment, users of the system, including the Chief Risk Officer or its designee can have the access to the system to modify and or activate any of these methods.

At step 393, the variable Performance Bond rule is employed by the system to mitigate the risk associated with potential volatility triggered by an initial market move greater than the Performance Bond required. The variable Performance Bond rule can automatically increase the Performance Bond interval by 100% should a market move surpass 75% of the Original Performance Bond within one trading day.

Additionally, users of the system, including the Chief Risk Officer or its designee can have the access to the system to change Performance Bonds as necessary to protect the interests of the Clearinghouse (concentration risk, credit downgrades, excessive price movements, etc.).

Concentration Performance Bond amounts are set to ensure that Clearing Members are charged higher Initial Performance Bond amounts should they represent more than 25% of the open interest in any given contract. The application of concentration is designed to (1) protect the Clearinghouse for the increased risk in case of a default by the Clearing Member and (2) act as an incentive to the Clearing Member to reduce the concentration in the contracts.

In one embodiment, the system, e.g., the system can determine that concentration margins based on the following schedule:

| Concentration Level | Margin |
|---|---|
| 25% | 125% |
| 50% | 150% |
| 75% | 200% |

At step 394, the system can periodically revalue the positions held by each Clearing Member. The step can be performed throughout the trading day, and preferable twice daily. The revaluation process can rely on the construction of a blended interest rate curve to generate discount factors for any point along the curve. The resulting net present value of the cash flows (fixed side and floating side in the case of an interest rate swap future) can determine the value, or mark-to-market of the interest rate swap future. The Clearinghouse can debit the Clearing Member's collateral account to realize any losses during the trading day. Gains in value can be paid once per day in the first banking process.

The blended yield curve can be constructed by bootstrapping a set of quoted benchmark rates and various financial contract prices to create zero coupon discount factor curves. This process is described in more detail with respect to step 306. Briefly, the bootstrapping process begins with the shortest term swap future contract and steps through them all in ascending order of maturity. At every step, discount factors from the preceding swap future contracts are used to determine the discount factor for the current one. The curve generation process strips each swap future contract into its individual cash flows and then prices it using zero coupon pricing.

The Clearinghouse can use the following elements to construct its revaluation curve:

Money market rates (deposit rates, FRA rates)
Interest rate futures
Swap market rates
Bond market rates The methodology for generating the curve can be published and available to the Clearing Members and the general public on the Clearinghouse Website. As new products are added, the revaluation curve methodology can be reviewed for its applicability and suitability to the risks taken by the Clearinghouse.

At step 395, the performance bond collection is managed. In one embodiment, the system uses at least one of the following rules associated to the collection of all Performance Bond requirements at the Clearinghouse.

1. Original Performance Bond requirements for each Clearing Member's origin can be calculated at least twice each day, once before the Original Performance Bond settlement (e.g., 8:30 am) and a second time before the Midday variation (e.g., 1:00 pm). All times can be Eastern Time.
2. All deficits related to Original Performance Bond can be, and preferably must be fully collateralized by the settlement period (e.g., 10:00 am).
3. All deficits related to Original Performance Bond can be, and preferably must be met in cash. A Clearing Member has the option of exchanging cash for Acceptable Performance Bond Collateral once the deficit is satisfied.
4. A holdback against midday collects is used to secure any Performance Bond deficits associated with the midday calculation.
5. Normally, Performance Bond calls can be, and preferably must be uniform across all Clearing Members, but where a particular risk is deemed hazardous, the system may depart form the rule of uniformity and call for additional Performance Bonds at any time. If an additional Performance Bond call is made, the Clearing Member has a period of time (e.g., one hour) to fully collateralize any deficits associated with additional Performance Bond.

At step 396, the performance bond collateral is managed. All forms of collateral must continue to meet at least one of the general collateral acceptance criteria below to be considered for approval:

1. There can be, and preferably must be adequate demand for acceptance of the collateral from among current Clearing Members.

2. An active secondary market with reasonable sized bids must exist.
3. An accurate, reliable and timely price information source can be, and preferably must be available to the Clearinghouse from an independent third party vendor.
4. The Clearinghouse can be, and preferably must be capable of obtaining a perfected security interest in the collateral type.

The acceptable forms of collateral for the Clearinghouse are:
USD Cash
USD Treasury Bills, Notes, Bonds
US Agency Debt Securities
Approved Money Market Mutual Funds Updates to the acceptable collateral can be published on a website.

At step 397, at least one money market fund is determined to usable as collateral. In one embodiment, the system may establish a list of Approved Money Market Funds which may be used as collateral based on at least one of the following criteria:

1. No more than 10% of the total number of outstanding shares of any Approved Money Market Fund can be accepted, in the aggregate from all Clearing Members as Original Performance Bond collateral.
2. No more than 5% of the total number of outstanding shares of any Approved Money Market Fund can be accepted from any Clearing Member as Original Performance Bond collateral.
3. No more than 10% of a Clearing Member's Original Performance Bond Collateral may consist of Approved Money Market Funds.
4. Approved Money Market Funds may be deposited with the Clearinghouse only in increments of one share. Depending on the practices of a given Fund, such shares can either be transferred to a Clearinghouse account established at the Fund, or deposited in the existing Clearinghouse custody account at a settlement bank.
5. Clearing Members investing in Approved Money Market Funds using the latter method can be required to maintain at least one demand deposit account at that settlement bank (and supply the account number(s) to the Clearinghouse). Such Clearing Members should also contact the settlement bank directly to determine what, if any, additional documents accounts may be required.
6. The Clearinghouse reserves the right to decline the acceptance of a Fund's shares for Performance Bond purposes if it does not comply with CFTC Rule 1.25.
7. An Approved Money Market Fund must to provide the Clearinghouse with a detailed listing of its underlying investments no less than weekly. This information can be used to calculate the variance between its funds amortized cost value and the than current mark-to-market value of the underlying investments. If the amount of the variance is equal to or greater than −0.5%, the Approved Money Market Mutual Fund can be disqualified as an Approved Money Market Fund.
8. Details regarding specific funds that are acceptable as collateral can be found on the Clearinghouse website.

At step 398, the system can determine the collateral valuation and haircuts for the Performance Bond. The following are one embodiment of rules governing the collateral valuation and haircuts used to determine the Performance Bond on deposit amount.

1. The Clearinghouse and/or the system can mark-to-market all non-cash collateral forms on a daily basis utilizing price provided by an independent third party vendor.
2. All non-cash collateral forms can be subject to a "haircut" that reasonably represent the daily price risk inherent to the collateral. Haircuts can be determined on a quarterly basis by the system, and/or provided to a person or group of persons such as a Risk Department to determine. The current haircuts can be published on a website.

Figure 3J:
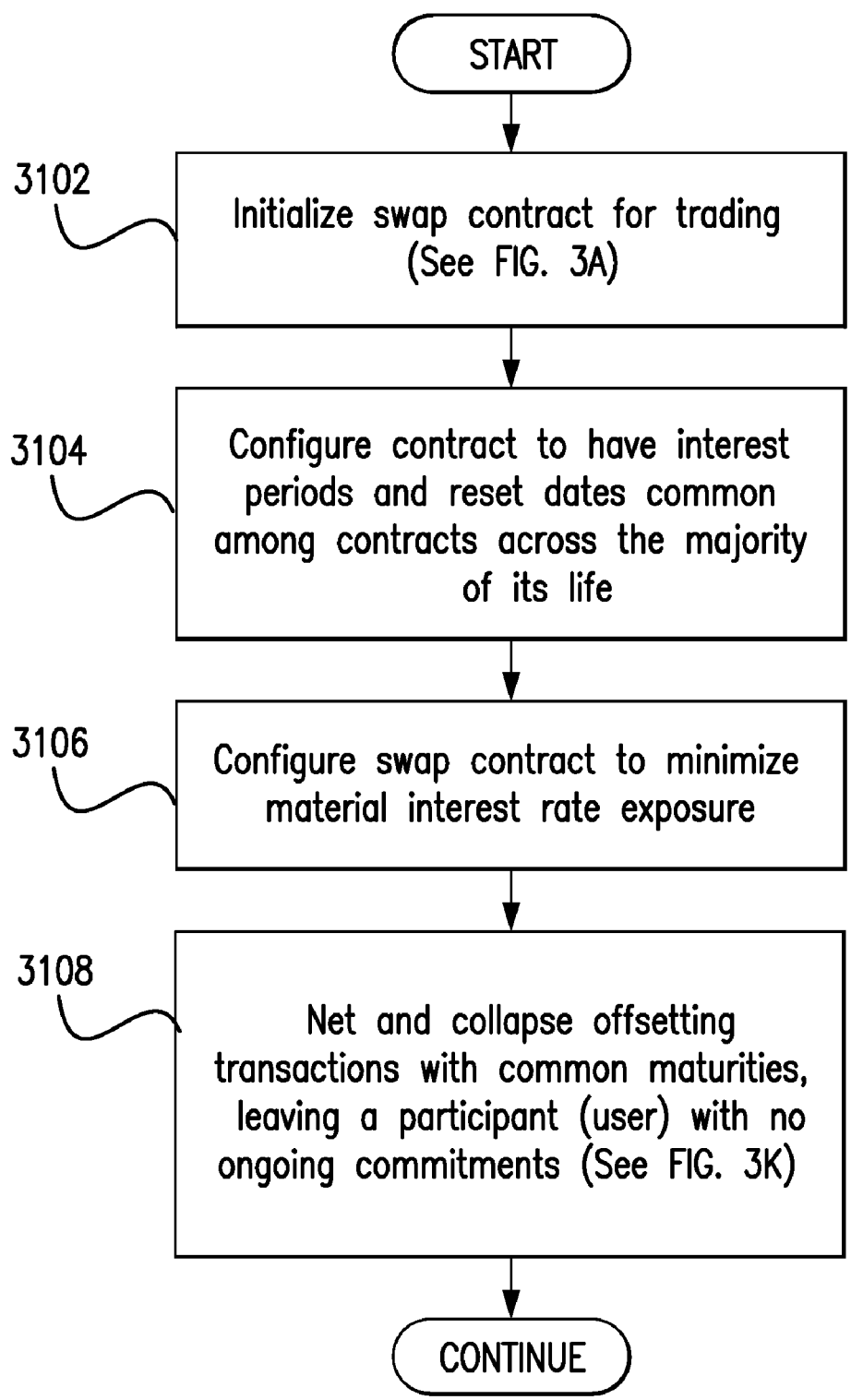

FIG. 3J shows a process for managing mismatches in an interest rate swap portfolio within the electronic trading system of derivate and/or swap contracts with the clearinghouse as a counter party in accordance with embodiments of the present invention. The high degree of fungability of risk within a set of interest rate swap contracts allows counterparts to manage the component risk of the portfolio rather than the risk of the individual contracts. Without diligently terminating or novating individual contracts this component risk approach results in mismatches in maturities and coupons. Without any simple mechanism for offsetting these mismatches, their management has required consistent maintenance and incurred ongoing cost.

The process described below provides for First In First Out (FIFO) offsetting and netting of similar swap contracts based on maturity dates of the contracts thereby reducing the residual risk for the exchange.

At step 3102, the system initializes a swap contract for trading. In one embodiment, the contract is a IDEX USD DLOC contract and is configured to alleviate the impact of these mismatches while retaining the granularity and precision of the existing IDEX USD IRS contract. The IDEX USD DLOC contract is configured to encourage a large degree of cross over interest from existing contracts. In general, any swap contract that is configured such that small mismatches in maturity dates do not create significant exposures from their offsetting fixed legs can be configured for the process, i.e. yesterday's spot five year contract is a very effective hedge against movements in today's spot five year rate. The process for initializing a swap contract for trading is described in more detail in at least step 302 of FIG. 3A.

At step 3104 the contract is configured to have interest periods and reset dates common among contracts across the majority of its life. Where exposure does occur is in the timing difference in the floating rate sets, if these settings straddle an important economic or monetary policy event, they can create or destroy material value. The IDEX USD DLOC contract or any other contract configured for the process deals with this risk by being configured to have interest periods and reset dates common among contracts across the majority of its life (e.g., a substantial period of the life—e.g., 90-100% of the life). Specifically, in one embodiment, interest payments are configured to occur on the third Wednesday of the months of March, June, September and December, and finally on the maturity date of the contract itself. This way the first and last floating resets will differ across contracts, thus reducing the implications of holding maturity date mismatches and furthermore allows the Clearinghouse (IDCH) to offer significant initial margin relief.

At step 3106, the swap contract can be further configured to minimize material interest rate exposure. Mismatches in coupon rates can create material interest rate exposure if the resultant annuity is large. This can be the case if the offsetting notional is significant and/or if the coupon differential is wide. This exposure arises because the value of a positive annuity increases as yield fall (and vice versa). In one embodiment, the IDEX USD DLOC contract or any contract configured for the process deals with this risk by trading on price and keeping all future obligations common for a given maturity date. Specifically, in one embodiment, all fixed rates are set at 5.00% and the price represents the net present value of these common future obligations.

At step 3108, the system (and/or the counter-party/IDCH) nets and collapses offsetting transactions with common maturities, leaving a participant (e.g., user and/or clearing house) with no or almost no ongoing commitments. The process of step 3108 can be performed by the process of FIG. 3K. By virtue of the swap product construction and configuration described above and to ease cross over interest from existing contracts the system/IDCH is able to provide a common valuation tool in the form of the system Discount Curve as described herein, which results in total variation margin relief and significant initial margin relief between various contracts, including IDEX USD IRS contracts and IDEX USD DLOC contracts. Processing then continues to other processing.

Figure 3K:
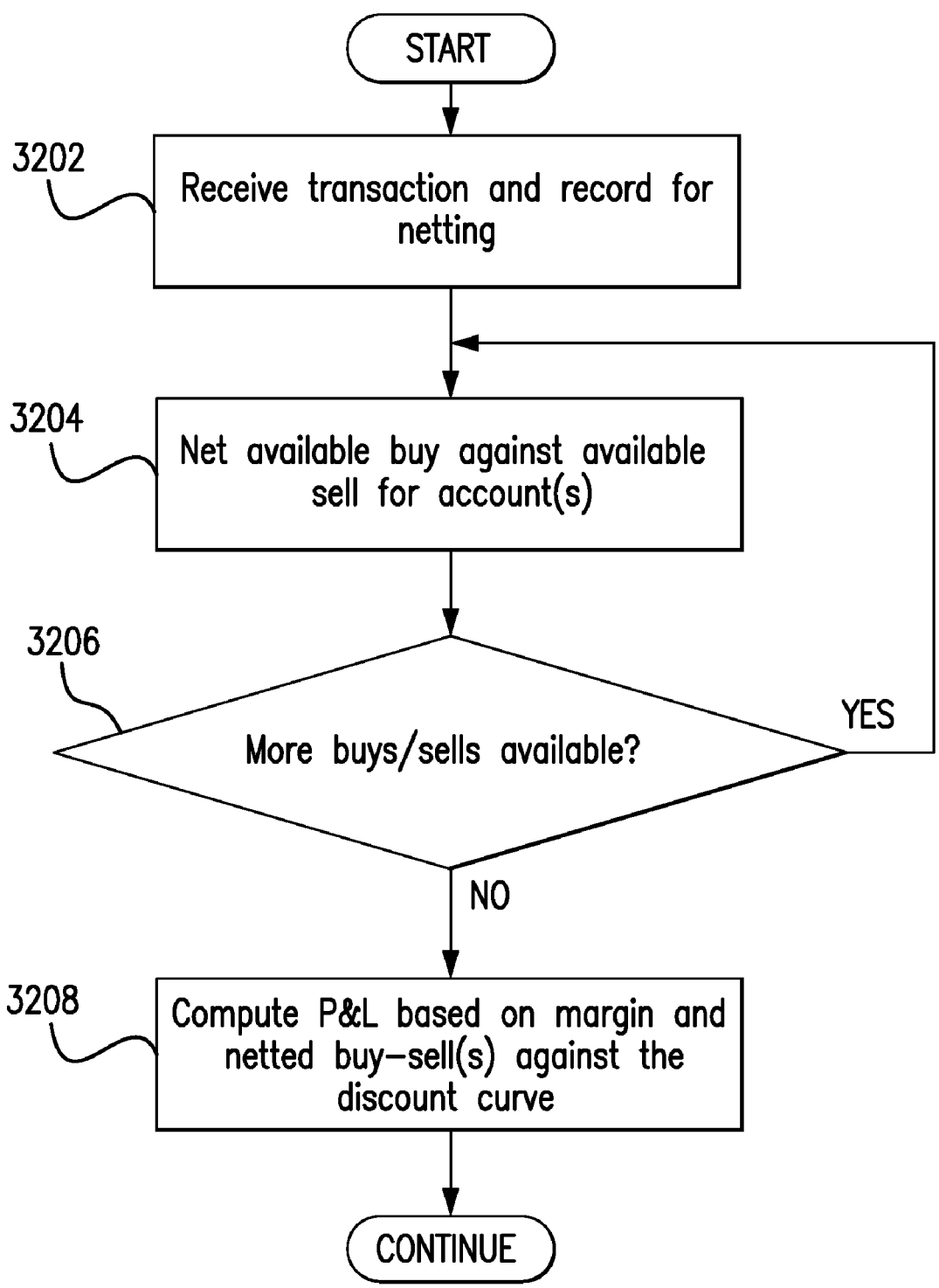

FIG. 3K shows a process for FIFO netting of similar swap contracts performed by the system in accordance with embodiments of the present invention.

At step 3202, a trade is received and stored. In one embodiment, if the trade is a buy, the trade may be put in a buy FIFO queue. If the trade is a sell, the trade may be put in a sell FIFO queue.

At step 3204, for a single account (e.g., a Trading and/or position account or Daily Account) and/or a group of related account, each like contract is netted on a First In First Out (FIFO) basis. So the first buy available (e.g., on the buy FIFO queue) will be netted by the first sell available (e.g., on the sell FIFO queue) and visa versa. The netted transactions are removed from the respective FIFO queues.

At step 3206, it is determined if the buy and/or sell FIFO queues are not empty, processing loops back to step 3204, where the next buy may be netted by the next sell and so forth. So if in an account, the user buys at 10@4.00%, than 15@4.01%, than 25@4.04% and than 5@4.02% than the user sells 10@4.06%, the system will net the first buy at 4.00% against the first sell at 4.06% and so on. In this embodiment, the result of the netting may be 6 bps.

At step 3208, a Profits and Loss (P&L) is computed for each netted pair of buy to sell and/or across all pairs based on a valuation of the result of the netting (e.g., 6 bps) against the discount curve and the computed margin for the user. In one embodiment, the P&L made of the netted buy to sell is then determined by the Dollar Value of 1 basis point (DVO1) of a basis point against the discount curve (as disclosed herein) and paid or collected in the variation margin. In one embodiment, the DVO1 of a basis point against the discount curve comprises valuation against the discount curve as described in FIGS. 6A-6C. In the above example, if the user sold at a value (e.g., 50 m), the system will net in order of time to fulfill the sale. Processing then continues to other processing.

Further Illustrative System

In one embodiment, the system of FIG. 1 as disclosed above may be further configured to manage analysis and reporting with respect to the swap contract exchange. In on embodiment, server device 102 of the system may be configured to perform the process of FIGS. 3A, 8A-10.

Further Illustrative Apparatus

In one embodiment, the apparatus of FIG. 2A as disclosed above may be further configured to manage analysis and reporting with respect to the swap contract exchange.

In one embodiment, analysis component 218 of the apparatus includes any hardware and/or hardware and software component configured to produce analysis reports about the swap contracts in the system and/or shadow or simulated clearing of a portfolio derivates within the electronic exchange computer system and/pr providing Shadow Clearing Reports. Component 218 can be configured to perform at least some of the steps of the processes of FIGS. 3A, 8A-10.

Further Illustrative Processes

FIGS. 3A, 8A-10 are flow charts and associated data structures for processes for managing a computer system for electronic trading of financial instruments, with a clearinghouse as a counter-party, using among other things, the computation of discount curves and margin maintenance to trades in accordance with embodiments of the invention. In one embodiment, at least some of the steps of FIGURES can be performed by, for example, the system (e.g., server device 102) and/or computing device(s) of FIGS. 1-2E as disclosed above. In one embodiment, at least some of the steps of FIGURES can be performed by a person and/or a group of person alone or with the aid of computer components.

FIG. 3A is a further embodiment of flow chart for a process for managing trading of financial instruments based on a computed discount curve in accordance with embodiments of the invention as disclosed above. The steps of FIG. 3A are described in this patent application.

In one embodiment, the steps may be modified to manage analysis and reporting with respect to the swap contract exchange. In particular, The process and interfaces of step 308 may be performed by the processes of FIGS. 11A-13M. The process of step 316 for generating reports may be performed by the processes of FIGS. 9-10. In an alternate embodiment, the process of step 316 may also perform the process of FIGS. 8A-8F. In other embodiments, the process of 8A-8F may be performed independently of the process of FIG. 3A.

FIGS. 8A-8F are examples of flow charts and data structures for providing analysis data for the system in accordance with embodiments of the present invention, based on, for example, the discount curve, forward rates, and the swap contracts to minimize the risk of the system, minimize the swap contract trading strategies, or the like, as described herein.

Swap contracts, unlike futures contracts, continue to pay and receive cash flows over their life. There is no concept of settlement on expiry under a swap in the way that there is in a future. The impact of this on the holder of a swap portfolio is that the passage of time has an effect on the value of the portfolio.

Figure 8A:
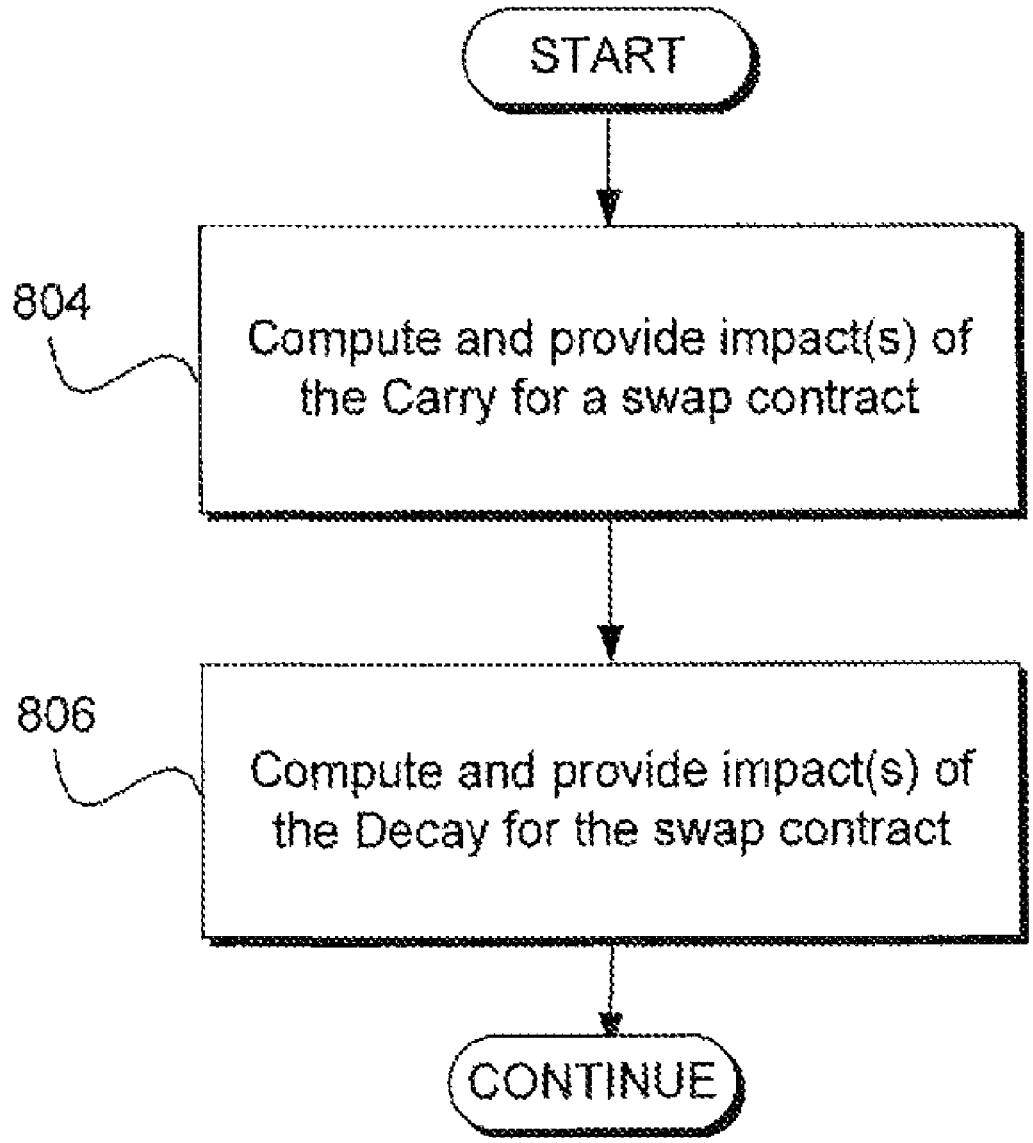
Figure 8B:
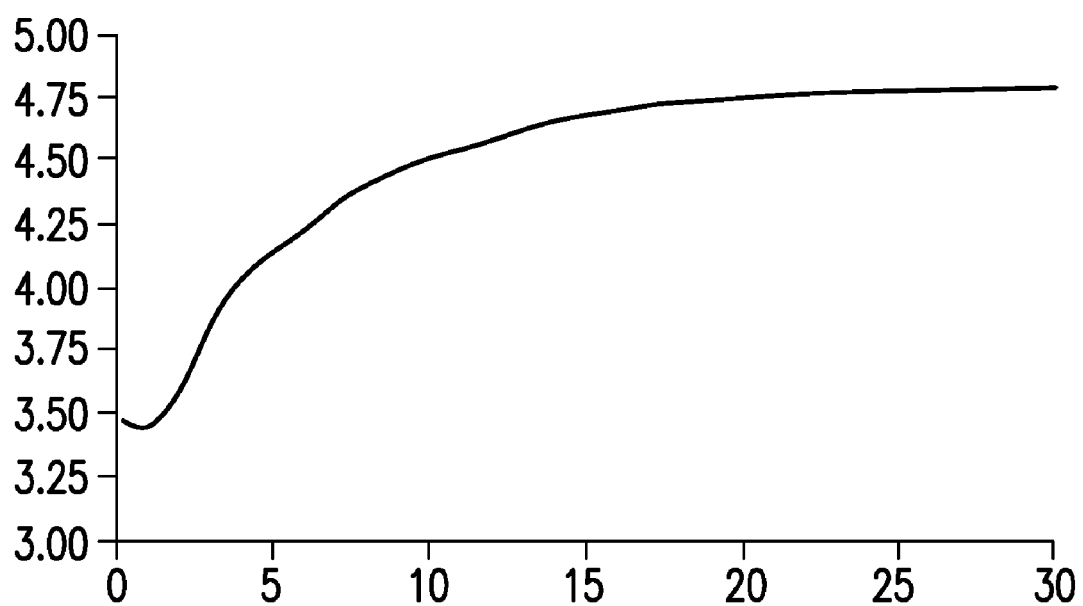

FIG. 8A is a flow chart for a process for determining the carry and decay of a swap contract. The system quantifies the impact of time on a swap contract by examining a swap with a final maturity of (e.g., 5 years) in the current market setting illustrated, as shown for example, in FIG. 8B. FIG. 8B shows the price (y-axis) over time (x-axis) of a LIBOR; 3.47625, 4 yr Swap; 4.01%, 5 yr Swap; 4.13%.

As used herein, the Carry refers to the differential between the interest accrued on the fixed and floating legs over the period. As used herein, the Decay refers to the differential between the initial yield of the swap and that predicted by the yield curve at the end of the period.

At step 804, the impact(s) of the Carry are computed and provided for the swap contract. The Carry parameter can be provided through the interface. To consider the impact of Carry, as an example, the system may manage a swap with notional of USD 1,000,000 and look at the period from 26 Sep. 08 to 27 Oct. 08, i.e. 1 month. The system then calculates the interest accruals, and uses the Day Count Fraction (DCF) conventions used in the USD Swap Market $$\text{interest Accrual} = \text{National} \times \text{Rate} \times \text{DCF}$$

For the floating interest accrual the rate is LIBOR, in this case 3.47625%, and the DCF is calculated using an Actual/

360 convention. This means the actual number of days in the period are divided by 360. So in the example $$1,000,000 \times 3.47625\% \times \frac{31}{360} = 2,993.44$$

For the fixed interest accrual the rate is the fixed coupon of the swap, in this case 4.13%, and the DCF is calculated using a 30/360 or Bond Basis convention. The 30/360 convention is a little more involved than Actual/360 but it essentially just assumes that each month has a length of 30 days. It is best explained as a formula $$\frac{[360 \times (Y_2 - Y_1)] + [30 \times (M_2 - M_1)] + (D_2 - D_1)}{360}$$

where Y1 & Y2 are the years, expressed as numbers, of the start and end dates of the interest period, M1 & M2 are the months, expressed as numbers, of the start and end dates of the interest period, D1 is the calendar day, expressed as a number, of the start date of the interest period, unless such number would be 31, in which case D1 will be 30, and D2 is the calendar day, expressed as a number, of the end date of the interest period, unless such number would be 31 and D1 is greater than 29 in which case D2 will be 30.

The system can now calculate the fixed rate accrual as follows $$1,000,000 \times 4.13\% \times \frac{31}{360} = 3,556.39$$

Now by netting these two accruals, the system determines the carry for holding this particular swap for 1 month as $562.95, a gain if you receive fixed (sell) and a cost if you pay fixed (buy).

At step 806, the impact(s) of the Decay are computed and provided for the swap contract.

This leaves us with the Decay to contend with, this process is not dissimilar to the way that a futures contract and its spot index converge as you approach expiry. Using the same example swap; at the end of the period the rate at which the system can close out the swap is no longer the prevailing 5 year rate but the 4 year 11 month rate. In one embodiment, if the system is configured such that the market is assumed not move over the period and rates travel in a straight line between the 5 year and 4 year, this rate is 4.12%.

With the initial fixed rate (4.13%) and the decayed fixed rate (4.12%), the system determines a measure of duration or the Basis Point Value (BPV) to determine the impact of Decay in the following way $$(413-412) \times 448.67 = 44867$$

The system then has the information required to quantify the impact of time on the swap contract.

For example, if the system receives a transaction to fix (sell) the swap contract, over the 1 month period, the system earns $562.95 in Carry and an additional $448.87 in Decay for a total gain of $1,011.82. It is sometimes useful to determine this number in breakeven terms. This is easily done by using the BPV used in the Decay calculation $$\frac{\$1,011.82}{\$448.87} = 2.25 \text{ basis points (bp)}$$

This means the swap rate can rise over the period by 2.25 bp before the discount curve starts to experience a loss. This is often referred to a Positive Carry, or just a Carry Trade.

In this example, the Carry and Decay performance of a swap over a 1 month period has been examined and determined. This choice of period is important. If the system had chosen to look at a different period the system may have generated significantly different answers. In fact the swap example would experience periods of both positive and negative Carry and Decay over its life.

Carry and Decay can be important components to the evaluation of a trading strategy expressed in the swap space. In one embodiment, the period over which Carry and Decay are implied are constrained to match the potential time horizon of the underlying strategy.

Processing then returns to other processing.

Figure 8C:
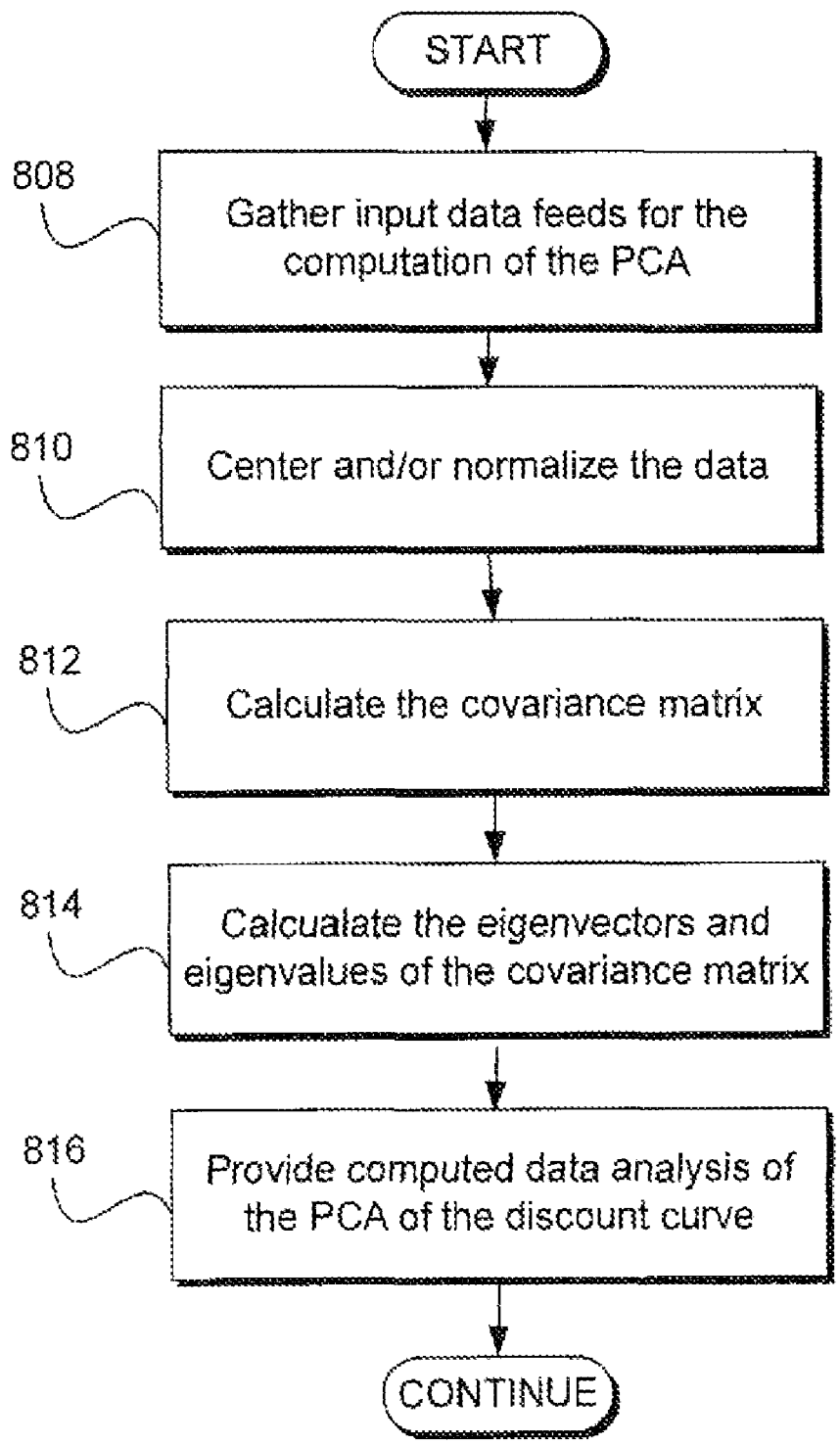

FIG. 8C is a flow chart of an example of a process directed to performing Principal Component Analysis (PCA) on swap contract(s). Many financial markets, and term structures in particular, are characterized by a high level of collinearity between prices, yields, and returns. Principal Component Analysis (PCA) is an efficient method of extracting the most important uncorrelated sources of variation in a large and/or confusing multivariate data set. While PCA has a wide array of applications from neuroscience to image compression, in financial modeling it has two popular uses; as a predictive model for "missing" data points and as a descriptor of the risk profile of portfolios.

PCA is a special case of Factor Analysis where error terms are assumed to have equal variance. It involves the formation of the eigenvalue decomposition of a data covariance matrix, after mean centering and normalizing the data for each attribute. In this example, the system uses the six months of USD Interest Rate Swap data from 18 Mar. 2008 to 18 Sep. 2008 to demonstrate the PCA technique and interpret its results. Six months is a commonly used sample for PCA but is by no means the only way to capture the underlying market dynamic, and other ways can be used without departing from the scope of the invention.

PCA can be performed by mathematical software packages such as Mathematica, ViSta: The Visual Statistics System, Spectramap, MATLAB, Multivariate Data Analysis Software, Weka, and/or custom statistical software packages that models and computes, among other things, Karhunen-Loève transform (KLT), the Hotelling transform or proper orthogonal decomposition (POD), or the like.

At step 808, the input data feeds for the computation of the PCA are gathered. In this example, the system may gather 1 yr, 2 yr, 3 yr, 4 yr, 5 yr, 6 yr, 7 yr, 8 yr, 9 yr, 10 yr, 12 yr, 15 yr, 20 yr, 25 yr, and 30 yr closing yields from Bloomberg for the period 18 Mar. 2008 to 18 Sep. 2008. The system next creates a matrix of 15 columns corresponding to the curve points and 133 rows corresponding to each day's closing change in yields.

At step 810, the system centers and/or normalizes the data. This is achieved by, for example, subtracting the sample mean and dividing by the sample standard deviation for each dimension of the data matrix. This is done to, among other things, ensure the data set is stationary and to reduce the dominance of the input variable with the greatest volatility. Different methods of standardization (exponential smoothing etc.) are used by different software packages which is why slightly different results can be produced.

At step 812, the system calculates the covariance matrix. In one embodiment, the full covariance matrix can be the matrix shown in FIG. 8D. The matrix reveals the typical conduct of a swap yield curve, with tightly spaced pairs being more correlated than more distant pairs. As seen, the matrix is both square and symmetrical; this is an important requirement for the next step.

At step 814, the system calculates the eigenvectors and eigenvalues of the covariance matrix. Most statistical software packages will perform the eignvalue decomposition of the covariance matrix with built in routines. Here, the results of this process are applied against the input data. In one embodiment, there are some assumptions to perform this analysis; namely that the principal components are orthogonal. Practically this means that the relationships in the data set are linear and that the mean and variance are sufficient statistics to describe their distribution.

In one embodiment, the first few principal components (Pn) describe the vast majority of the variation in the data set. FIG. 8E shows that in the example data set, the first 3 principal components explain 99.5% of the variability in the data. This efficiency in explanation and computation is one of the great attractions of PCA.

Turning now to the eigenvectors in FIG. 8F, the computed data can be applied to a swap curve. P1 weights are very similar for each of the instruments in the data set; this effect can also be seen in the very high correlation between these points and can be interpreted as the impact of roughly parallel moves in the yield curve. P2 weights are consistently decreasing which can be seen to reflect a change in slope of the yield curve. As an aside it is interesting to note the pivot point of this slope component is around 7 yr. This pivot point may be part of the data provided to users for their analysis and use. Finally P3 weights can be determined to represent the convexity or bowing of the yield curve. Again it is interesting to see where this bowing is greatest impact, in the case the 5 yr region. This bowing point may be part of the data provided to users for their analysis and use.

Although the example data set included only one asset class, swaps, the system can be programmed to incorporate government backed products or another currency and apply the data to the first four principal components discussed above, one of which would represent the change in spread between asset classes.

At step 816, the computed data analysis of the PCA of the various swap contract data are provided. As seen, PCA can be a valuable tool when examining the overall risk of a portfolio, similar to Value At Risk (VAR) analysis but with greater descriptive power. It is also useful in deriving weighting for strategies which immunize the trade or portfolio against the effects of shift, curve, spread and/or bowing of a yield curve. This is of particular interest when identifying strategies with mean reverting potential.

Figure 9:
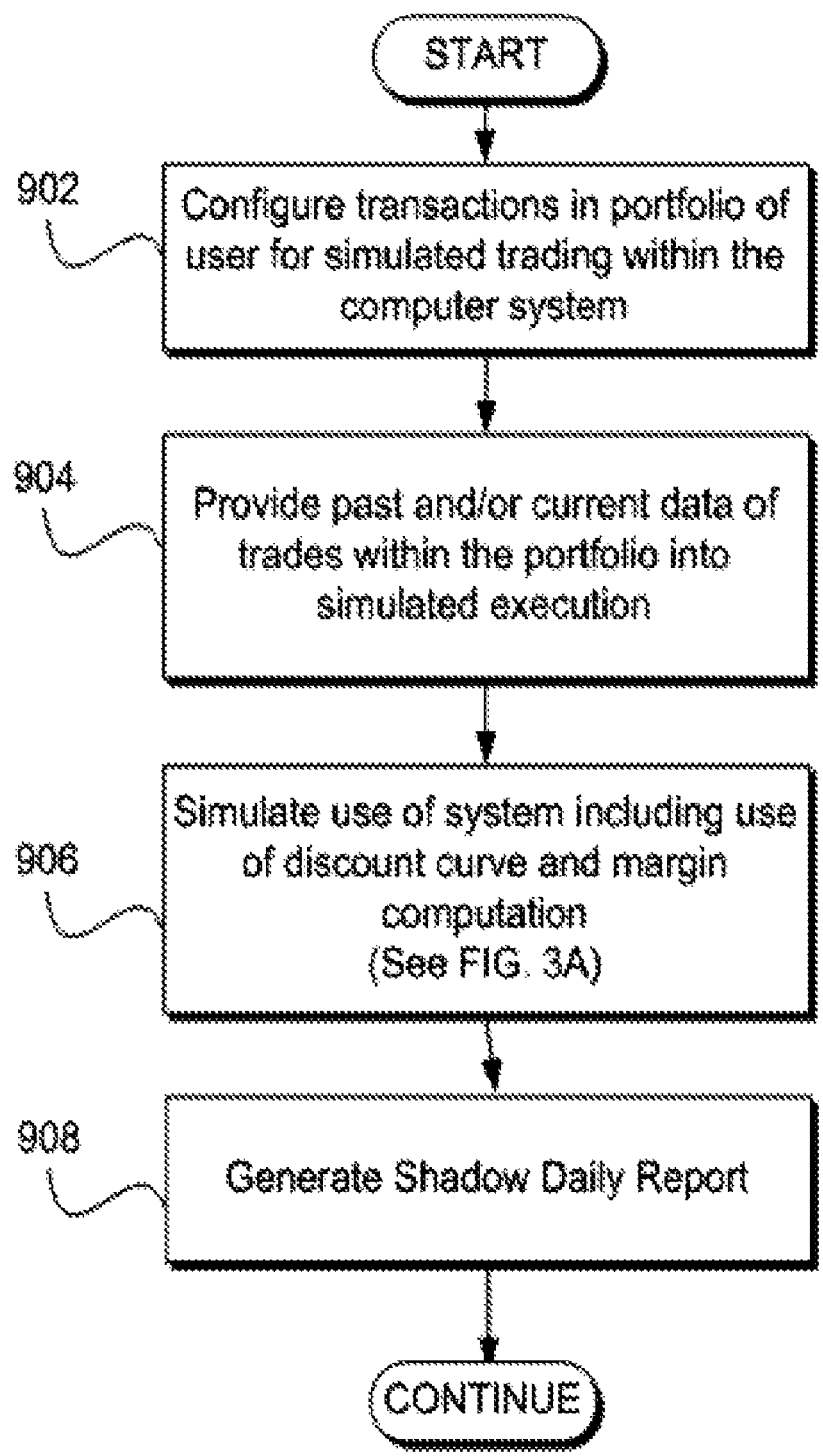
FIG. 9 shows a process for managing shadow or simulated clearing of a portfolio derivates within the electronic exchange computer system and/pr providing Shadow Clearing Reports in accordance with embodiments of the present invention.

FIG. 9 shows a process for managing shadow or simulated clearing of a portfolio derivates within the electronic exchange computer system and/pr providing Shadow Clearing Reports in accordance with embodiments of the present invention. Shadow clearing is a simulation of the discount curve generation and usage according to FIG. 3A based on trading data of a portfolio of derivative instruments for participants, both current and potential, to see the implications of moving OTC interest rate derivate transactions into the system's clearinghouse. In one embodiment, the transactions in the portfolio and the reports provided by the system can be encrypted or other technological measures use to limit access to the reports and/or the transactions in the portfolio and the reports may be protected by computer security measures.

At step 902, the transactions in the portfolio of a user is configured for simulated trading within the system. If the transactions in the flat file provided by the user does not match exactly the system's current contract specifications, the system can make some assumptions and modifications to the trade details in order for them to conform for shadow clearing. There are three key areas of difference which can me harmonized by the system based on the client data: Frequency of the floating leg, Margins on the floating leg, Embedded call options.

While the flat file contains a mix of floating leg frequencies, the system's current contract specifications can allow for quarterly rolls. For shadow clearing purposes the system can be configured such that the floating legs roll on a quarterly basis. In some embodiments, the system my make no adjustment to the valuations which will contribute to some difference between the system and the swap counterparts. In one embodiment, the system can provided a set of proposed contract specifications which allow for monthly rolls to the Federal Farm Credit Banks Funding Corporation which will eliminate this issue.

Where there are margins on the floating leg of the deals they have been converted into fixed rate equivalents using the following approximation;

$$\pm 2 \times \frac{365}{360} \left\{ 2 \times term \sqrt{\left(1 + \frac{|margin|}{freq}\right)^{freq \times term}} - 1 \right\}$$

Finally there are a number of callable structures within the portfolio which the system has treated as bullet transactions to the call date of the contract; given the strikes of these contracts, this is a reasonable representation of the exposure.

At step 904, past and/or current data of trades within the portfolio are provided into a simulation of the execution of the system, wherein the simulation includes real trade data from the system as well as the trade data from the portfolio. The simulation generates the simulated discount curve and provides data as described in FIG. 3A. Valuations are generated by the system discount curve. The details of the construction of this curve are described herein.

At step 906, the system simulates the execution of the trades of the portfolio, using the discount curve generation and margin maintenance processes described herein, for example using the process of FIG. 3A. In one embodiment, the simulation is based on simulated trades using the clearinghouse as a simulated counterparty to the trades.

Figure 10:
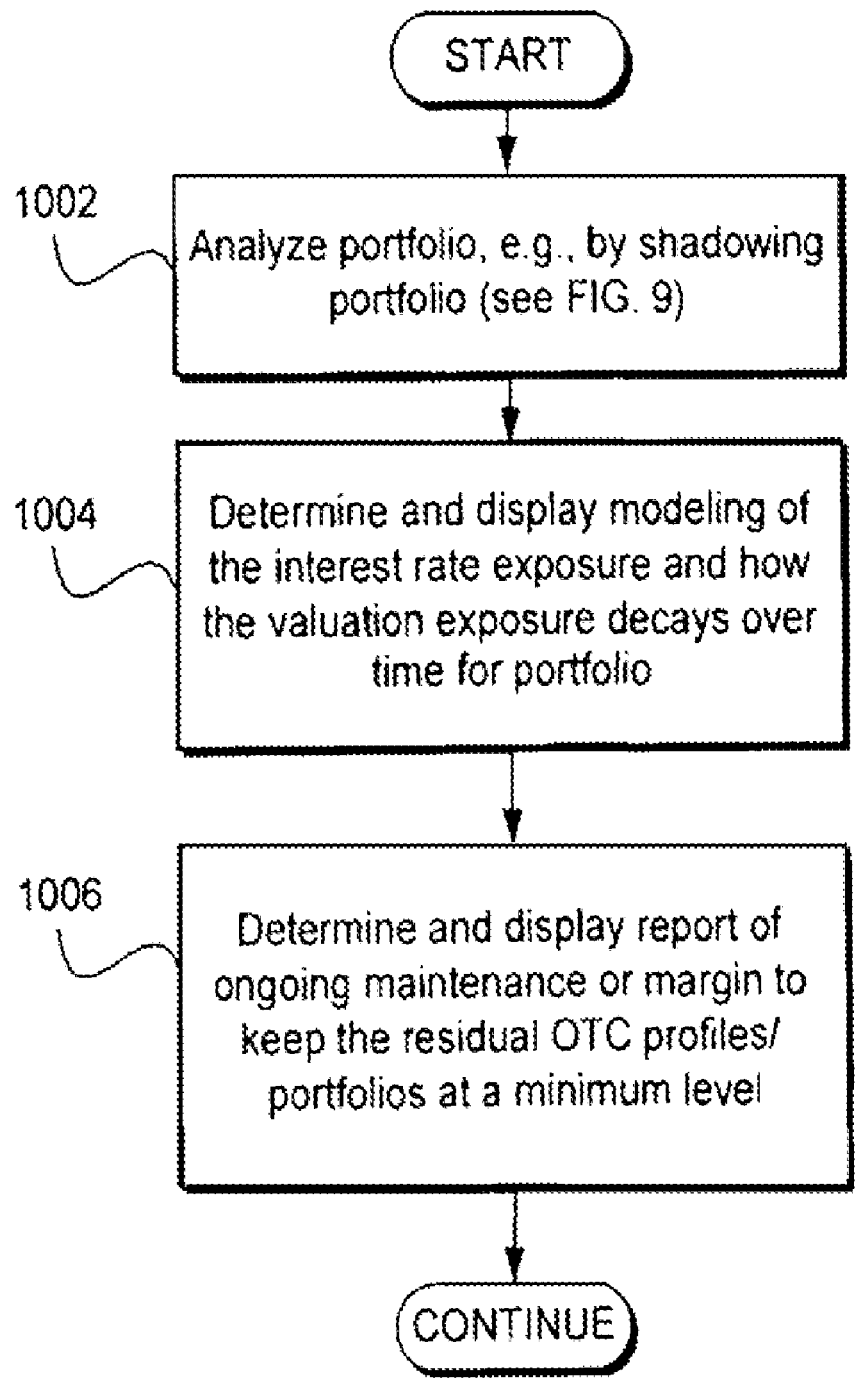
FIG. 10 is an example of a flow chart and data structure for portfolio examinations, including providing shadowing reports within the system in accordance with embodiments of the present invention.

At step 908, a Shadow Daily Report is generated. Daily Reports can include five main sections: Summary Report, Open Position Report, Closed Position Report, Coupon Paid Report, Yield Curve Details. The Shadow Summary Report can show the pricing of the trades, and/or the Initial and Variation Margin requirements of the portfolio along with any coupons due and the Base Margin, which is equivalent to the NPV of the open contracts. As the shadow clearing exercise moves forward, the changes in these numbers from the previous day will also be displayed here. All of the numbers in the reports are from the clearinghouse's point of view, i.e. a positive number is money owed to the clearinghouse and a negative number is money owed to the participant. The open position report will give trade level valuation detail mapped to the original ID#, the order of trade, and the contract's series identifier. For information, original counterpart gives a summary. If there are any closed positions or coupons paid, they will appear in their respective reports with the same information as in the open position report. On the final page the curve inputs are displayed. Processing then returns to other processing FIG. 10 is an example of a flow chart and data structure for portfolio examinations, including providing shadowing reports within the system in accordance with embodiments of the present invention. FIG. 10 shows a process for portfolio examinations based on the data provided by step 306 and/or the process of FIG. 9. In one embodiment, the reports generated by the analysis demonstrates how the counter-party credit risk of the institution can be moved from the bilateral world to a centrally cleared solution with a relatively small number of transactions. Thereby, the report(s) generated by the process of FIG. 10 show(s) the counter-party risk exposure and offers an immediate alternative to bilateral collateral management for individual counterparts who are of concern to a participant because of their concentration of risk or rapidly deteriorating credit standing.

At step 1002, a portfolio provided by a participant is analyzed, e.g., by shadowing the portfolio. The system models the current interest rate exposure of the portfolio and how the value of the same contracts decays over time. The simulated exposure can be determined by the data, including the simulated daily reports of the process of FIG. 9. Hedges to this exposure are then created or simulated whose commercial terms can be replicated by contracts currently listed and cleared by the system and its affiliates. By executing these hedges and contracts simultaneously, the party can move the bulk of the counter-party credit exposure from a bilateral environment to a centrally cleared solution without impacting the interest rate risk profile of the portfolio or the accounting treatment of its valuation. In one embodiment, there has been some loss of granularity in the very front end of the yield curve in this analysis as exposures less than two years have been combined. But this is done more for ease of illustration than any technical constraint. In other embodiments, no such loss of granularity is created by use less than two years of exposure.

Based on user input options about how the party wanted to view these shorter end exposures, the system can add further details if required. There are at least two solutions offered by the system: one which crystallizes the counter-party exposure at current levels and one which attempts to minimize the exposure by executing the hedges and contracts off market. Both are included as minimizing the exposure has a more significant funding implication for a trader's counterparts, and as such may impact on the cost of the solution. The hedges can continue to be amended over their life to ensure they are serving their original purpose.

Figure 11A:
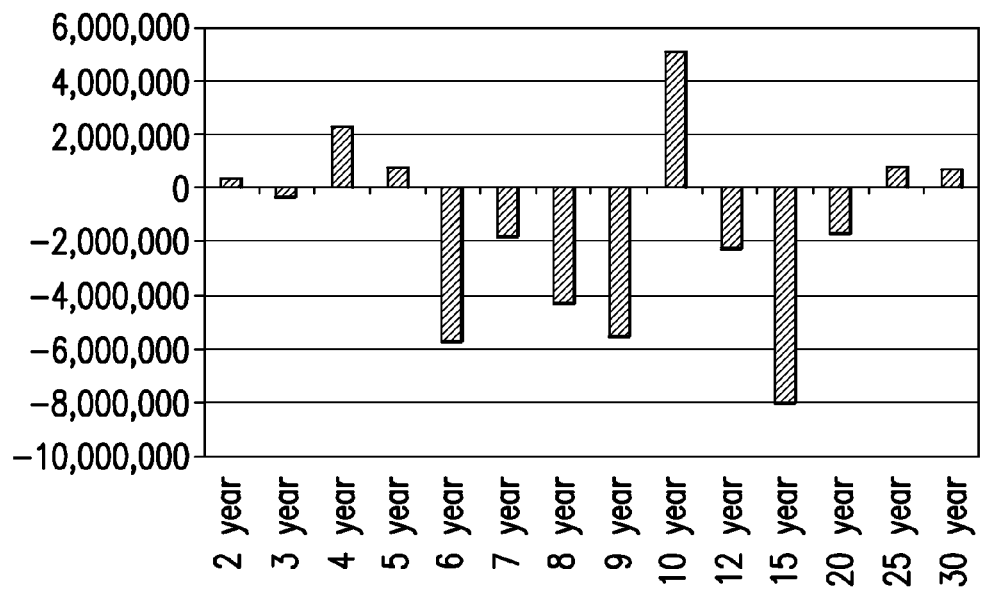
Figure 11B:
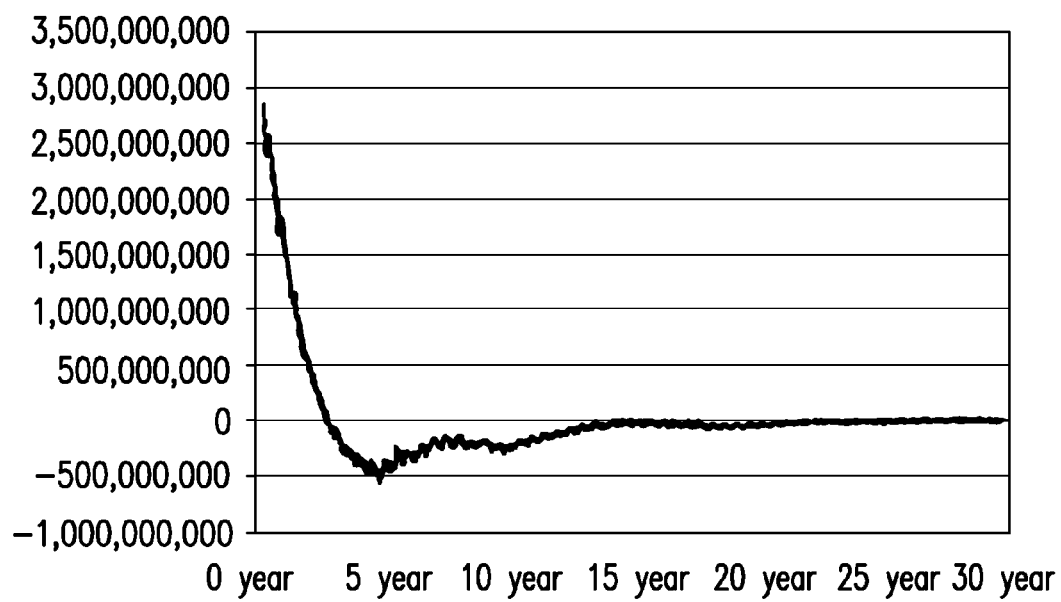
Figure 11C:
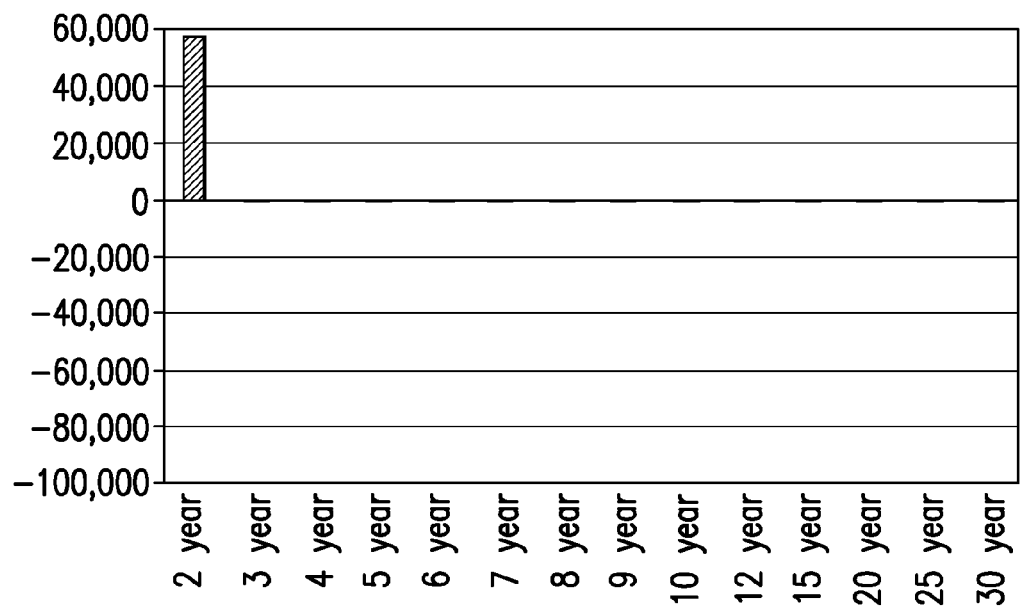

At step 1004, the modeling of the interest rate exposure and how the valuation exposure decays over time for the portfolio are determined and displayed, for example as shown in the reports of FIGS. 11A and 11B. FIG. 11A shows the maturity profile of the interest rate exposure, measured by the sensitivity to a 0.01% fall in swap yields. It shows a predominately short position, of upwards of $20 million per basis point, between 5 year and 15 year with some offset in the 10 year. FIG. 11A shows how the NPV decays as the positions mature, with the NPV changing sign at around the 2 year point and maintaining a relatively stable trend towards zero after 5 years.

While there is some natural netting in the portfolio, this reduced the gross notional by 263 Million or less than 1% and the deal population by 3 or around 2%. The portfolio can be one which has significant underlying risk; the summary details of the analysis of risk exposures are as follows, in one embodiment, and can be provided to the user as various reports:

135 Transactions
122.8 Billion in Notional Exposure
2.9 Billion in Valuation Exposure
19.5 Million per Basis Point in Interest Rate Exposure
1.1 Billion in Initial Margin Requirement By entering into just 15 swap transactions in the OTC market and related cleared futures contracts, the vast majority of the interest rate exposure can be transferred into a centrally cleared environment. The residual interest rate exposure in the OTC environment can be seen in FIG. 11B, again measured by the sensitivity to a 0.01% fall in swap yields. The report may indicate that the Interest Rate Exposure has been reduced to around 58 Thousand per Basis Point and is constrained to the front of the curve.

At this stage, the valuation exposure remains in the OTC space because the transactions employed to transfer the interest rate risk exposure have been executed at market. Using the same 15 swap transactions struck at off market levels, the valuation exposure can also be moved. The impact of this can be seen in the report of FIG. 11C. There is some jaggedness in the residual valuation exposure because of the relatively small number of transactions that have been used to address its profile; a smoother result could be achieved by employing more than 15 hedge transactions.

Figure 11D:
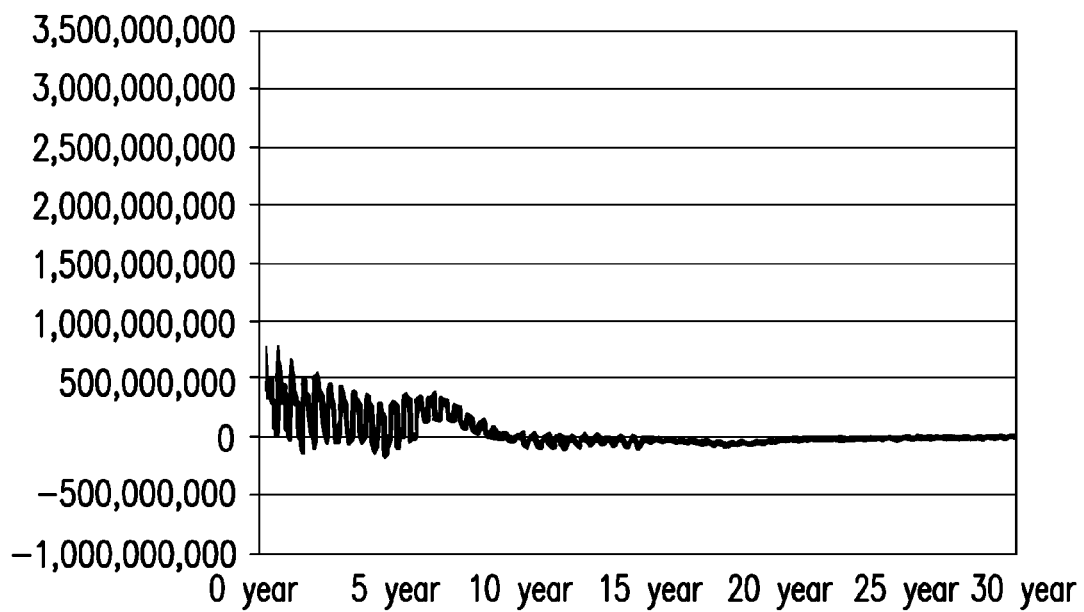

At step 1006, a report of an ongoing maintenance or margin to keep both of the residual OTC profiles/portfolios at a minimum level are determined and displayed, as show in the example report of FIG. 11D. As shown, the fewer transactions used to replicate the profile of the original portfolio, the greater this maintenance demand would be in both magnitude and frequency. However, as can be seen in this example, it is a relatively simple and efficient process to transfer the bulk of the counter-party credit exposure of the portfolio to a centrally cleared solution.

Illustrative User Interfaces

As described above in conjunction with FIG. 10, FIG. 11A-11D show various user interfaces provided by the process of shadowing a portfolio within the system including maturity profile of the interest rate exposure, residual interest rate exposure in the OTC environment, valuation exposure, and simulated ongoing maintenance or margin requirements.

FIGS. 12A-13M show examples of processes, data structures, and user interfaces for managing trading of swap contracts and margin based on a determined discount curve in accordance with embodiments of the present invention. In one embodiment, FIG. 12A to 13M shows the cash flow behavior of a swap over a period of time. In one embodiment, the steps are for processing the same cash flows in the system's futures as would be processed in an OTC Bilateral agreement.

FIGS. 12A-12G shows an example of a process for managing cash flow within the system in accordance with embodiments of the present invention.

At the steps/interfaces of FIGS. 12A and 12B, the system provides a spot starting swap traded on a date (e.g., February $10^{th}$) and the margin effect of that contract carried as a position overnight to the next date (e.g., February $11^{th}$). The yellow highlights the margin change.

At the steps/interfaces of FIGS. 12C to 12G, the system provides the margin and coupon changes of an aged transaction of a receiver In the Money that is sent into the clearinghouse. FIG. 12C reflects and displays the day the system first gets the trade showing Variation margin collection. FIG. 12D reflects and displays the next day carried. FIGS. 12E, 12F and 12G reflects and displays a coupon payment and floating reset and the change over a couple of days.

At the steps/interfaces of FIGS. 12H to 12L, the system provides substantially the same information as FIGS. 12D to 12G, other than, the system shows a user out of the money.

FIGS. 13A-13M shows an example of a process for managing cash flow within the system in accordance with embodiments of the present invention.

At the step/interface of FIG. 13A, the system provides the calendar screen which allows a user to select the end date of a contracts which gives the system sufficient information to provide FIG. 13B, the swap trade ticket for trade entry. FIG. 13 C is the same as 13A but is configured for a spot swap versus a forward starting swap.

At the step/interface of FIG. 3D, the system provides the IDCH/discount curve and rates displayed, the current real-time curve, most recent (e.g., 11 am and 3 pm) mark to market and prior day (e.g., 11 am and 3 pm).

At the step/interface of FIG. 13E, the system provides the Present Value of a Basis Point sensitivity to a certain account in our risk system. So it means any 1 basis point move in the curve will shift risk by that number for each account.

At the step/interface of FIG. 13F, the system provides the current level of variation margin of a given account.

Figure 13D:
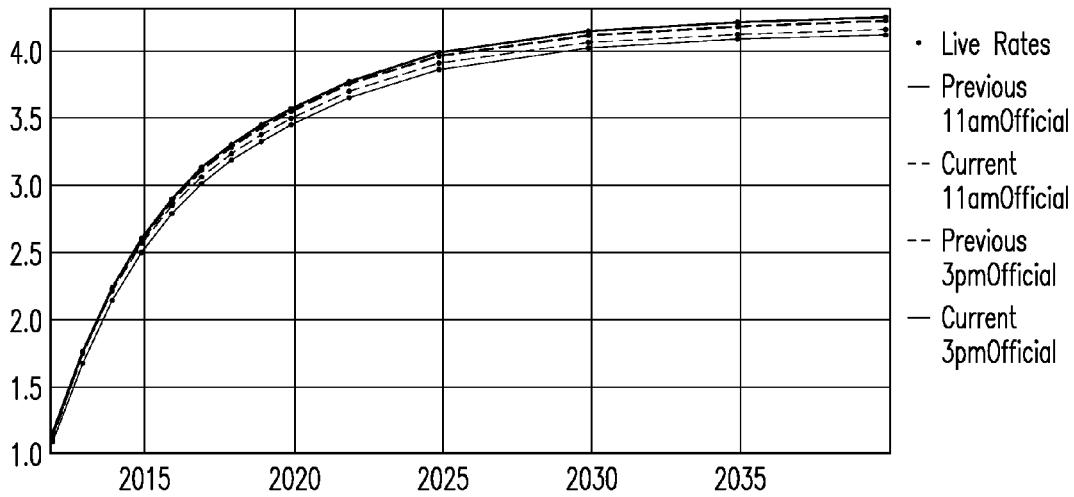
Figure 13I:
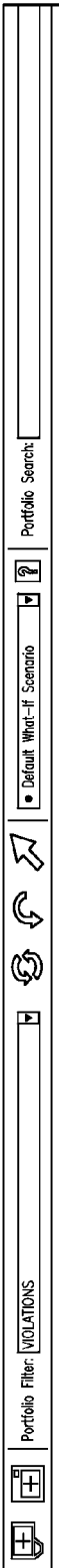
Figure 13L:
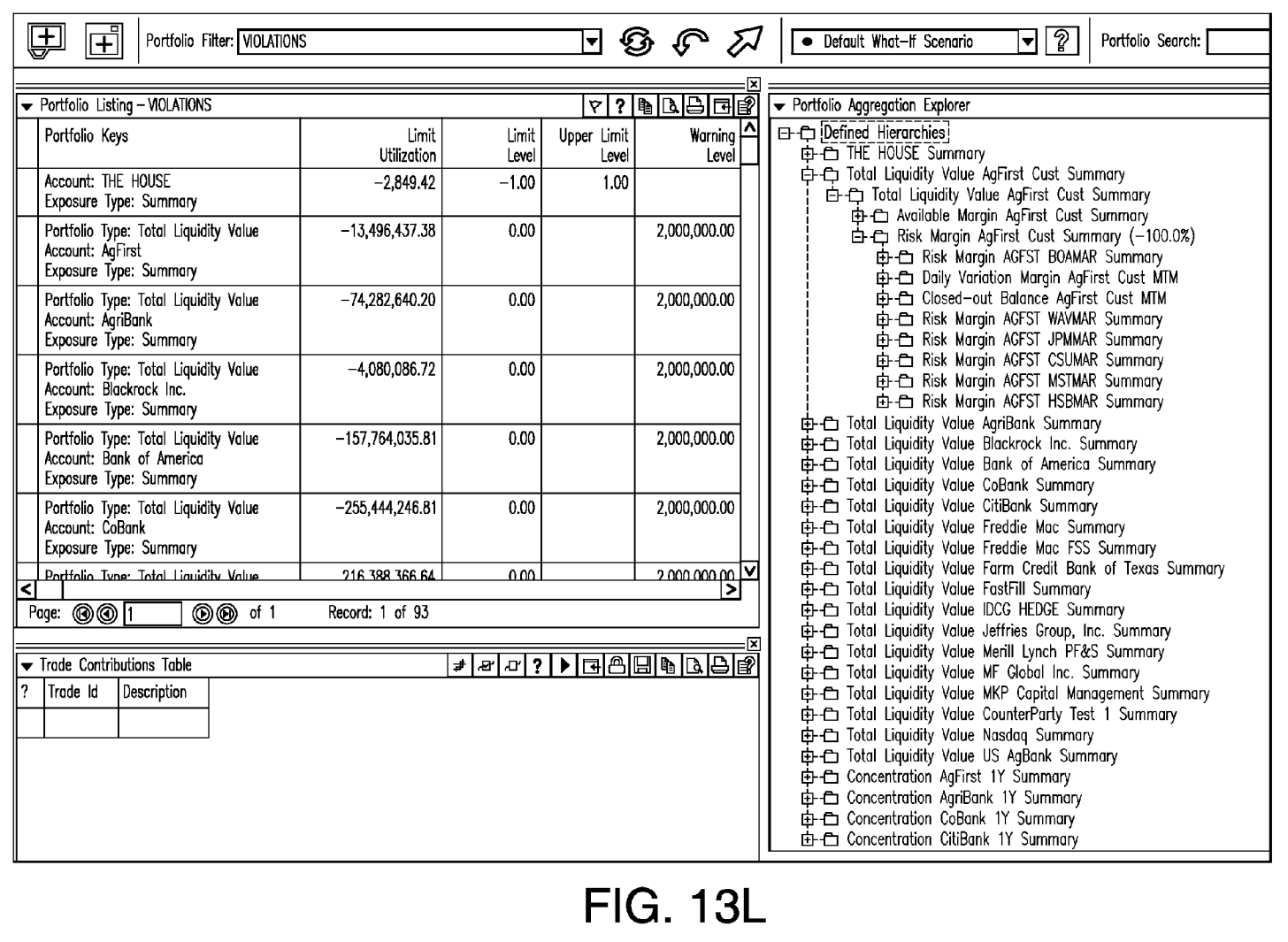

At the step/interface of FIG. 13G, the system provides an Initial margin limit level number set on an account At the step/interface of FIG. 13H, the system provides the total liquidity value of an account At the step/interface of FIG. 13I, the system provides a list of trades submitted to the risk system.

Figure 13M:
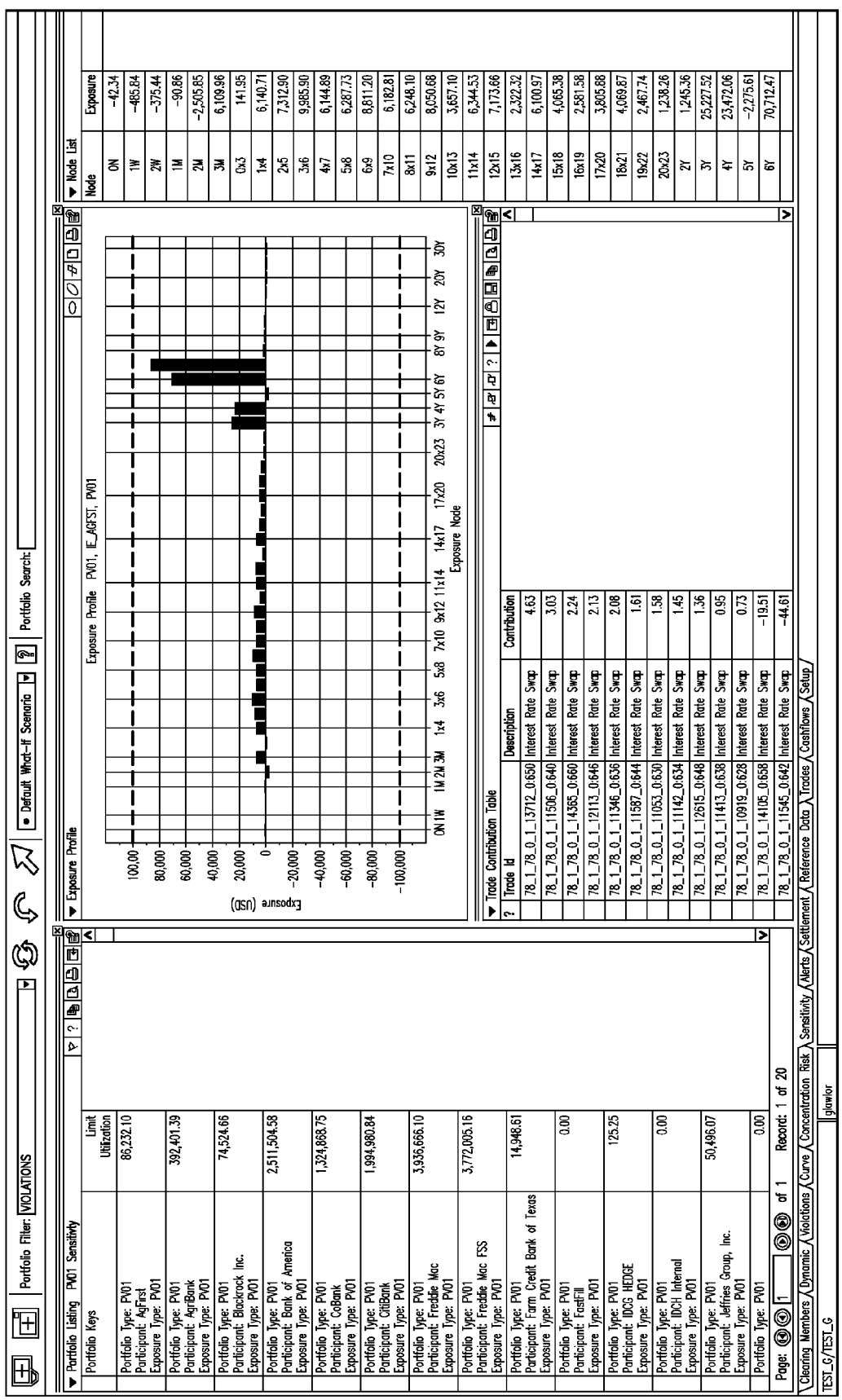

At the steps/interfaces of FIGS. 13J to 12L, the system provides various views of overall margin levels and risk levels on accounts At the step/interface of FIG. 13M, the system provides a graphical display of PVO1 sensitivity. In one embodiment, PV01 is the present value impact of 1 basis point move in an interest rate.

For the sake of brevity, it should be understood that certain structures and functionality, or aspects thereof, of embodiments of the present invention that are evident from the illustrations of the Figures have not been necessarily restated herein.

A computer or processor readable medium such as a floppy disk, CD-ROM, DVD, etc. may be use to store the processes, techniques, software, and information illustratively described herein. The media may store instructions, which when executed by a computer processor causes the processor to perform the processes described herein. The media can also be stored on devices, such as a server device, within a database, within main memory, within secondary storage, or the like.

It is to be understood that the invention is not to be limited to the exact configuration as illustrated and described herein. Accordingly, all expedient modifications readily attainable by one of ordinary skill in the art from the disclosure set forth herein, or by routine experimentation there from, are deemed to be within the spirit and scope of the invention as defined by the appended claims.

What is claimed is:

1. A computer implemented method for managing a computer system for electronic trading of financial instruments that include swap contracts with a clearinghouse as a counterparty to such trades, wherein each step is conducted by a computer system, which method comprises:
    receiving in real-time a plurality of inputs that includes trade data for trades of swap contracts executed using the computer system;
    determining by an electronic component within the computer system in real-time, a discount curve for projected prices of future swap contracts over time based on the received plurality of inputs; and
    incorporating data about a trade of the swap contract that is valued based on the discount curve and that is executed within the computer system into the trade data used for determining the discount curve to provide a feedback loop into the real-time determination of the discount curve to provide information that assists in managing the electronic trading of the financial instruments.

2. The method of claim 1, wherein the inputs include data for historical or real-time trades of swap contracts and the method further comprises:
    valuing a swap contract price based on the determined discount curve; and
    determining a margin requirement for a user who wishes to trade or hold a position in the swap contract based on the swap contract price and the determined discount curve, with the trading or holding managed in a user account.

3. The method of claim 1, wherein the executing of the trade for the user further comprises:
    receiving a request for the trade of the swap contract by the user based on the provided determined discount curve and the swap contract price; and
    executing the trade at a price that is based on the swap contract price.

4. The method of claim 1, wherein the discount curve is determined in real-time by:
    aggregating the inputs based on a source of the inputs, wherein the source of the inputs comprises an interbroker dealer specializing in a type of the swap contract, financial data vendors, and prior trades executed using the computer system, and wherein the inputs include characteristics that comprise a bid price, an offer price, a best offer price, a best bid price, and a time;
    filtering the inputs based on the source of the inputs and the characteristics of the inputs;
    projecting the discount curve through data points in time that are based on the filtered inputs; and
    constraining the projected discount curve at or near a time of at least one of the inputs based on the best offer price and the best bid price.

5. The method of claim 1, wherein determining in real-time the discount curve comprises:
    filtering the inputs based on the source of the inputs and a value of the inputs; and
    weighting the inputs based on the source of the inputs and the characteristics of the inputs.

6. The method of claim 1, which further comprises providing in real-time to a plurality of users the determined discount curve and the swap contract price; wherein the swap contract price has a price range that includes three or more decimal places, wherein the provided discount curve includes a plurality of time portions associated with a type or rate of the swap contract, wherein the portions includes a short term portion, a medium term portion, and a long term portion.

7. The method of claim 1, which further comprises valuing the swap contract price by calculating the swap contract price over a plurality of dates based on a net present value of a cash flow for the swap contract and a discount rate that is based on the discount curve.

8. The method of claim 1, which further comprises:
    receiving a plurality of swap contracts configured for trading over an electronic network or market; and
    determining data structures based on the plurality of swap contracts for trading within the computer system; and based on the determined data structures, transferring an interest rate exposure of the plurality of swap contracts into a centrally cleared environment by providing executions for trading the plurality of swap contracts with the clearinghouse as the counter party.

9. The method of claim 1, which further comprises providing a margin call report for a hierarchy of users ranging over a company level, a group level, and an individual trader level based on the determination of the user's margin requirement.

10. The method of claim 1, which further comprises providing in real-time to the plurality of users, data from the inputs in a user interface that includes the discount curve determined from such data.

11. The method of claim 1, which further comprises:
providing in real-time to the plurality of users, the determined discount curve and the swap contract price; wherein the discount curve is configured as data compatible for computing trading strategies or validation of contract prices of at least one of the financial instruments or swap contracts to be traded.

12. The method of claim 1, which further comprises trading the swap contracts by recording in processor readable media a sell or buy of the swap contract trade at the price in an account of the clearinghouse, wherein other trades within the computer system is recorded against the clearinghouse account.

13. The method of claim 1, wherein the determining of the margin requirement further comprises:
determining a long and short position of the user in each contract held by the user;
determining margin charges for a plurality of buckets, each bucket including at least one year, wherein a charge in each bucket is netted or offsetted based on a charge in other buckets for other years; and
determining the margin requirement in a current time based on the determined positions and the margin charges.

14. A computer system for electronic trading of financial instruments that include swap contracts with a clearinghouse as a counter-party to trades, comprising:
a server device configured to perform actions that comprise:
receiving in real-time a plurality of inputs that includes trade data for trades that for swap contracts executed using the server;
determining in real-time, a discount curve for projected prices of future swap contracts over time based on the received plurality of inputs; and
incorporating data about a trade of the swap contract that is valued based on the discount curve and that is executed within the computer system into the trade data used for determining the discount curve to provide a feedback loop into the real-time determination of the discount curve to provide information that assists in managing the electronic trading of the financial instruments.

15. The system of claim 14 further comprising:
a third-party data provider device configured to provide pricing data; and
a client device configured to send trade information to the server to trade the financial instruments.

16. The system of claim 14, wherein the inputs include data for historical or real-time trades of swap contracts and the discount curve is determined by:
filtering the inputs for outlier data;
weighting the inputs based on their source; and
computing the discount curve based on a decomposition of a covariance matrix of the filtered and weighted inputs.

17. The system of claim 14, wherein the discount curve includes a plurality of time portions associated with a type or rate of the swap contract, wherein the portions includes a short term portion, a medium term portion, and a long term portion.

18. The system of claim 14, the actions further comprises valuing of the swap contract price by calculating the swap contract price over a plurality of dates based on a net present value of a cash flow for the swap contract and discount rate that is based on the discount curve.

19. A computer apparatus for managing electronic trading of financial instruments that include swap contracts with a clearinghouse as a counter-party to trades, comprising:
a transceiver for sending and receiving data;
a processor configured to perform actions that comprise:
receiving in real-time a plurality of inputs that includes trade data for trades of swap contracts executed using the apparatus;
determining in real-time, a discount curve for projected prices of future swap contracts over time based on the received plurality of inputs; and
incorporating data about a trade of the swap contract that is valued based on the discount curve and that is executed within the computer system into the trade data used for determining the discount curve to provide a feedback loop into the real-time determination of the discount curve to provide information that assists in managing the electronic trading of the financial instruments.

20. The apparatus of claim 19, wherein the inputs include data for historical or real-time trades of swap contracts and the discount curve is determined by:
filtering the inputs for outlier data;
weighting the inputs based on the source of the inputs; and
computing the discount curve based on interpolation between the inputs over time that have been filtered and weighed.

21. The apparatus of claim 19, wherein the discount curve includes a plurality of time portions associated with a type or rate of the swap contract, wherein the portions includes a short term portion, a medium term portion, and a long term portion.

22. A non-transitory processor readable medium for managing a computer system for electronic trading of financial instruments that include swap contracts with a clearinghouse as a counter-party to trades, the processor readable medium comprising instructions that when executed by a processor causes the processor to perform actions that comprises:
receiving in real-time a plurality of inputs that includes trade data for trades of swap contracts executed using the computer system;
determining by an electronic component within the computer system in real-time, a discount curve for projected prices of future swap contracts over time based on the received plurality of inputs; and
incorporating data about a trade of the swap contract that is valued based on the discount curve and that is executed within the computer system into the trade data used for determining the discount curve to provide a feedback loop into the real-time determination of the discount curve to provide information that assists in managing the electronic trading of the financial instruments.

23. The processor readable medium of claim 22, wherein the actions further comprises:

providing a carry and decay analysis of the valued swap contract; and providing a principal component analysis of the valued swap contract.

24. A computer implemented method for managing a computer system for electronic trading of financial instruments that include swap contracts with a clearinghouse as a counter-party to trades, wherein each step is conducted by a computer system, which method comprises:

receiving historical and ongoing data about trades of bilateral swap contracts of a user to generate a discount curve with projected prices for future swap contracts;

simulating the trades with the clearinghouse as a simulated counterparty within the computer system based on the discount curve;

incorporating data about the simulated trades into trade data used for generating the discount curve to provide a feedback loop into the generation of the discount curve; and generating simulated daily reports about the simulated trades comprising margin usage and pricing of the trades.

25. A computer system comprising a server configured to perform the method of claim 24.

26. A computer apparatus comprising a processor configured to perform the method of claim 24.

27. A non-transitory processor readable medium comprising instructions that when executed by a processor causes the processor to perform the method of claim 24.

28. A computer implemented method for managing a computer system for reducing risk during electronic trading of financial instruments that include swap contracts with a clearinghouse as a counter-party to trades, wherein all steps are conducted on a computer system, which comprises:

managing trading of a user that meets risk standards by managing a margin requirement of the user based on a computed discount curve for a plurality of swap contracts;

netting and offsetting similar contacts managed by the system to reduce overall residual risk of the electronic trading of the financial instruments between users the clearinghouse; and incorporating data about the trading of the user into trade data used for computing the discount curve to provide a feedback loop into the computation of the discount curve to provide information that assists in managing the electronic trading of the financial instruments.

29. A computer system comprising a server configured to perform the method of claim 28.

30. A computer apparatus comprising a processor configured to perform the method of claim 28.

31. A non-transitory processor readable medium comprising instructions that when executed by a processor causes the processor to perform the method of claim 28.

* * * * *